(12) United States Patent
Kowal et al.

(10) Patent No.: US 11,718,273 B2
(45) Date of Patent: Aug. 8, 2023

(54) REAR BEAM ARM AND BLADE ASSEMBLY

(71) Applicant: trico products corporation, Rochester Hills, MI (US)

(72) Inventors: Alexander Kowal, Clarkston, MI (US); Nicholas Finateri, Flint, MI (US); Kyle Moll, Oxford, MI (US); Roger Barnett, Rochester Hill, MI (US)

( * ) Notice: Subject to any disclaimer, the term of this patent is extended or adjusted under 35 U.S.C. 154(b) by 457 days.

(21) Appl. No.: 15/733,372

(22) PCT Filed: Jan. 14, 2019

(86) PCT No.: PCT/US2019/013477
§ 371 (c)(1),
(2) Date: Jul. 13, 2020

(87) PCT Pub. No.: WO2019/140378
PCT Pub. Date: Jul. 18, 2019

(65) Prior Publication Data
US 2021/0094514 A1    Apr. 1, 2021

Related U.S. Application Data

(60) Provisional application No. 62/616,809, filed on Jan. 12, 2018.

(51) Int. Cl.
*B60S 1/34* (2006.01)
*B60S 5/00* (2006.01)

(52) U.S. Cl.
CPC ........... *B60S 1/3459* (2013.01); *B60S 1/3418* (2013.01); *B60S 1/3436* (2013.01); *B60S 1/3481* (2013.01); *B60S 5/00* (2013.01)

(58) Field of Classification Search
CPC ...... B60S 1/3459; B60S 1/3452; B60S 1/345; B60S 1/3418; B60S 1/3436; B60S 1/3481
USPC ........................................ 15/250.32
See application file for complete search history.

(56) References Cited

U.S. PATENT DOCUMENTS

| | | | |
|---|---|---|---|
| 2002/0152575 A1* | 10/2002 | Tsukamoto | B60S 1/3481 15/250.352 |
| 2012/0036671 A1 | 2/2012 | Boland | |
| 2013/0097799 A1* | 4/2013 | Friscioni | B60S 1/40 15/250.32 |

(Continued)

FOREIGN PATENT DOCUMENTS

| | | |
|---|---|---|
| DE | 102011078108 | 12/2012 |
| EP | 3081442 | 10/2016 |

(Continued)

*Primary Examiner* — Katina N. Henson
(74) *Attorney, Agent, or Firm* — Bryan Cave Leighton Paisner LLP

(57) ABSTRACT

A stepped-designed beam arm wiper assembly has a beam arm that locks into a mounting head such that the beam arm can be disconnected from the mounting head for servicing a wiper blade attached to the beam arm. A head cover is attached to the mounting head via hinges on either side of the head cover which allow the head cover to open off the head on either pin hinges of the head, and can be pressed onto the head and retained on. The other end of the beam arm is inserted into an adapter which snaps onto a rear wiper blade coupler via lead-in hole and trunnion connection. The beam arm has an airfoil with a stepped design to match the head cover, adapter, and blade assembly stepped design.

10 Claims, 42 Drawing Sheets

(56) References Cited

U.S. PATENT DOCUMENTS

2016/0304063 A1* 10/2016 Garibaldi .................. B60S 1/40

FOREIGN PATENT DOCUMENTS

| FR | 2236359 | 1/1975 |
| FR | 2382357 | 9/1978 |
| FR | 2995850 | 3/2014 |

* cited by examiner

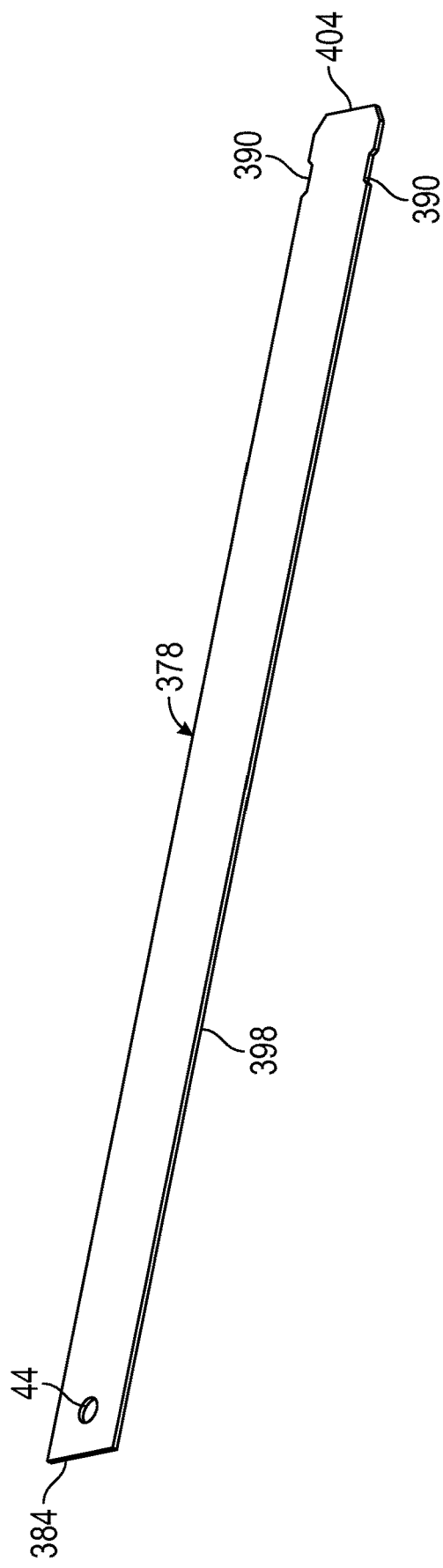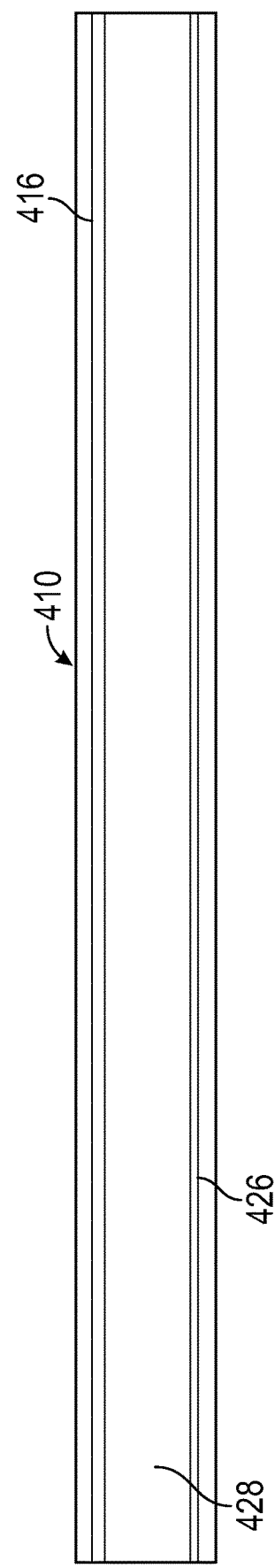
FIG. 33
FIG. 34

SECTION LXXX-LXXX

REAR BEAM ARM AND BLADE ASSEMBLY

CROSS-REFERENCE TO RELATED APPLICATIONS

This application claims priority to U.S. Provisional Application No. 62/616,809, filed on Jan. 12, 2018.

BACKGROUND OF THE INVENTION

1. Field of the Invention

The present invention relates to wiper system for cleaning a window of a vehicle. More particularly, the invention relates to a wiper system to be installed on a rear window of the vehicle.

2. Description of Related Art

Various rear wiper arm and blade configurations are known in the art. Examples include rear wiper arms with spring-loaded arms. Known blade configurations include conventional style blade, beam blade and hybrid. The spring force in the wiper arm causes the desired loading onto the blade to have an even pressure distribution on the wiper blade as the wiper blade travels across a surface to be wiped. Periodically, a wiping element on the wiper blade requires replacement due to loss of wipe quality. Generally, in order to replace the wiping element the wiper blade must be moved away from the wiping surface.

One generally known wiper arm configuration comprises a hinged connection between the wiper arm and a wiper mounting head which allows the wiper arm to be rotated away from the wiping surface for servicing of a wiper blade attached to the wiper arm. Additional components are needed to provide a hinged connection between the mounting head and the wiper arm which increases the component cost and complexity. Further, these systems may lack a low profile and may be bulky due to the hinge mechanism.

Another generally known system comprises a cover which is removable from the mounting head to provide access to an attachment nut. The wiper arm may be removed from the vehicle when the cover is removed and the nut removed from a drive shaft. This system is less desirable for servicing wiper blades because the cover can be misplaced or omitted when the wiper arm is reassembled to the vehicle. Also, this system is less convenient for servicing the wiper blade since an additional tool is required to remove the fastening nut.

It is desirable, therefore, to provide a service method to easily replace the wiper blade without removing the mounting head from the vehicle. It is also desirable to provide a service method which does not require removing the mounting head cover. Further, it is desirable to have a wiper arm that has a low profile and does not require a hinged connection between the wiper arm and the mounting head. Also, it is desired to have an attached cover for packaging purposes and where accessing the mounting nut is possible without completely removing the cover from the mounting head. Finally, it is desirable to have a service feature where the wiper blade (and/or the wiping element) can be easily replaced without the use of a separate tool.

SUMMARY OF THE INVENTION

A stepped-designed beam arm wiper assembly has a beam arm that locks into a mounting head such that the beam arm can be disconnected from the mounting head for servicing a wiper blade attached to the beam arm. A head cover is attached to the mounting head via hinges on either side of the head cover which allow the head cover to open off the head on either pin hinges of the head, and can be pressed onto the head and retained on. The other end of the beam arm is inserted into an adapter which snaps onto a rear wiper blade coupler via lead-in hole and trunnion connection. The beam arm has an airfoil with a stepped design to match the head cover, adapter, and blade assembly stepped design.

BRIEF DESCRIPTION OF THE DRAWINGS

Advantages of the present invention will be readily appreciated as the same becomes better understood by reference to the following detailed description when considered in connection with the accompanying drawings wherein:

FIG. 33 illustrates a perspective view of the beam arm insert of FIG. 32 according to one embodiment of the present invention;

FIG. 34 illustrates a top view of an airfoil according to one embodiment of the present invention;

DETAILED DESCRIPTION OF THE EMBODIMENTS

Figure 1:
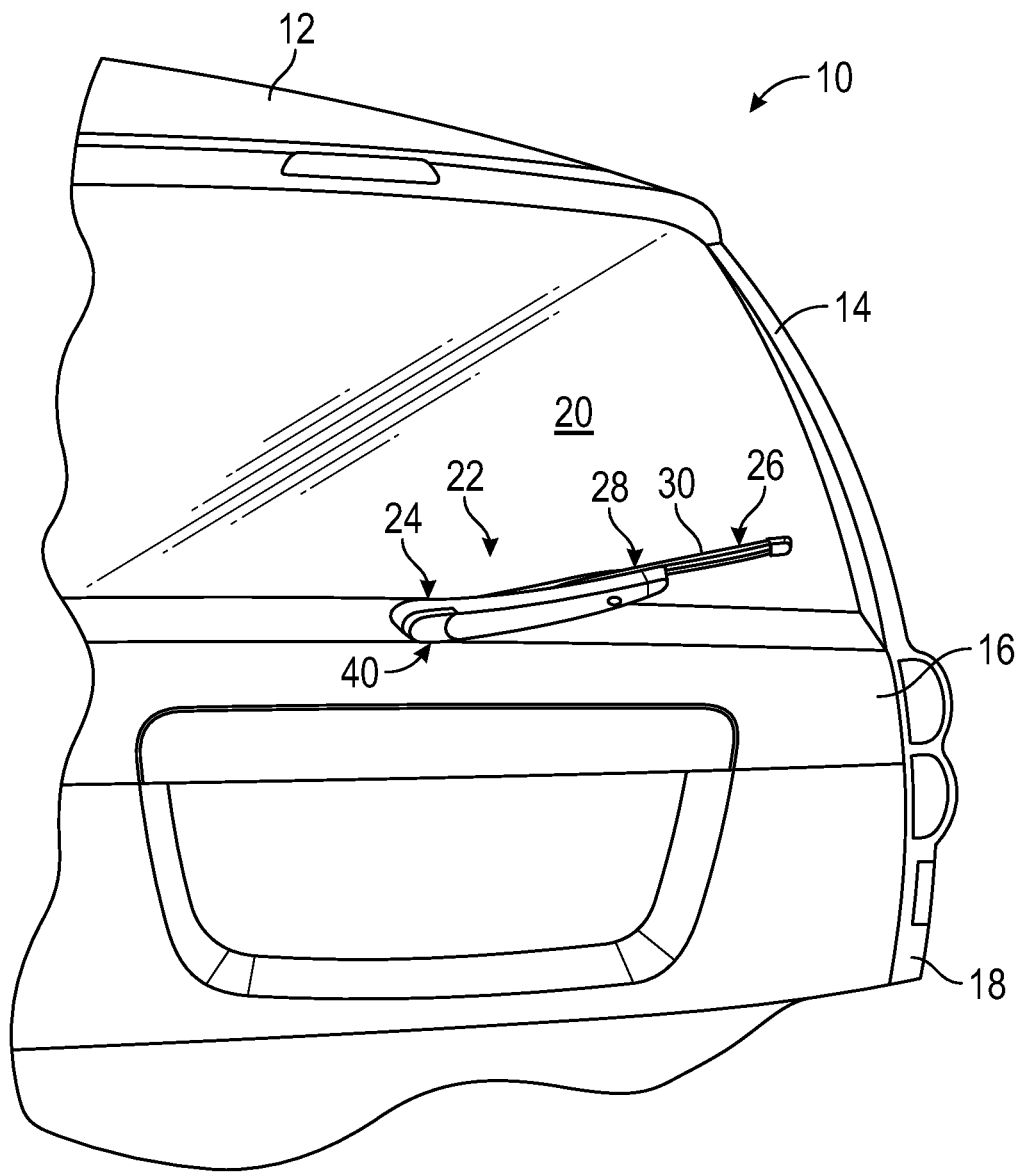
FIG. 1 illustrates a perspective view of a rear wiper system for a vehicle.
Figure 84:
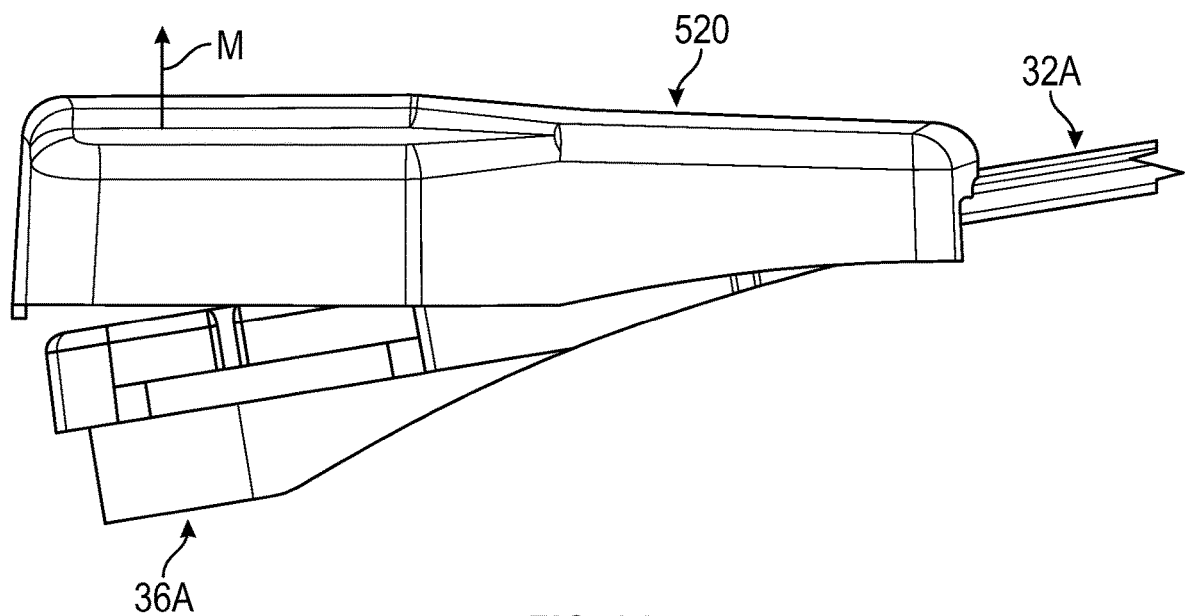
FIG. 84 illustrates a side view of the head assembly of FIG. 81 with the head cover being removed according to another embodiment of the present invention.

FIGS. 1 to 84 illustrate a wiper system according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Further, cross section views of automotive head restraint assemblies are shown to illustrate their layers and components, but such views are not necessarily to scale. Referring to the Figures, like numerals indicate like or corresponding parts throughout the several views.

FIG. 1 schematically illustrates a portion of a vehicle 10. More specifically, the portion of the vehicle 10 that has been employed, to illustrate the present invention, includes a generic illustration of a rear of a vehicle. Thus, the vehicle 10 includes a roof 12, a pair of pillars 14 (only one of which is shown in FIG. 1), a lift gate 16, and a rear 18 of the vehicle 10. A glass rear window 20 extends between the pillars 14 on the lift gate 16. While the rear of the vehicle 10 illustrated herein employs a lift gate 16, those having ordinary skill in the art will appreciate from the description that follows that the vehicle 10 could include a hatch back or any other commonly known configuration without departing from the scope of the present invention.

A wiper system 22, generally shown in FIG. 1 and in the embodiment illustrated herein, is employed to clean the rear window 20. The wiper system 22 includes a wiper arm assembly 24 (hereinafter referred to as a "wiper arm"), and a wiper assembly 26 (hereinafter referred to as a "wiper blade"). In the embodiment illustrated herein, the wiper arm 24 is operatively mounted to the lift gate 16 and is movable in an oscillating fashion to move the wiper blade 26 across the rear window 20. The wiper blade 26 is releasably engaged to the wiper arm 24 via a mounting assembly, according to the present invention and generally indicated at 28, that operatively interconnects the wiper blade 26 and the wiper arm 24. The wiper blade 26 is adapted to clean the surface to be wiped, in this case, the rear window 20. It should be appreciated by those having ordinary skill in the art that the wiper arm 24 and the wiper blade 26 may be employed in other areas of the vehicle 10, such as a front windshield (not shown) or a head lamp (not shown) that employs a wiper system. Thus, it will be understood that the present invention is not limited for use solely in connection with wiper arms 24 adjacent to a vehicle's rear window 20, but for use in all applications where wiper blades 26 are employed.

Referring to FIGS. 1 through 5, the wiper blade 26 includes a wiping element 30 that has a predetermined length and cross-sectional profile corresponding to a particular application and is typically manufactured through an extrusion process, which enables the length and cross-sectional profile of the wiping element 30 to be easily adjusted without a substantial increase to manufacturing expense. Furthermore, the wiping element 30 is constructed from a flexible rubber. It should be appreciated by those having ordinary skill in the art that the wiping element 30 may be constructed from any flexible material, such as silicone or other polymer, and via any manufacturing process, such as injecting molding, without departing from the scope of the present invention.

Those having ordinary skill in the art will also appreciate that the wiper blade 26 may be of either the tournament or beam blade type having any standard construction as is commonly known in the art. Thus, whether the wiper blade 26 is a tournament or beam style blade, it will generally distribute downward pressure from the wiper arm 24 across the wiping element 30. Moreover, the wiper blade 26 may be curved longitudinally with a predetermined radius of curvature that is the same or greater than the plane of curvature of the rear window 20, if any. This predetermined radius of curvature is sometimes referred to in the related art as a "free form" radius of curvature (hereinafter "windshield curvature").

Accordingly, the curvature of the wiper blade 26 may be symmetrical or asymmetrical depending on the force requirements and the contour of the surface to be wiped. The flexible, free form, pre-curved wiper blade 26 straightens out when the wiper arm 24 applies a force thereto to flatten it and direct the wiping element 30 to contact the surface to be wiped. Thus, the wiper blade 26 may include a free-form curvature that ensures force distribution on rear windows 20 or windshields having various curvatures that effects proper wrapping about the surface to be wiped. The wiper blade 26 may also include an airfoil (not shown) to reduce the likelihood of wind lift during operational movement across the surface to be wiped. However, it should be appreciated by those having ordinary skill in the art that the airfoil is optional, especially where the wiper blade 26 is employed on the rear window 20.

Figure 2:
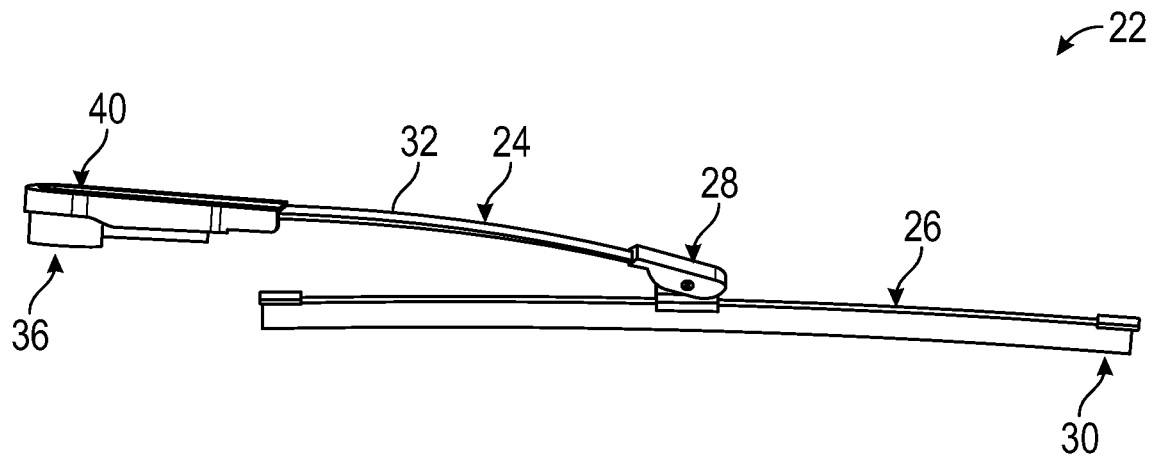
FIG. 2 illustrates a side view of the wiper system of FIG. 1 according to one embodiment of the present invention.
Figure 3:
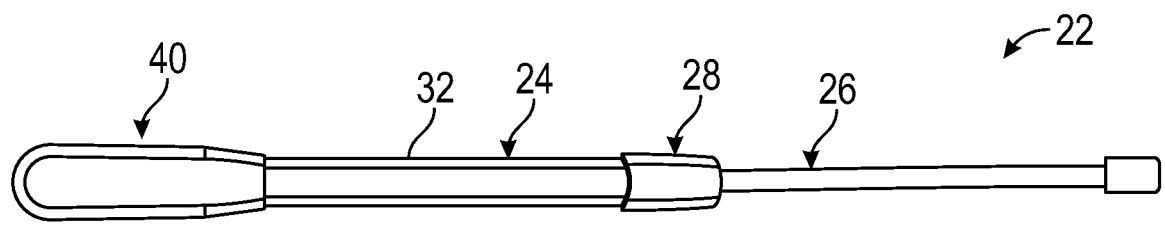
FIG. 3 illustrates a top view of the wiper system of FIG. 1 according to one embodiment of the present invention.
Figure 4:
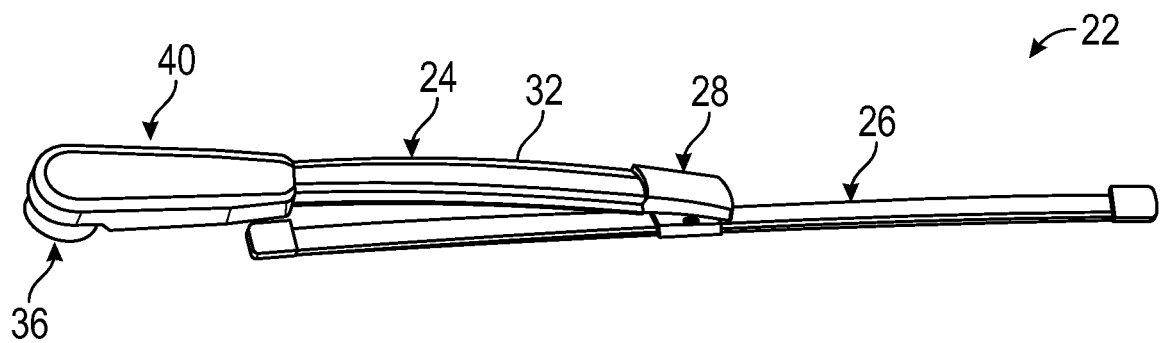
FIG. 4 illustrates a perspective view of the wiper system of FIG. 1 according to one embodiment of the present invention.
Figure 5:
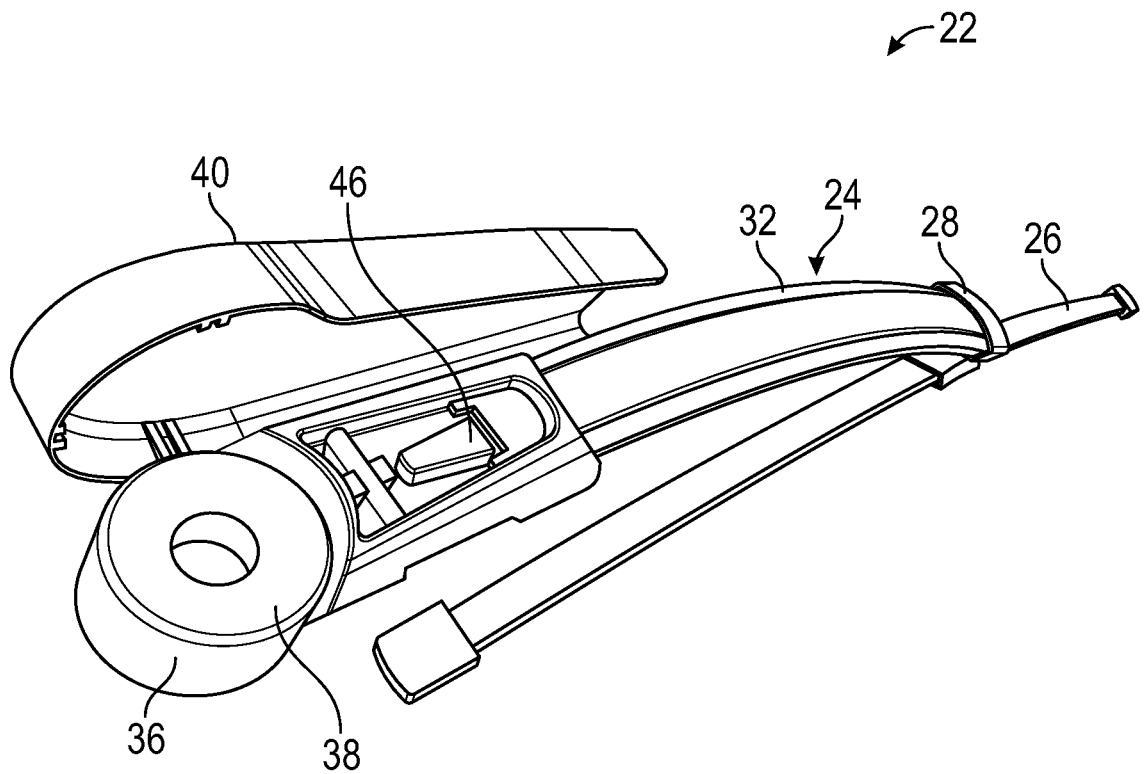
FIG. 5 illustrates a perspective view of the wiper system of FIG. 1 with a head cover in an open position according to one embodiment of the present invention.

Referring to FIGS. 2 through 4, the wiper arm 24 includes an elongated body 32 (hereinafter "beam arm") configured to be operatively mounted to a pivot shaft (not shown), which, in turn, is driven by an electrical motor (not shown) either directly or through appropriate linkages as is commonly known in the art. To this end, the wiper arm 24 includes a head, generally indicated at 36, that is supported on the beam arm 32. The wiper arm 24 includes an opening 38 (see FIG. 5) in the head 36 that provides access to the pivot shaft. The pivot shaft drives the wiper blade 26 in an oscillating manner across the surface to be wiped. When assembled to the pivot shaft, the head 36 is operatively mounted to the pivot shaft via a nut (not shown) threaded onto the distal end of the pivot shaft or via any suitable fastener known in the related art.

Shown in FIGS. 2-4 is a stepped-designed beam arm wiper assembly 22 according to an embodiment of the present invention. The wiper assembly 22 includes a wiper arm 24 acting as a leaf spring so that the arm's free form curvature applies force on the wiper blade 26 when installed on the vehicle pivot shaft. The wiper arm 24 deforms from its free form curvature to apply a load onto the wiper blade 26.

The wiper arm 24 also includes a head cover, generally indicated at 40, mounted to the head 36 near the opening 38 and is movable from a first position (see FIG. 2) closing the opening 38 to a second position (see FIG. 5) allowing access to the head 36 and to the pivot shaft via the opening 38.

Figure 6:
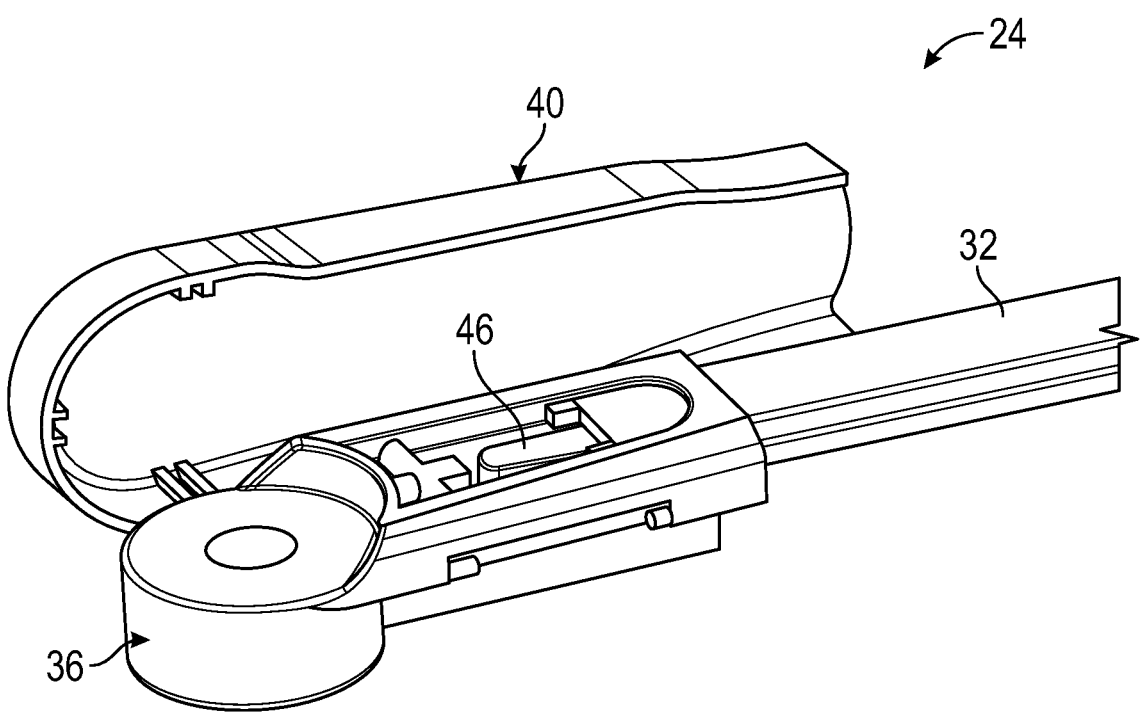
FIG. 6 illustrates a perspective view a wiper head and beam arm assembly with a head cover in an open position according to one embodiment of the present invention.
Figure 7:
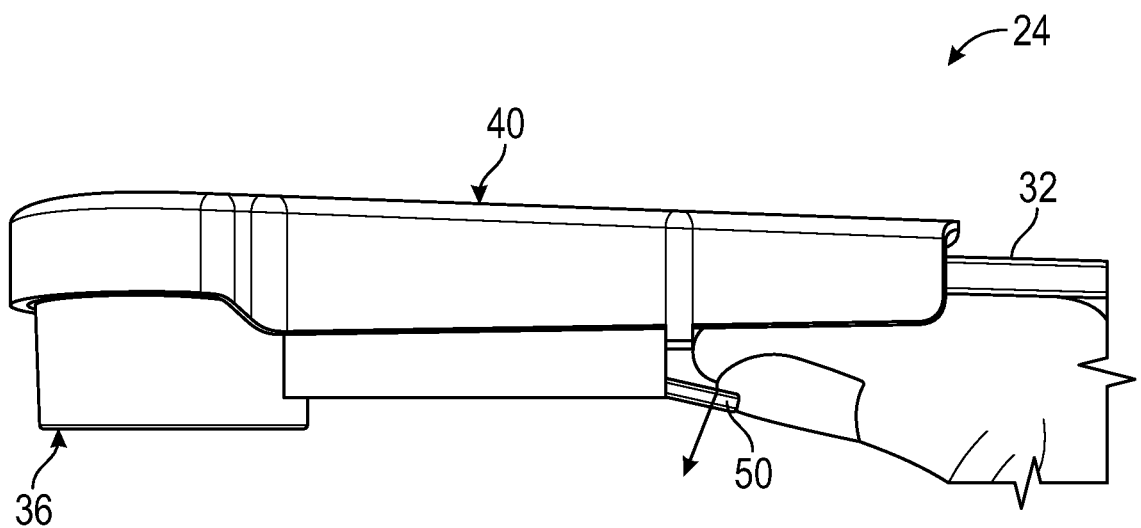
FIG. 7 illustrates a side view of the wiper head assembly of FIG. 1 with a release mechanism in a disengaged position according to one embodiment of the present invention.
Figure 8:
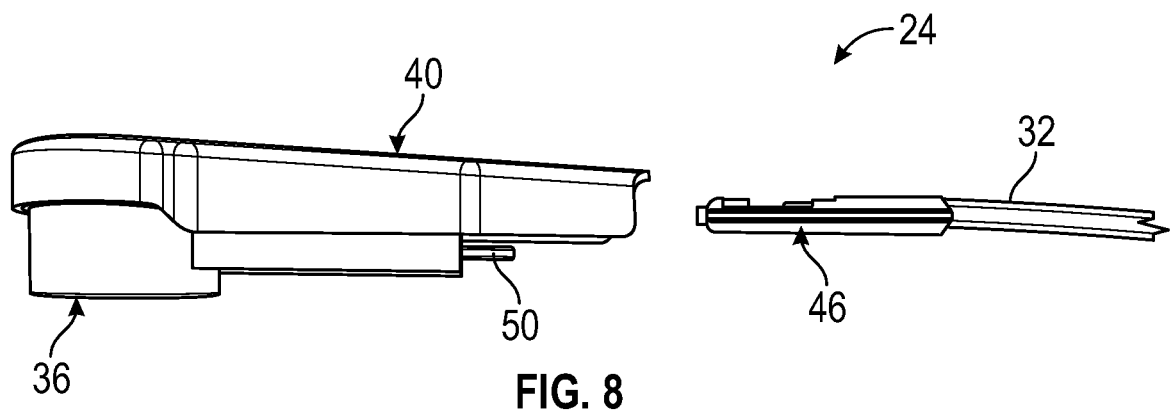
FIG. 8 illustrates a side view of the wiper system of FIG. 1 with a beam arm disconnected from a head according to one embodiment of the present invention.
Figure 9:
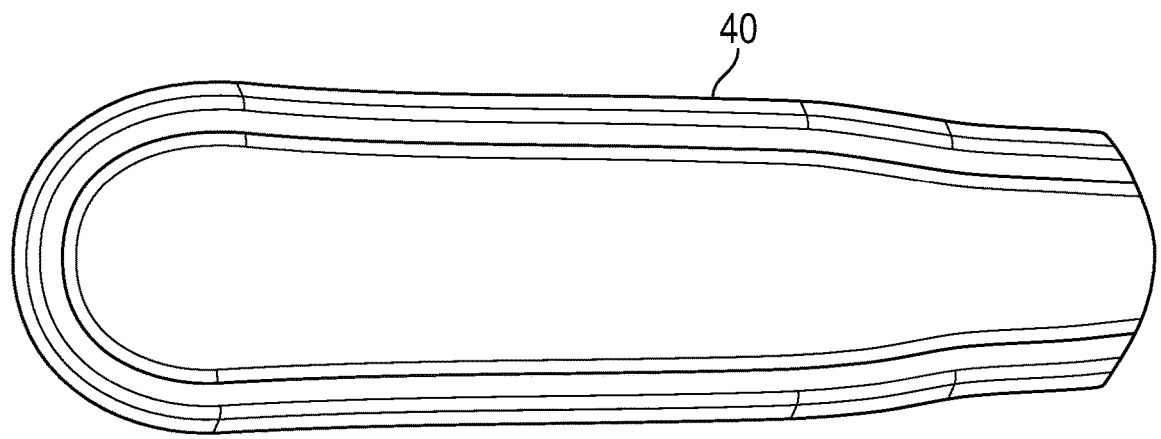
FIG. 9 illustrates a top view of a head cover according to one embodiment of the present invention.
Figure 10:
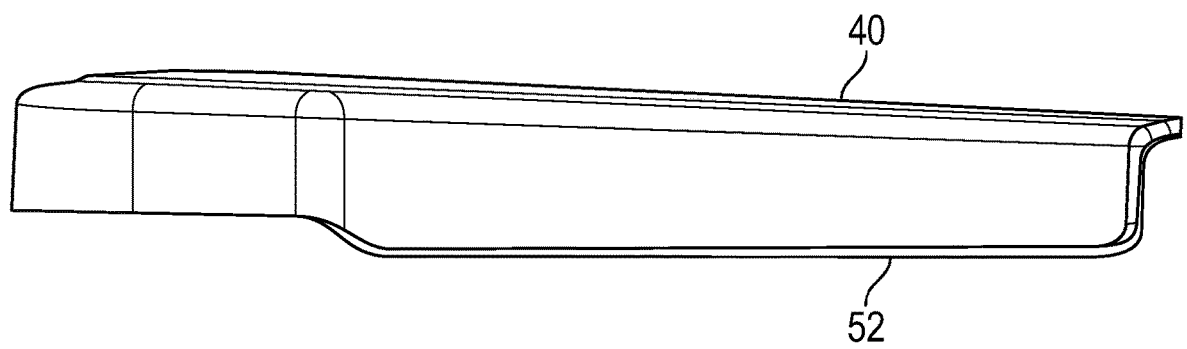
FIG. 10 illustrates a side view of the head cover of FIG. 9 according to one embodiment of the present invention.
Figure 11:
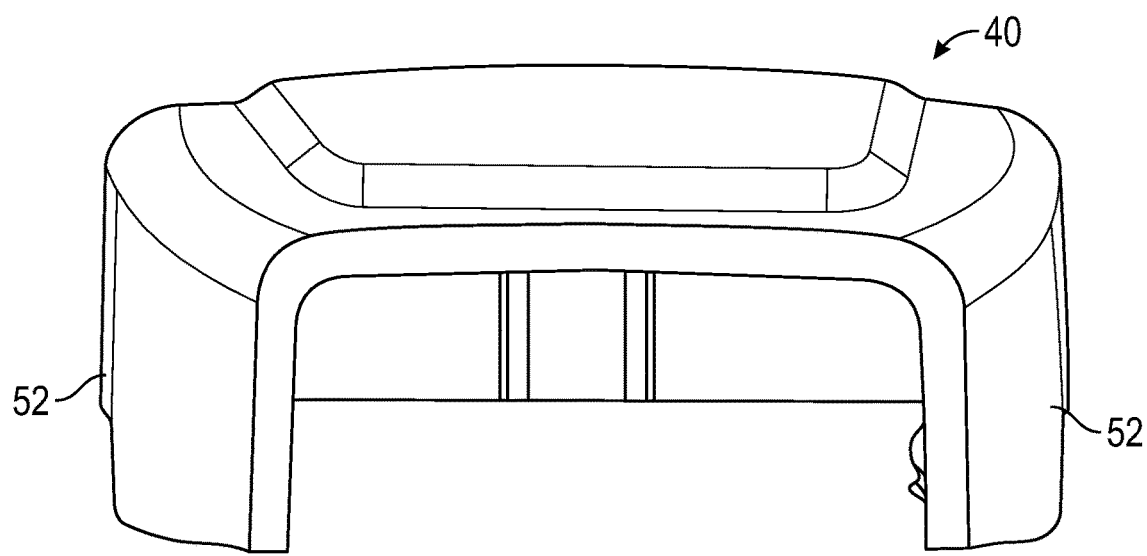
FIG. 11 illustrates an end view of the head cover of FIG. 9 according to one embodiment of the present invention.
Figure 12:
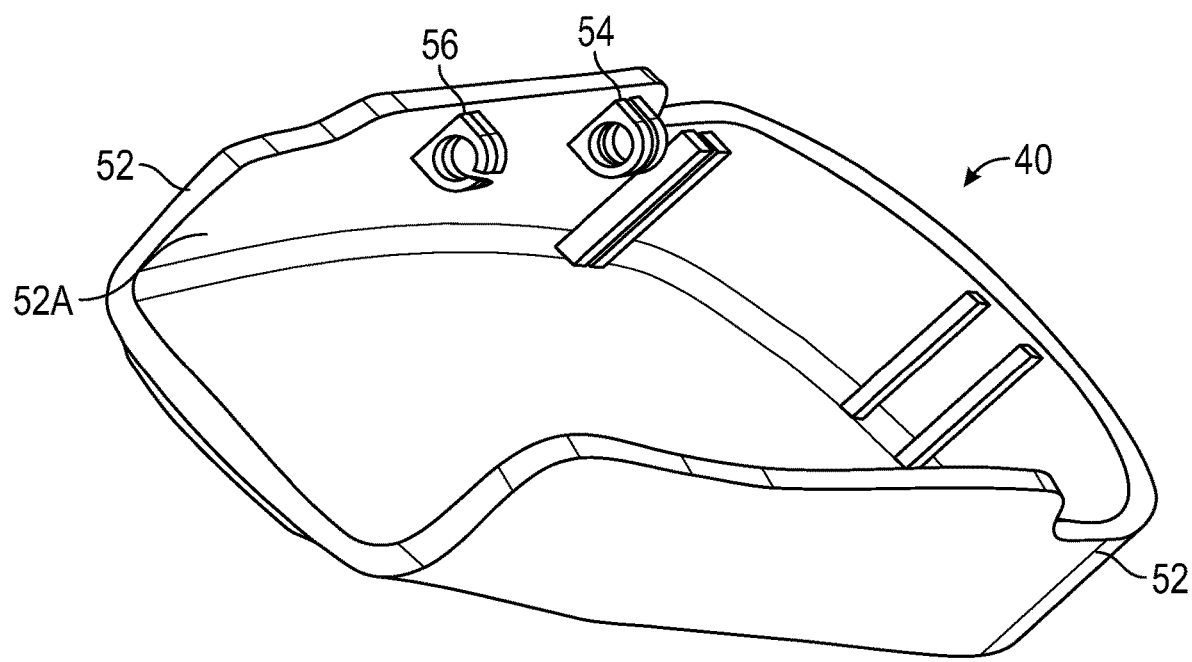
FIG. 12 illustrates a perspective view of the head cover of FIG. 9 according to one embodiment of the present invention.
Figure 13:
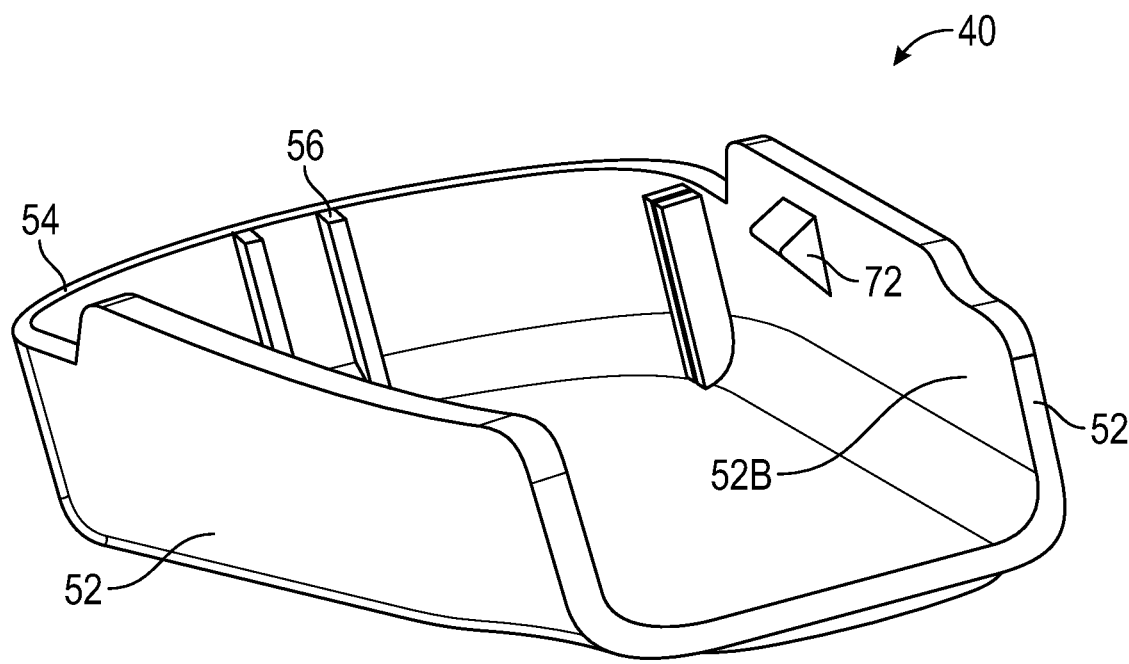
FIG. 13 illustrates a perspective view of the head cover of FIG. 9 according to one embodiment of the present invention.

Periodically, replacement of the wiper blade 26 is desired due to a decrease in perceived wipe performance. One method of replacing the wiper blade 26 is accessing the nut threaded on the distal end of the pivot shaft and removing the wiper arm 24 from the pivot shaft. The head cover 40 is easily rotated away from the head 36 in the embodiment illustrated herein shown in FIGS. 5 and 6 and which will be further described below. A second method of replacing the wiper blade 26 is illustrated in the embodiment shown in FIGS. 7 and 8. The wiper arm 24 consists of the beam arm 32 that has a locking feature 44 (see FIG. 36) on the end that locks into a retention clip 46. The retention clip 46 then locks into the head 36 which can also disconnect from the head 36 when a release mechanism 50 is repositioned. Releasing the beam arm 32 from the head 36 acts as a service feature which allows the wiper blade 26 and/or the wiping element 30 to be replaced. After servicing, the beam arm 32 is then locked into the head 36.

An embodiment of the head cover 40 is illustrated in FIGS. 9-13. The head cover 40 has a generally elongated U-shape with a lip 52 extending partially around the head cover 40 to form the side surfaces of the head cover 40. Illustrated in the figures is a stepped design on the head cover 40. The head cover 40 is configured to releasably mate with the head 36. The head cover 40 is designed to cover up the head 36 to protect from UV, corrosion, and foreign objects while also providing styling to the rear arm and blade assembly. The head cover 40 has a loop 54 and claw 56 on one inner side 52A of the head cover 40 that loop and snap into the pin hinges 60, 64 on the head 36. On the other inner side 52B of the head cover 40 is a retention bump feature 72 that is angled so that it can press over the head's hinge pin slot 84 and lock over a ledge 84A. The loop 54, claw 56, and retention bump feature 72 can be mirrored to the opposite side of the inner wall 52A, 52B for the ability to hinge about the head 36 with hinge points 60, 64 on the other side of the head 36. The head cover 40 is curved to close gaps on the sides of the beam arm 32 and has stepped styling that matches the rest of the beam arm 32 and blade assembly 26.

Figure 15:
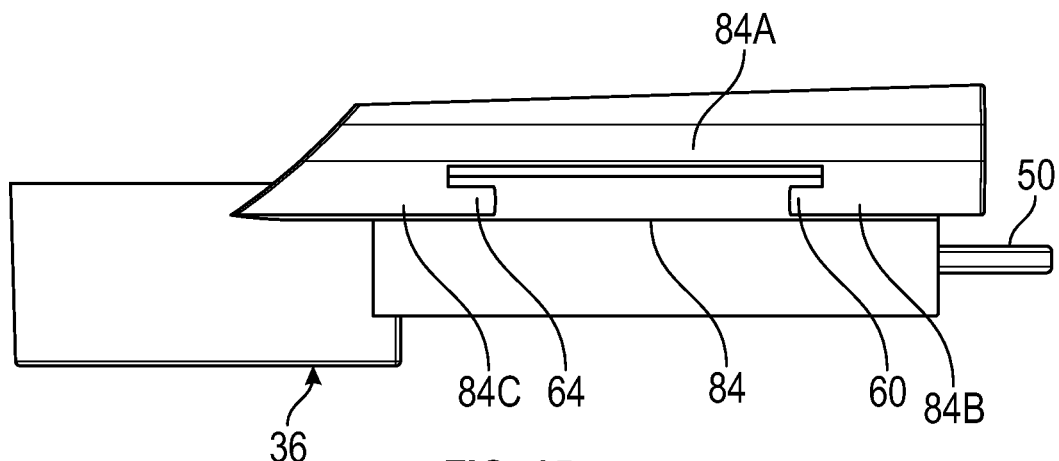
FIG. 15 illustrates a side view of the head of FIG. 14 according to one embodiment of the present invention.
Figure 16:
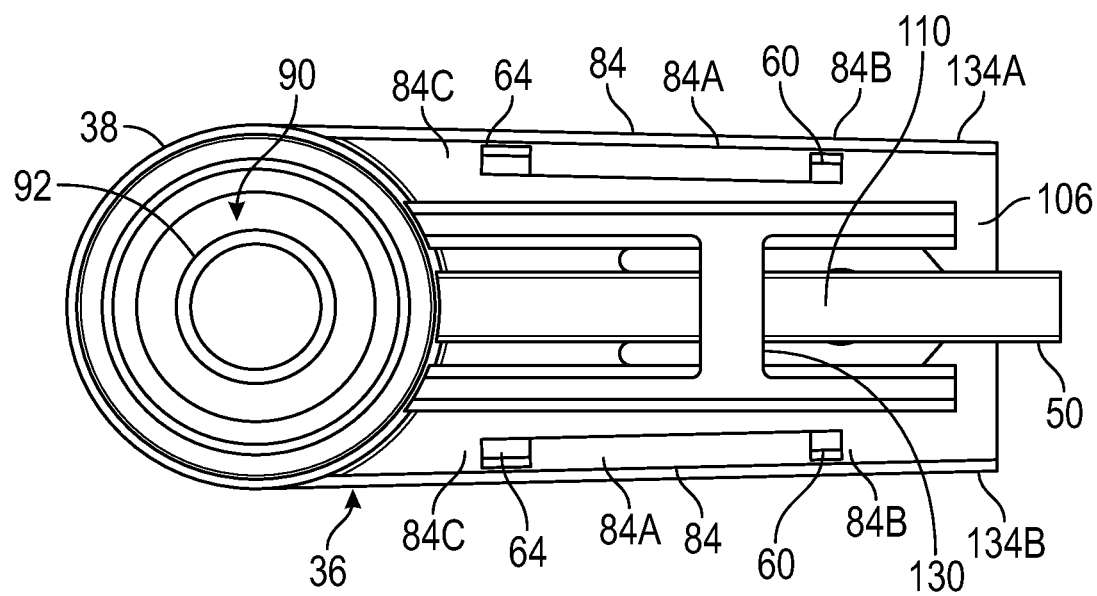
FIG. 16 illustrates a bottom view of the head of FIG. 14 according to one embodiment of the present invention.
Figure 17:
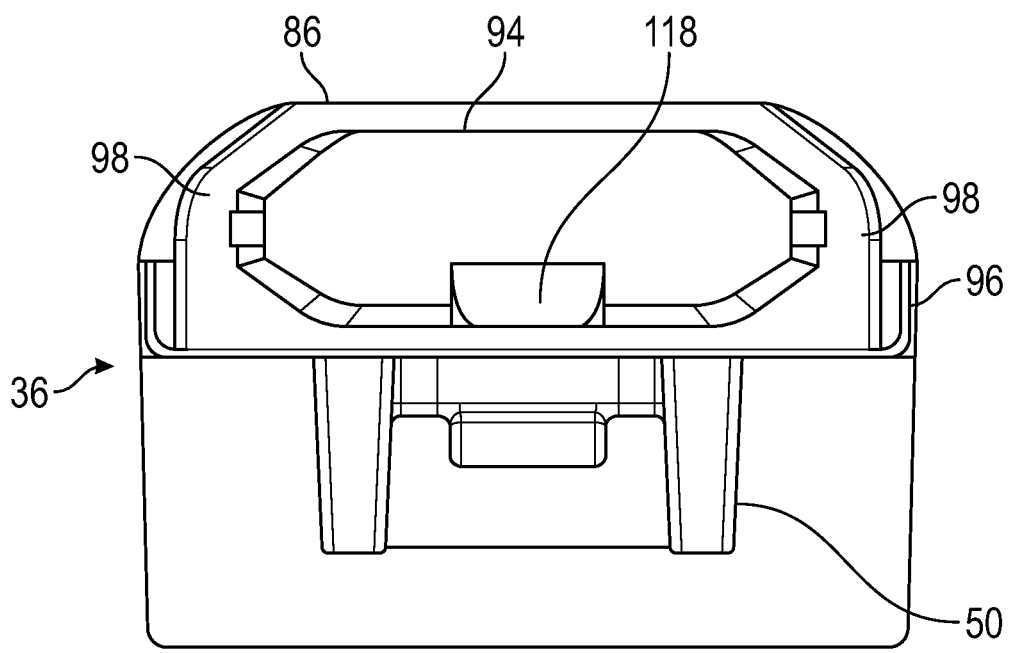
FIG. 17 illustrates an end view of the head of FIG. 14 according to one embodiment of the present invention.
Figure 18:
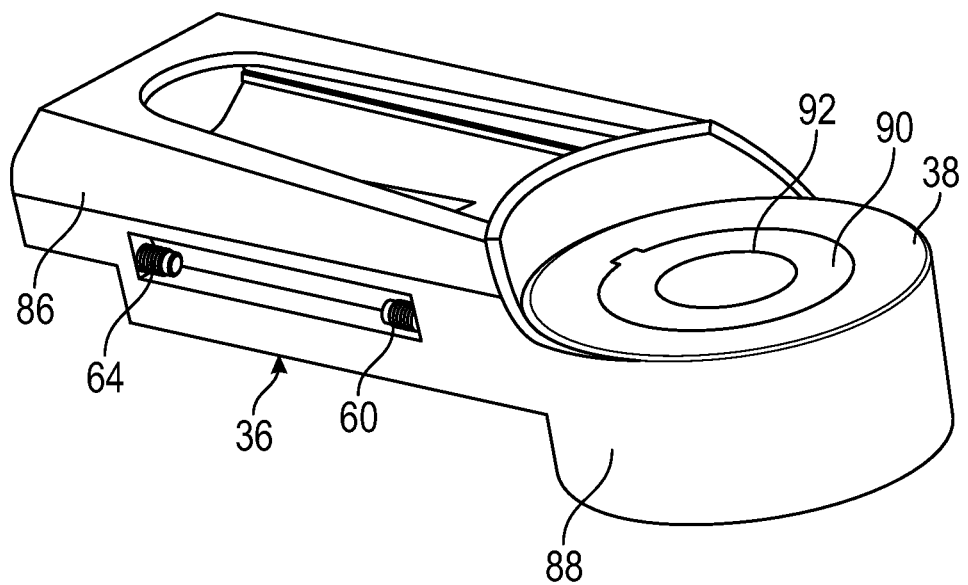
FIG. 18 illustrates a perspective view of the head of FIG. 14 according to one embodiment of the present invention.

The head cover 40 is releasably attached to the head 36 via hinge pins 60, 64 on either side of the head cover 40 which allows the head cover 40 to open off the head 36 on either pin hinges 60, 64 of the head 36 (see FIG. 15), and can be pressed onto the head 36 and retained on the head 36. The head cover 40 optionally has a retention bump 72 projecting from an interior surface of the head cover 40 and configured to releasably engage with a hinge pin slot 84 on the head 36 (see FIG. 15). The head cover 40 is made of a material such as plastic. The head cover 40 is integral, unitary, and one-piece.

Figure 19:
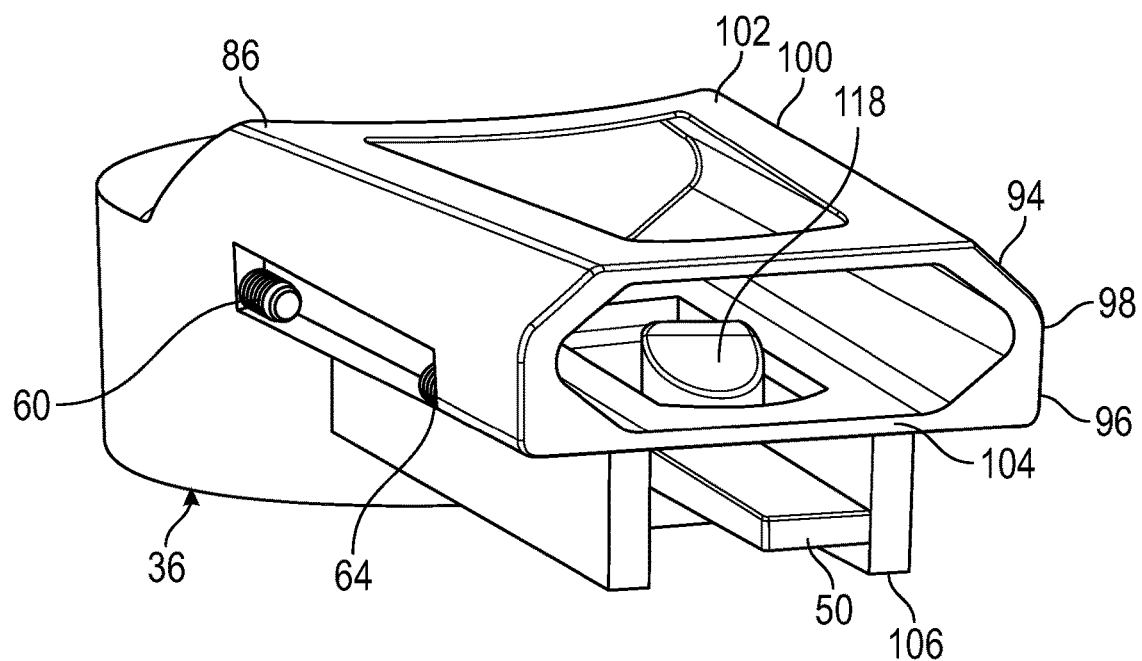
FIG. 19 illustrates a perspective view of the head of FIG. 14 according to one embodiment of the present invention.
Figure 20:
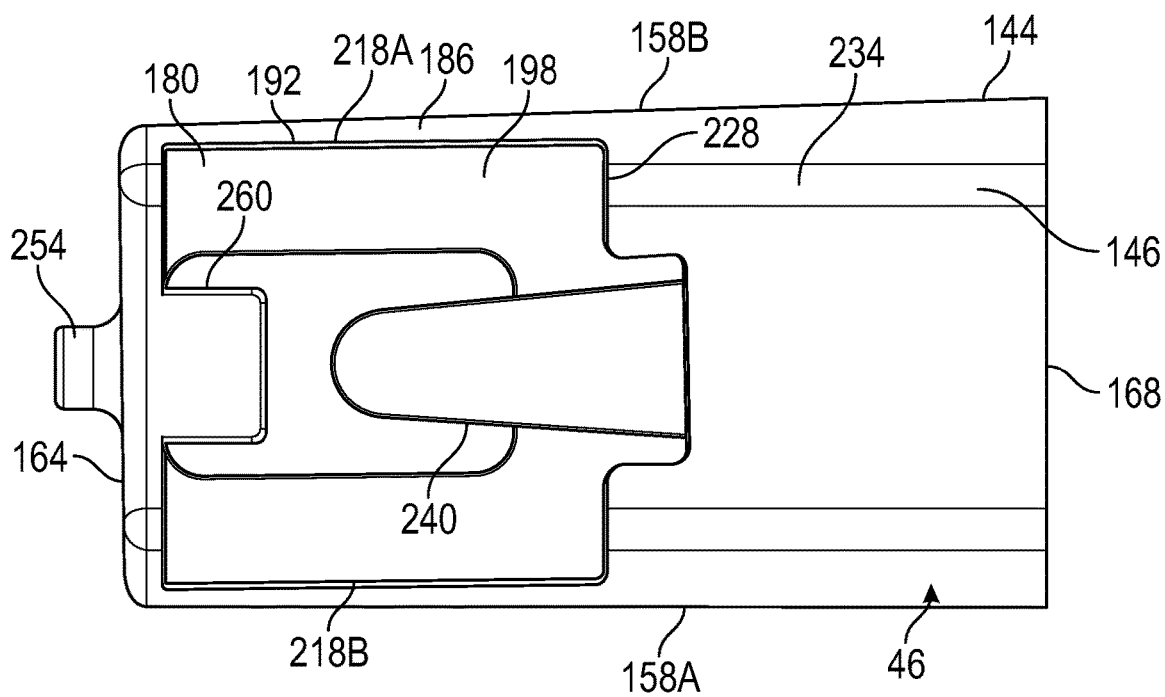
FIG. 20 illustrates a top view of a retention clip according to one embodiment of the present invention.

An embodiment of the head 36 is shown in FIGS. 14-19. The head 36 has a generally rectangular section 86 projecting outward from a generally cylindrical portion 88. The head 36 is made of a material such as plastic. The head 36 has an insert 90 that is attached through over molding injection process and molded within the cylindrical portion 88. The variable insert 90 dimensions allows for the head 36 to fit over various sized vehicle motor shafts which may be used on various vehicles. The insert 90 has a hole 92 passing longitudinally through the insert 90 configured to accept the pivot shaft. The insert 90 is made of a material such as a metal. Referring to FIG. 19, a slot 94 extends partially through the length of the rectangular section 86 from a first end 96 of the head 36. The slot 94 is configured to matingly engage with the beam arm 32 and further has guide slots 98 in each side of the slot 94. A first passageway 100 extends between the slot 94 and an upper surface 102 of the rectangular section 86. A second passageway 104 extends between the slot 94 and a lower surface 106 of the rectangular section 86.

Figure 14:
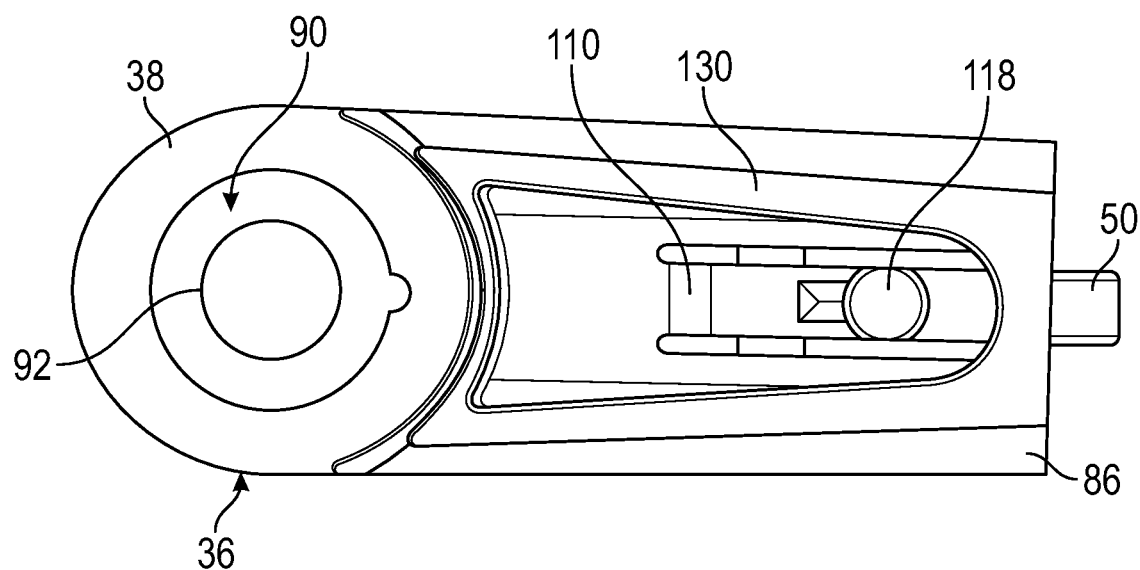
FIG. 14 illustrates a top view of a head according to one embodiment of the present invention.
Figure 21:
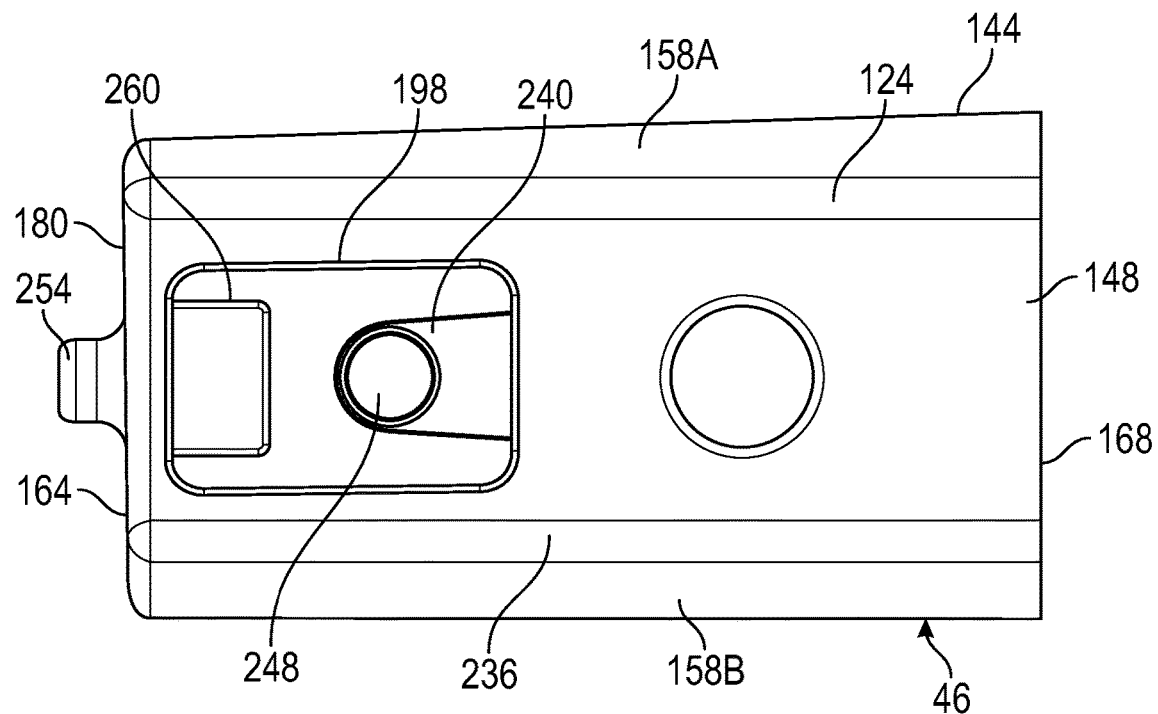
FIG. 21 illustrates a bottom view of the retention clip of FIG. 20 according to one embodiment of the present invention.
Figure 22:
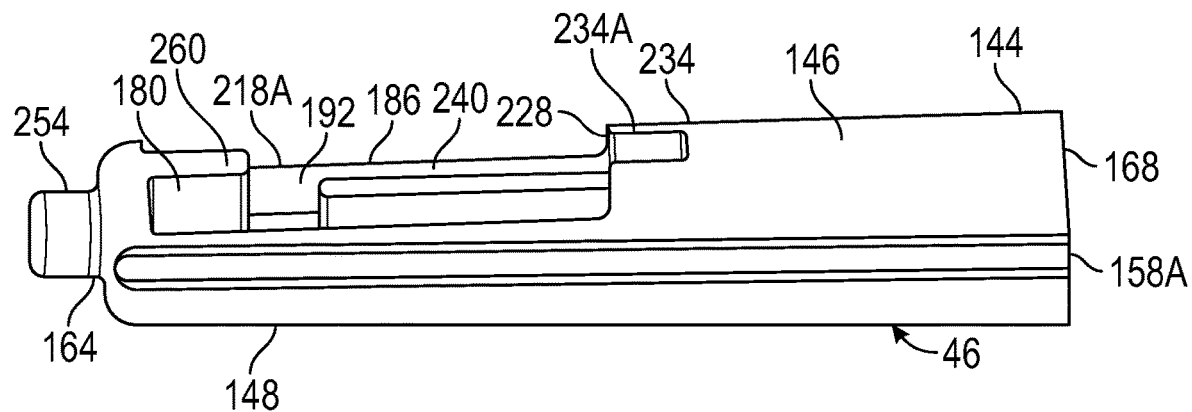
FIG. 22 illustrates a side view of the retention clip of FIG. 20 according to one embodiment of the present invention.
Figure 23:
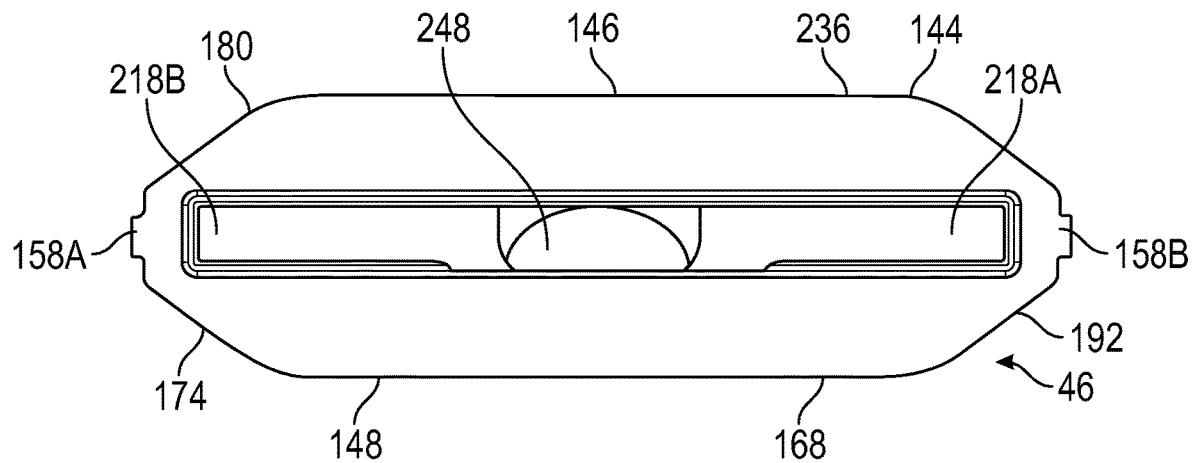
FIG. 23 illustrates an end view of the retention clip of FIG. 20 according to one embodiment of the present invention.

Referring to FIG. 14, the head 36 has a diving board feature 110 that is a living hinge with an angled retention embossment 118 which locks into the retention clip 46. The diving board feature 110 extends longitudinally in the second passageway 104 and extends past the first end wall 96. The portion 50 extending past the first end wall 96 acts as a releasing mechanism to remove the beam arm 32 from the head 36. The embossment 118, as shown in FIG. 19, is angled so that it allows the retention clip 46 to slide into the head 36 and flex the diving board 110 down and once a hole 124 (see FIG. 21) on the retention clip 46 fits completely over the embossment 118, the living hinge 110 presses the embossment 118 into the retention clip hole 124 to retain the retention clip 46 in the head 36. The diving board feature 110 is stopped by a bridge 130 that does not allow the diving board 110 to flex and yield, or break the part. The head 36 has a slot 84 on each side 134A, 134B of the head 36 with two pin hinges 60, 64 projecting from both edges 84B, 84C of the slot 84. This slot and pin 84, 60, 64 feature is on both sides of the head 36 for a passenger and driver side park head cover 40 to be attached. This is beneficial for different vehicles that have a park position on either the passenger side or the driver side of a vehicle. The slot 84 with the pin hinges 60, 64 acts, also, as the retention ledge 84A for the both the passenger and driver side head cover's retention feature 72 to lock on to.

An embodiment of the retention clip 46 is shown in FIGS. 20-25. The retention clip has a generally rectangular body 144 with a top surface 146, bottom surface 148, opposing side surfaces 158A, 158B, a front end surface 164, and a rear end surface 168. The body 144 has a generally rectangular slot 174 extending longitudinally into the body 144 through the rear surface 168 ending at a positive stop surface 180 spaced apart from the front surface 164. The top surface 146 has a generally rectangular cutout 186 extending to a bottom surface 192 of the slot 174. A generally rectangular opening 198 extends from the bottom surface 192 of the slot 174 through the bottom surface 148 of the retention clip 46. The retention embossment hole 124 extends through the bottom surface 148 of the retention clip 46 and through the bottom surface 192 of the slot 174. The retention embossment hole 124 is configured to matingly engage with the embossment 118 of the head 36. The retention clip 46 is made of a material such as plastic. The retention clip 46 is integral, unitary, and one-piece.

As shown in FIGS. 20-25, the cutout 186 comprises a front wall which is the positive stop surface 180, opposing side walls 218A, 218B, and a rear wall 228 having a generally rectangular recessed notched portion 234. The opposing sidewalls 218A, 218B extend to form opposing sidewalls of the generally rectangular slot 174. The slot 174 further comprises a top surface 236 which extends from the slot 174 opening on the rear surface 168 to the side walls forming the notch 234 in the cutout 186.

Figure 24:
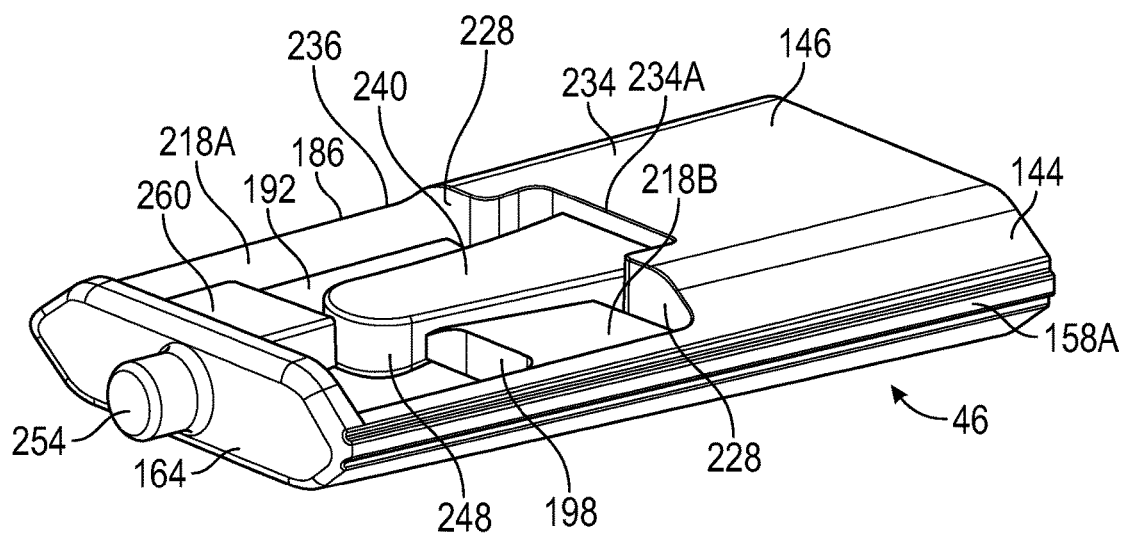
FIG. 24 illustrates a perspective view of the retention clip of FIG. 20 according to one embodiment of the present invention.
Figure 25:
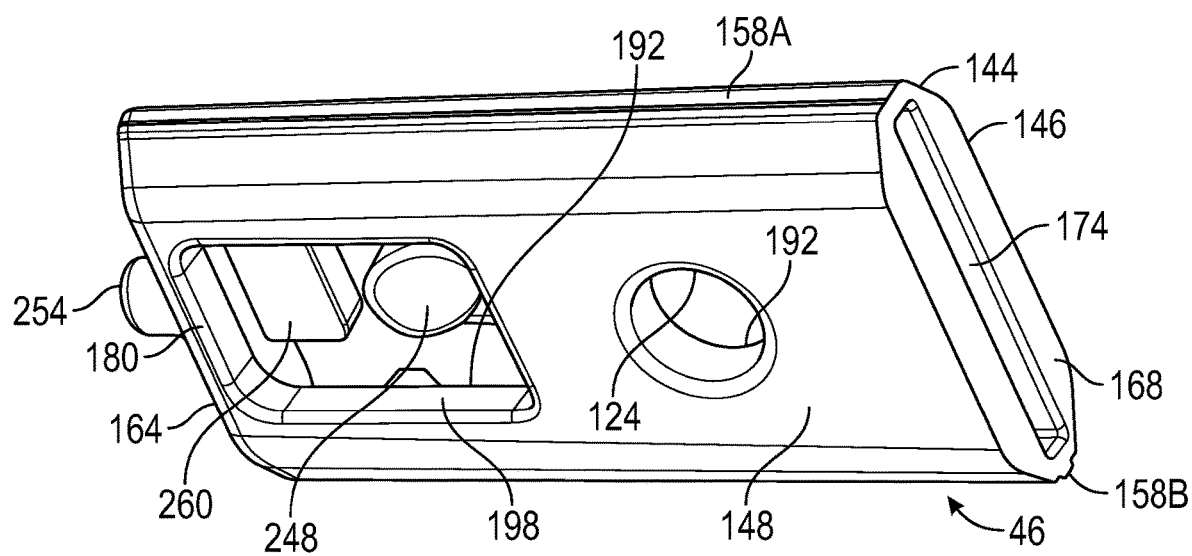
FIG. 25 illustrates a perspective view of the retention clip of FIG. 20 according to one embodiment of the present invention.
Figure 26:
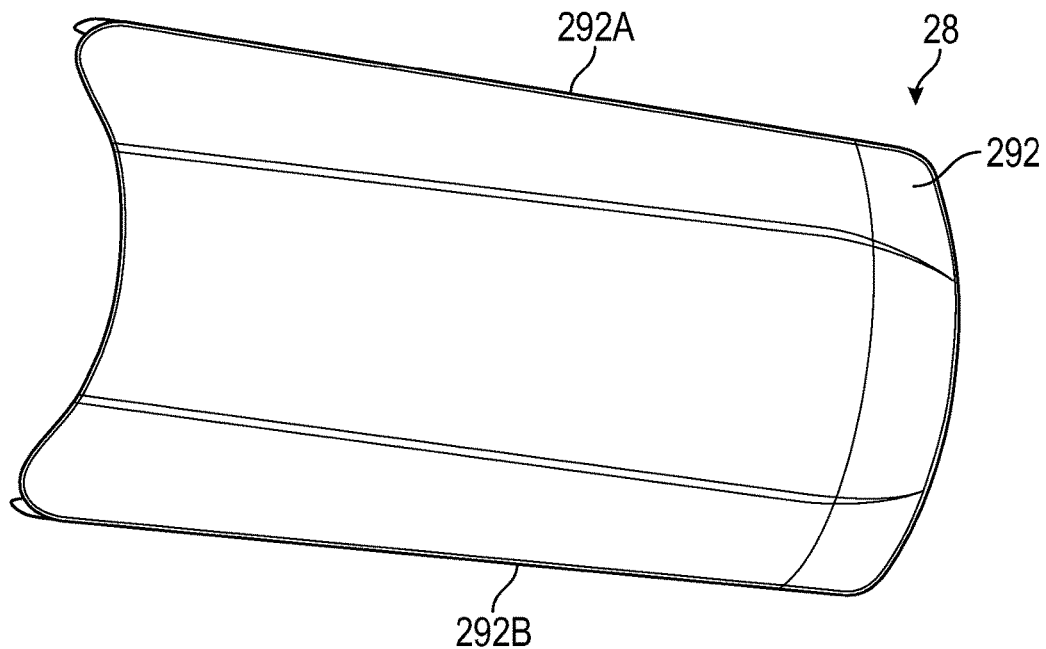
FIG. 26 illustrates a top view of an adapter according to one embodiment of the present invention.

Referring to FIG. 24, an oblong boss 240 projects from a rear surface 234A of the notched portion 234 and joined to the rear surface 234A by a living hinge. An angled retention embossment 248 projects generally perpendicularly away from a bottom surface of the oblong boss 240 orientated towards the bottom 148 of the retention clip 46. The oblong boss 240 flexes due to the living hinge when the beam arm 32 is slid into the retention clip 46 and locks into a hole 44 in the beam arm 32 when a desired distance is met.

Also shown in FIG. 24, the retention clip 46 has a positive stop 254 on the exterior end 164 to indicate a stopping point for the retention clip 46 when inserted into the head 36. As illustrated in the Figures, the positive stop 254 has a generally cylindrical shaped boss projecting from the front surface 164 of the retention clip 46. However, any suitable shape and size of a positive stop 254 suitable for an intended application may be used. Alternatively, the front surface 164 of the retention clip may be configured to be the positive stop 254 if a projecting boss is omitted. A retention tab 260 is shown projecting inward from the front end wall 180 of the cutout 186 which retains the beam arm within the slot 174 in the area of the cutout 186. As shown the retention tab 260 has a generally rectangular shape. However, any suitable size or shape retention tab 260 suitable for an intended application may be used.

Figure 27:
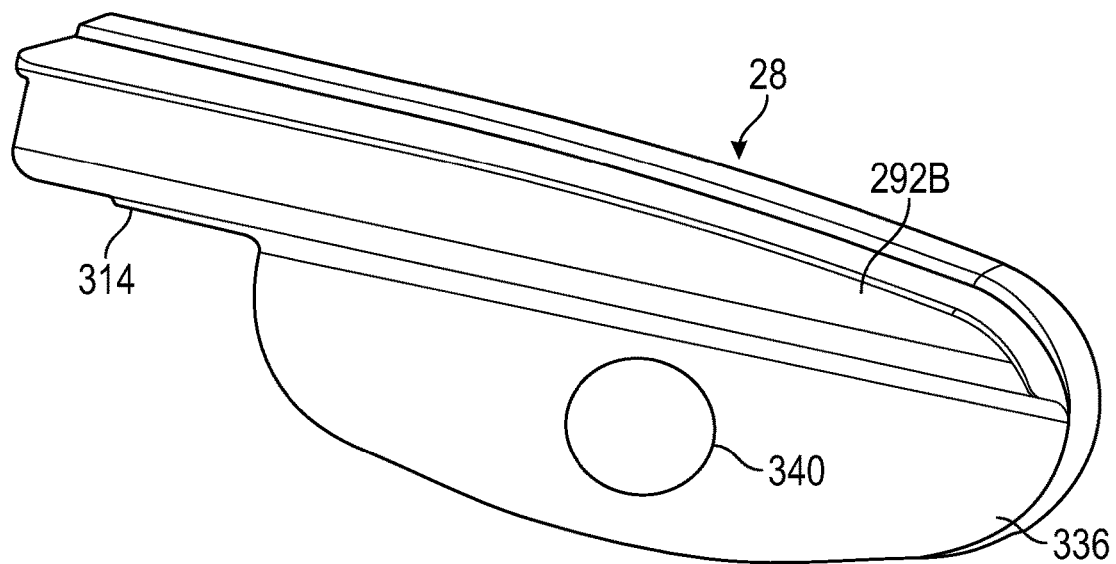
FIG. 27 illustrates a side view of the adapter of FIG. 26 according to one embodiment of the present invention.
Figure 28:
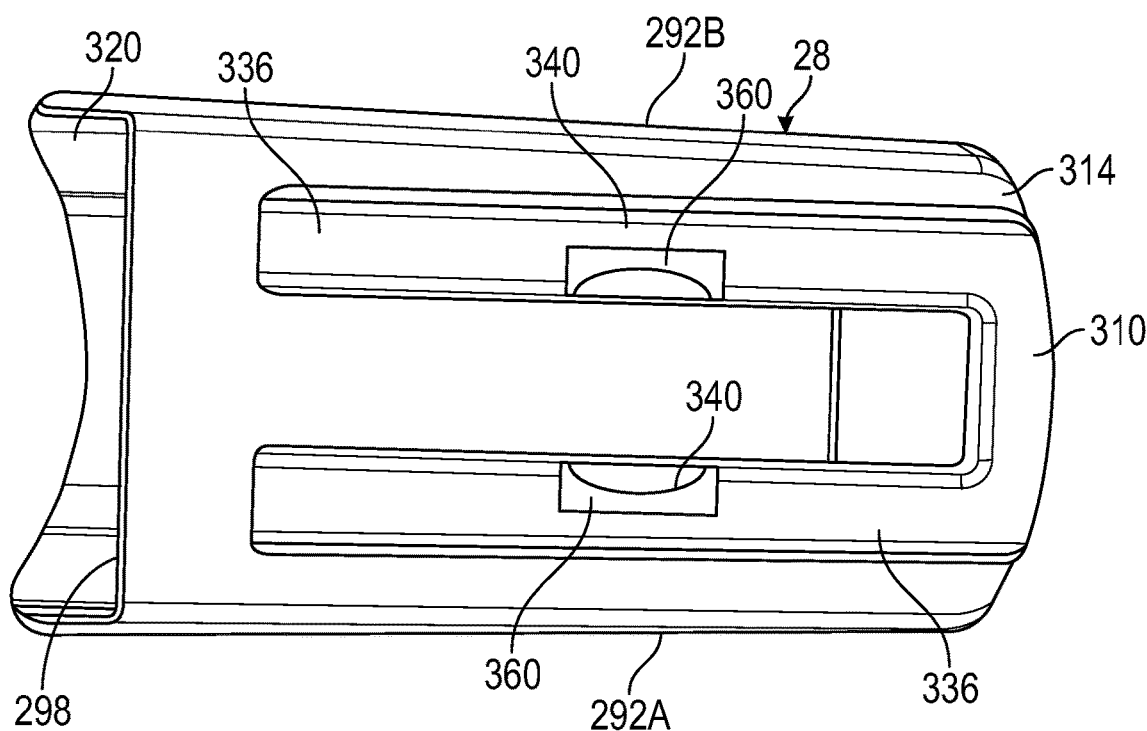
FIG. 28 illustrates a bottom view of the adapter of FIG. 26 according to one embodiment of the present invention.
Figure 29:
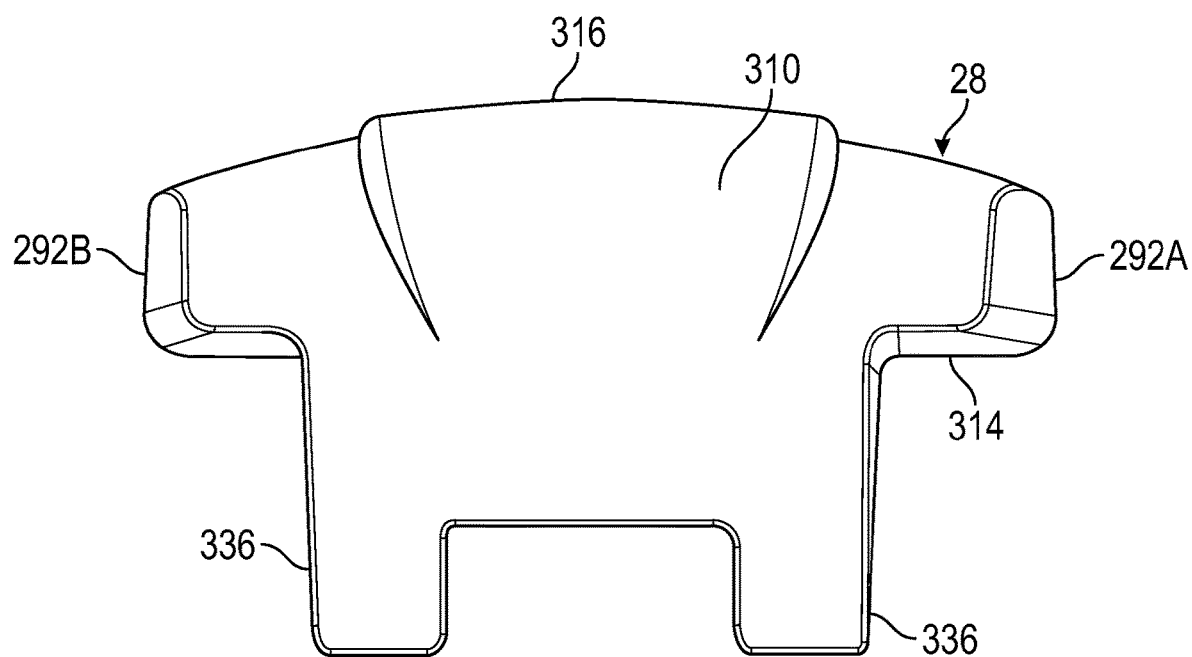
FIG. 29 illustrates an end view of the adapter of FIG. 26 according to one embodiment of the present invention.
Figure 30:
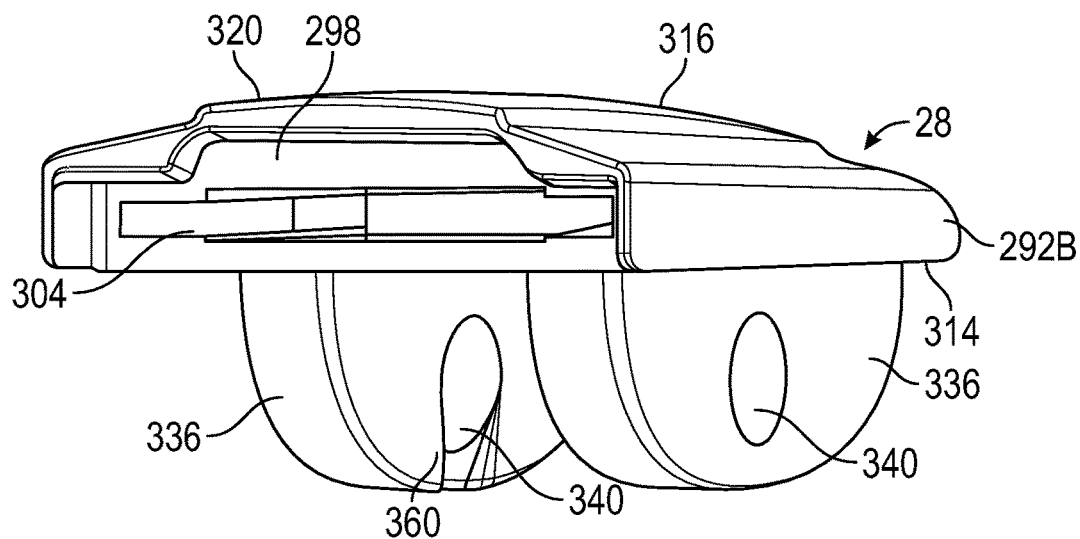
FIG. 30 illustrates a perspective view of the adapter of FIG. 26 according to one embodiment of the present invention.
Figure 31:
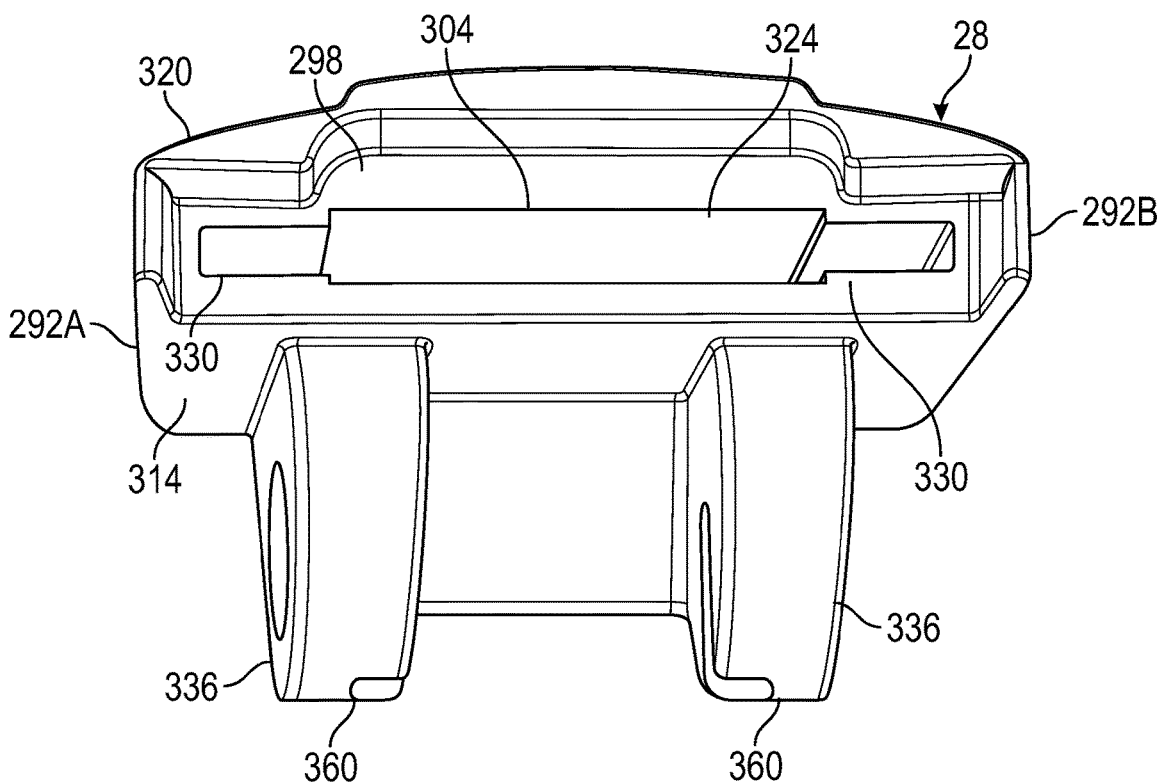
FIG. 31 illustrates an end view of the adapter of FIG. 26 according to one embodiment of the present invention.

An embodiment of the adapter 28 for the wiper arm 24 is shown in FIGS. 26-31. The adapter 28 has an elongated main body 292 having a generally rectangular shape and molded out of a plastic material. The main body comprises opposing side walls 292A, 292B, an end wall 298 with a generally rectangular slot opening 304 extending into the main body 292, an opposing end wall 310, a bottom wall 314, and a top wall 316. As shown in FIG. 28, the end wall 298 has a lip 320 where the top wall 316 extends past the end wall 298. The slot 304 has a generally rectangular profile on the end wall 298 with a central section 324 having a larger opening size than side sections 330. The shape of the slot 304 may be any configuration suitable for an intended application. As will be described below, the slot 304 is configured to matingly engage with the beam arm 32. The adapter 28 has a stepped design on the top surface 316 to complement the shape of the beam arm 32. A pair of legs 336 project away from the bottom wall 314 and having a general arcuate shape as illustrated in FIG. 27. The legs 336 generally have a U-shape as shown in FIG. 28. Each leg 336 has a retaining hole 340 passing through the leg 336 generally parallel to the bottom surface 314 of the adapter 28 with the center of both retaining holes 340 aligned on a common axis. The retaining holes 340 are configured to snap into a trunnion coupler 356 which allow the adapter 28 to retain and rotate about the trunnion coupler 356 (see FIGS. 44 and 47). The retaining holes 340 on the adapter 28 have lead-in channels 360 that allow for trunnions 366 on the coupler 356 to guide into the holes 340 and snap in, securing the adapter 28 to the coupler 356. The adapter 28 is made of a material such as plastic. The adapter 28 is integral, unitary, and one-piece.

Figure 32:
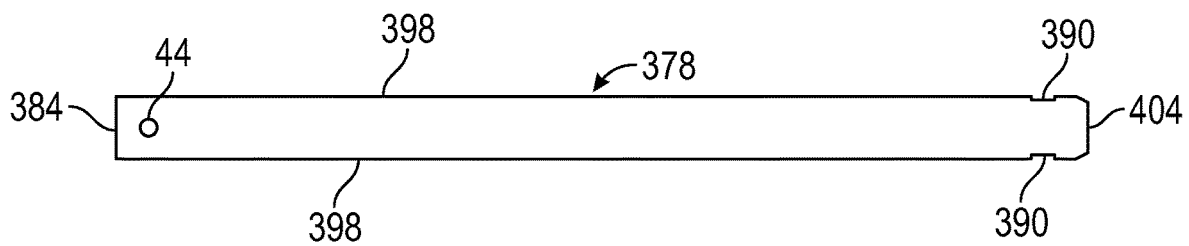
FIG. 32 illustrates a view of a beam arm insert according to one embodiment of the present invention.

FIGS. 32 and 33 show a beam arm insert 378 which is generally an elongated stamped metal insert having a hole 44 near a first end 384 and a pair of notches 390 in side edges 398 near a second end 404. After the second end 404 is inserted into the slot 304 of the adapter 28, a heat stake process melts plastic in the area of the notches 390 which retains the end 404 of the beam arm insert 378 within the adapter 28. The beam arm insert 378 has an arm spline thickness to width ratio of about 15.5:1.

Figure 35:
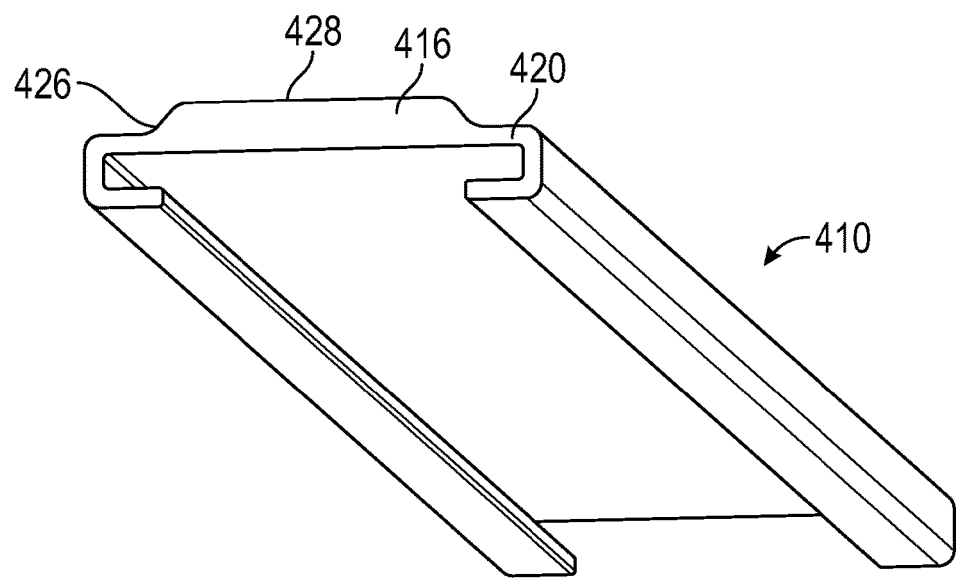
FIG. 35 illustrates a perspective view of the airfoil of FIG. 34 according to one embodiment of the present invention.
Figure 36:
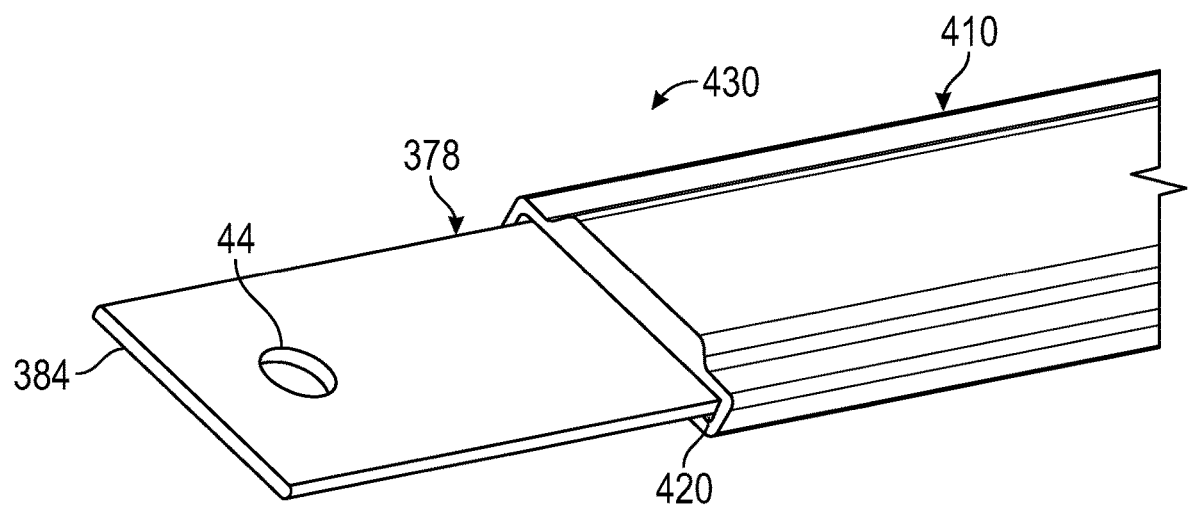
FIG. 36 illustrates a perspective view of the arm beam insert of FIG. 32 assembled with the airfoil of FIG. 34 according to one embodiment of the present invention.

[An airfoil 410 is shown in FIGS. 34 and 35 having an elongated C-shape body 416 with a slot 420 running the length of the body 416. The airfoil 410 is made of a material such as plastic. The airfoil 410 is integral, unitary, and one-piece. The embodiment of the airfoil 410 shown includes a stepped design, or stepped contour 426 on a top surface 428. The slot 420 is sized and configured to matingly accept the beam arm insert 378 when the beam arm insert 378 is slid into the slot 420 in a longitudinal direction. FIG. 36 shows the first end 384 of the beam arm insert 378 assembled with the airfoil 410 to form a beam arm spline 430. The second end 404 of the beam arm insert 378 assembled with the airfoil 410 is not shown, however, a portion of the beam arm insert extends past the airfoil 410 in a similar manner as shown in FIG. 36.

Figure 37:
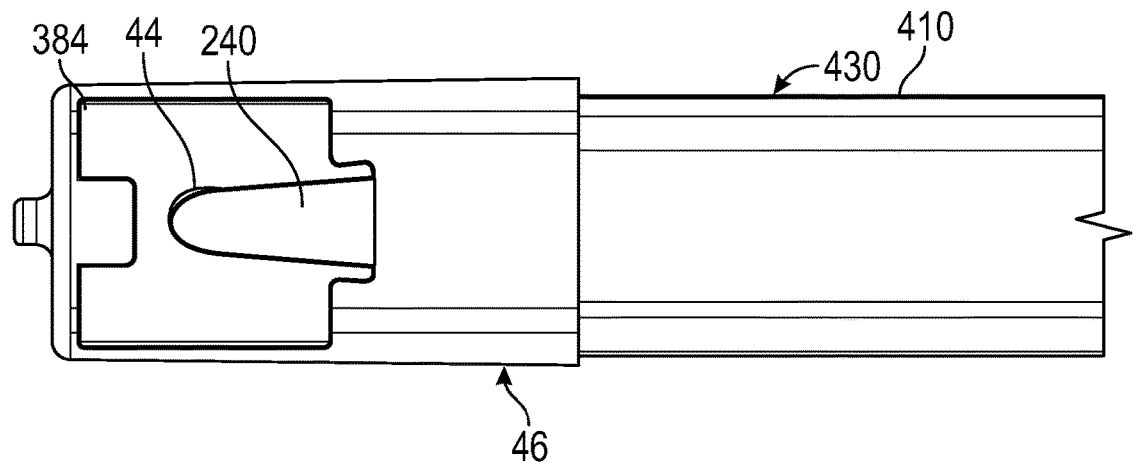
FIG. 37 illustrates a top view of the retention clip of FIG. 20 assembled with the beam arm of FIG. 36 according to one embodiment of the present invention.
Figure 38:
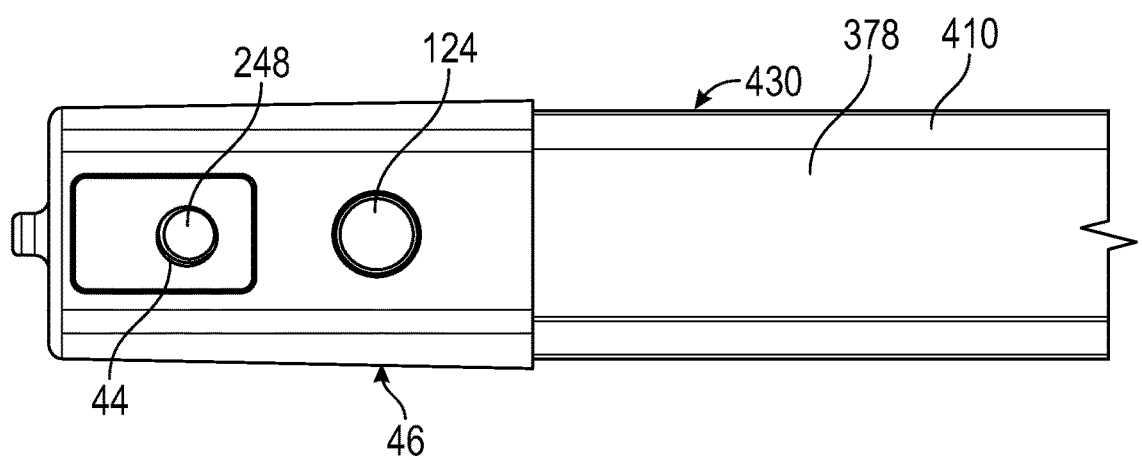
FIG. 38 illustrates a bottom view of the beam arm assembly of FIG. 37 according to one embodiment of the present invention.
Figure 39:
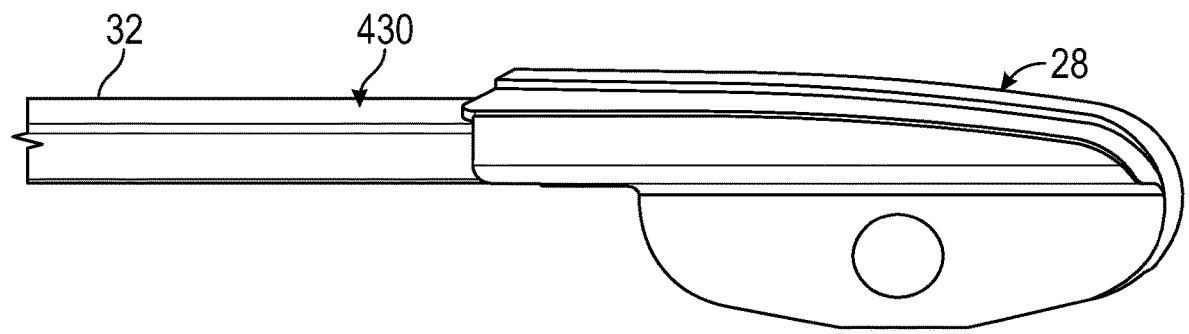
FIG. 39 illustrates a side view of the beam arm assembly of FIG. 38 assembled with the adapter of FIG. 26 according to one embodiment of the present invention.
Figure 40:
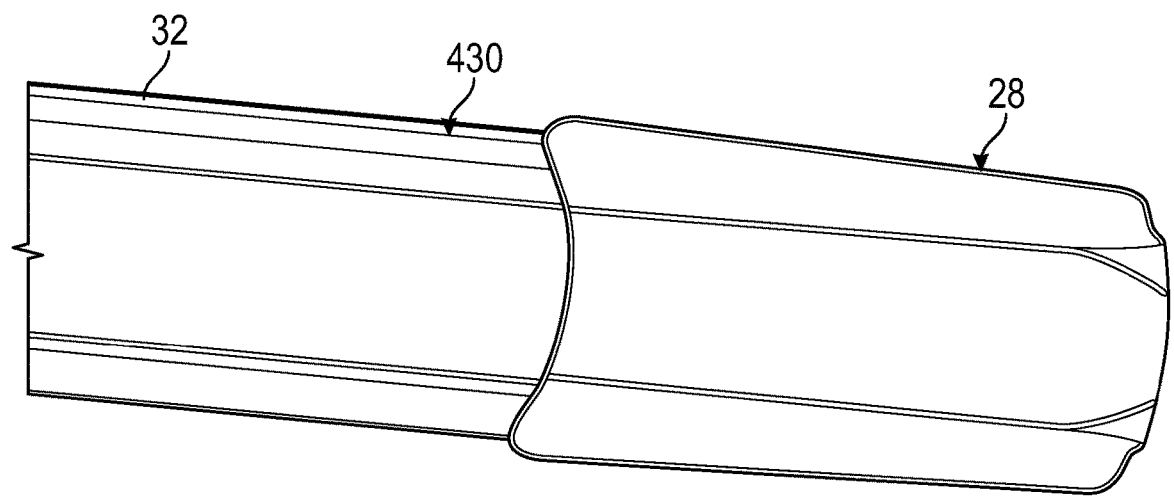
FIG. 40 illustrates a top view of the beam arm assembly of FIG. 39 according to one embodiment of the present invention.
Figure 41:
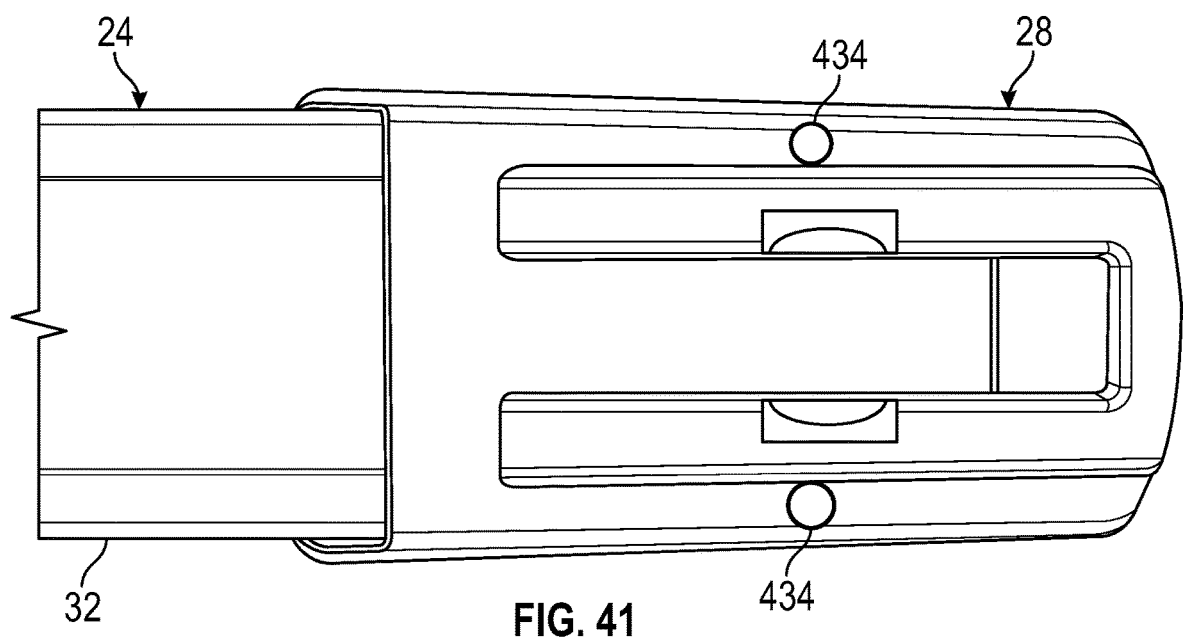
FIG. 41 illustrates a bottom view of the beam arm assembly of FIG. 39 according to one embodiment of the present invention.
Figure 42:
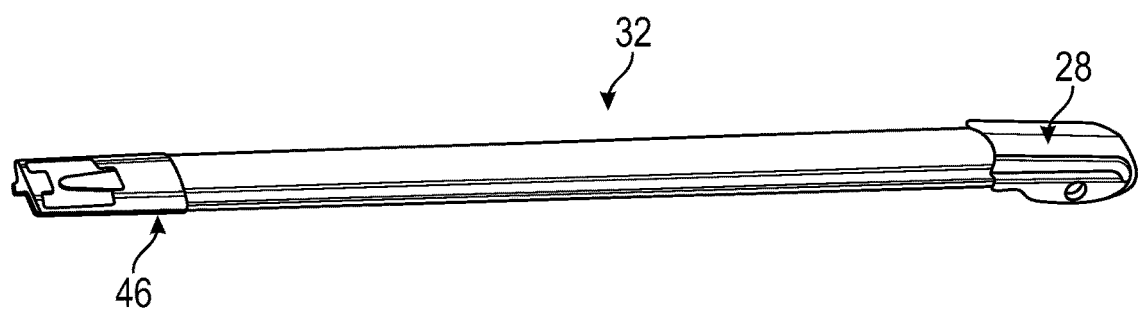
FIG. 42 illustrates a perspective top view of the beam arm assembly of FIG. 41 according to one embodiment of the present invention.
Figure 43:
FIG. 43 illustrates a bottom view of the beam arm assembly of FIG. 42 according to one embodiment of the present invention.

The first end 384 of the beam arm spline 430 is inserted into the slot 174 in the retention clip 46 until angled retention embossment 248 enters the hole 44 in the beam arm insert 378 as illustrated in FIGS. 37 and 38. The second end 404 of the beam arm spline 430 is inserted into the slot 304 in the adapter 28 as shown in FIGS. 39 and 40. The adapter 28 and beam arm spline assembly 430 is heat staked at two locations 434 (shown in FIG. 41) which align with the position of the notches in the beam arm insert 378. This heat stake process positively locks the adapter 28 onto the beam arm spline assembly 430. The assembled beam arm 32 is shown in FIGS. 42-43 which comprises the retention clip 46 and the adapter 28 assembled with the beam arm spline 430.

Figure 44:
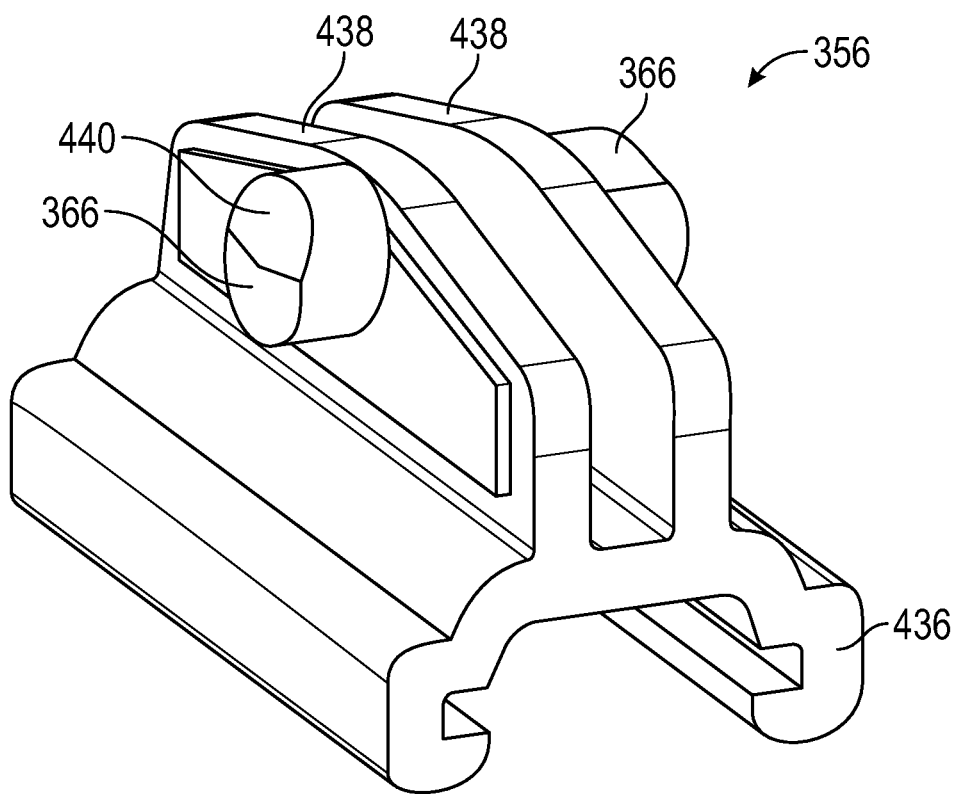
FIG. 44 illustrates a perspective view of a coupler according to one embodiment of the present invention.
Figure 45:
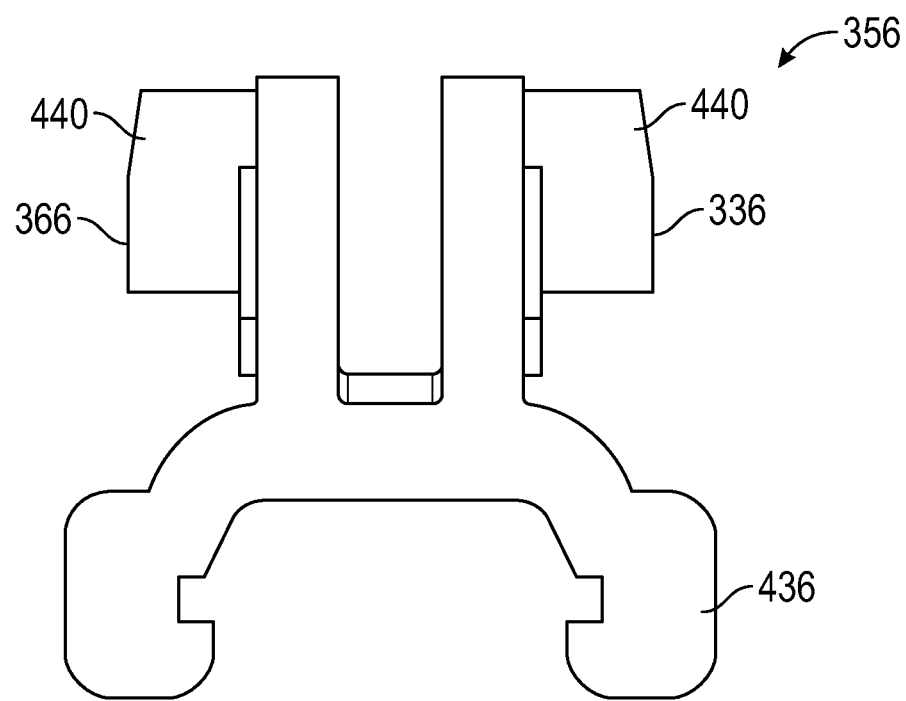
FIG. 45 illustrates an end view of the coupler of FIG. 44 according to one embodiment of the present invention.
Figure 46:
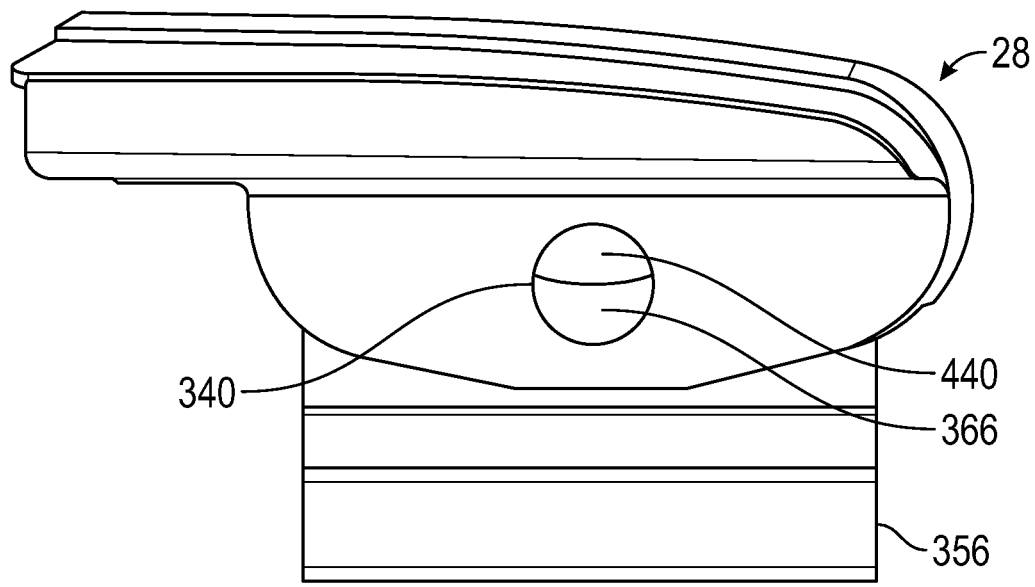
FIG. 46 illustrates a side view of the adapter of FIG. 26 assembled with the coupler of FIG. 44 according to one embodiment of the present invention.
Figure 47:
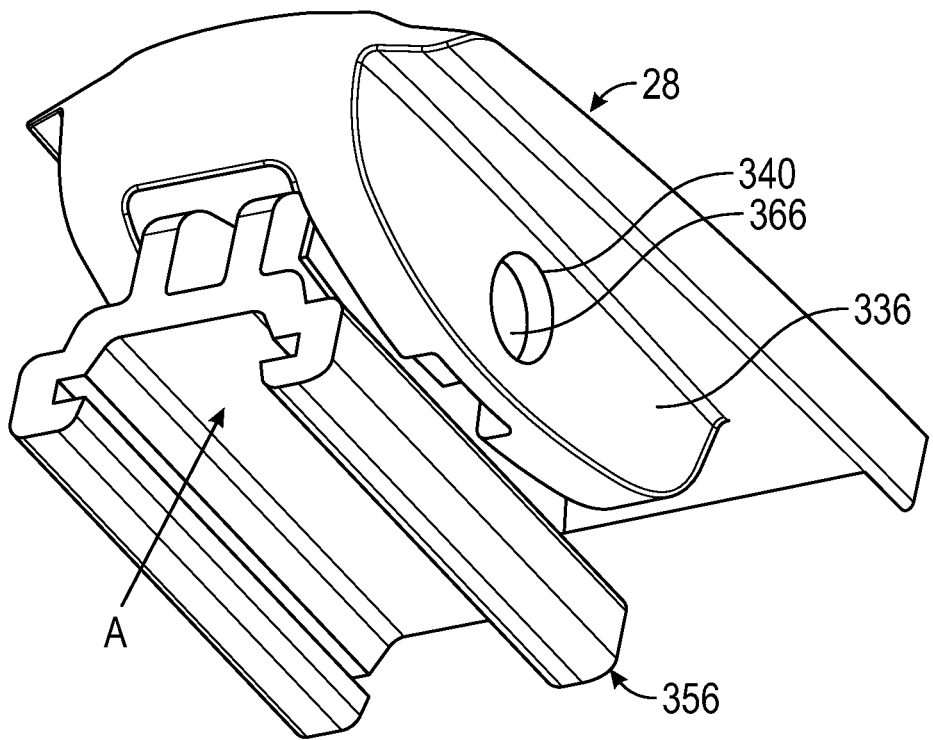
FIG. 47 illustrates a perspective view of the adapter and coupler assembly of FIG. 46 according to one embodiment of the present invention.
Figure 48:
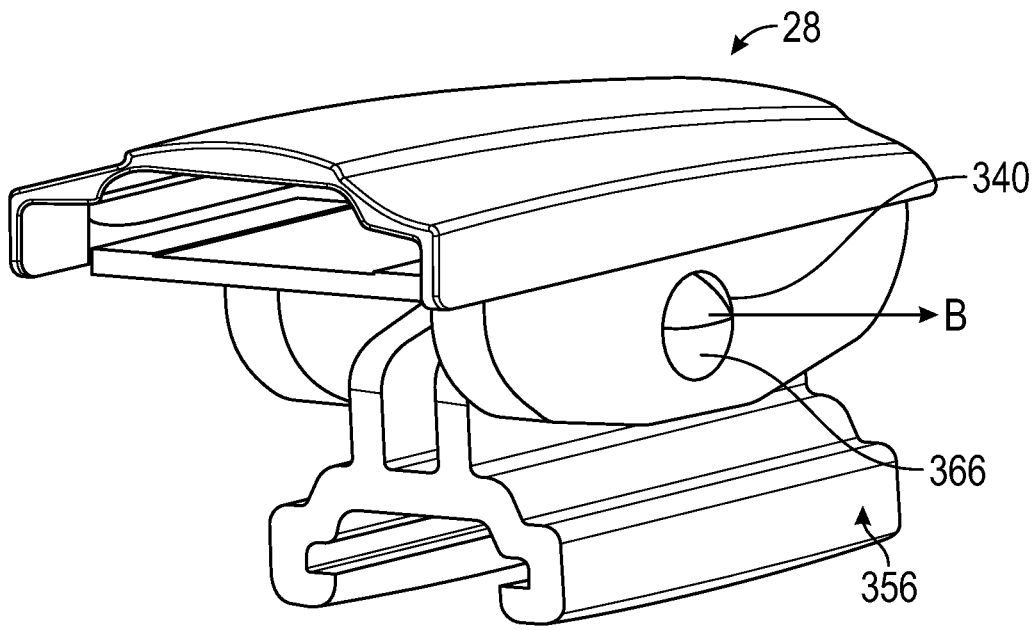
FIG. 48 illustrates a perspective view of the adapter and coupler assembly of FIG. 47 according to one embodiment of the present invention.
Figure 49:
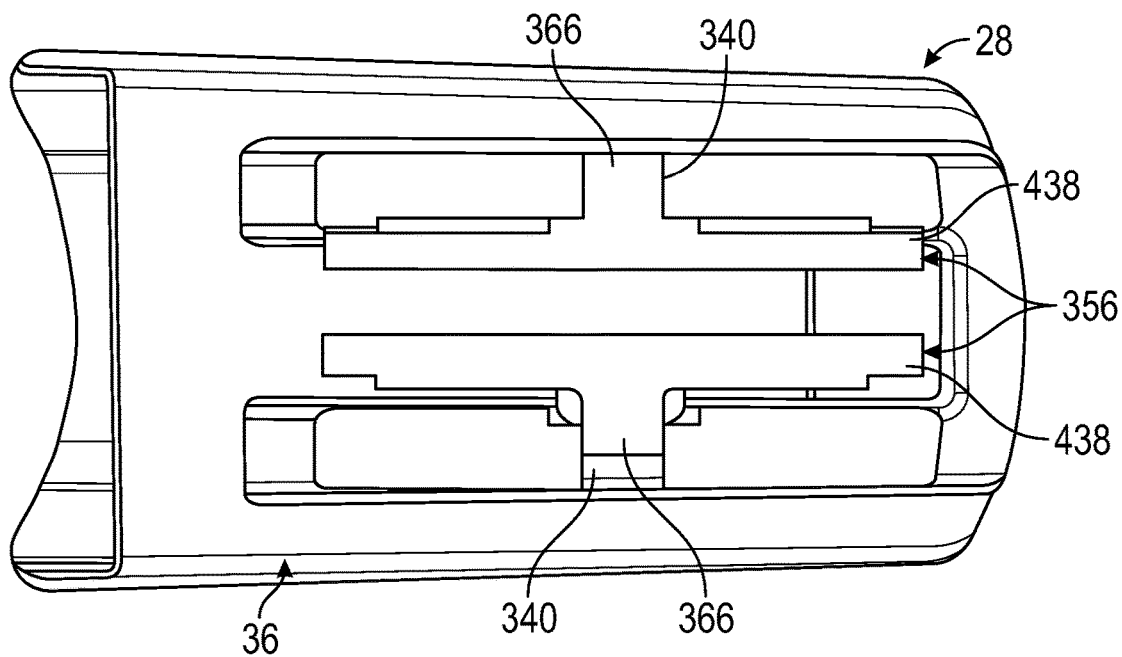
FIG. 49 illustrates a bottom view of the adapter and coupler assembly of FIG. 48 according to one embodiment of the present invention.
Figure 50:
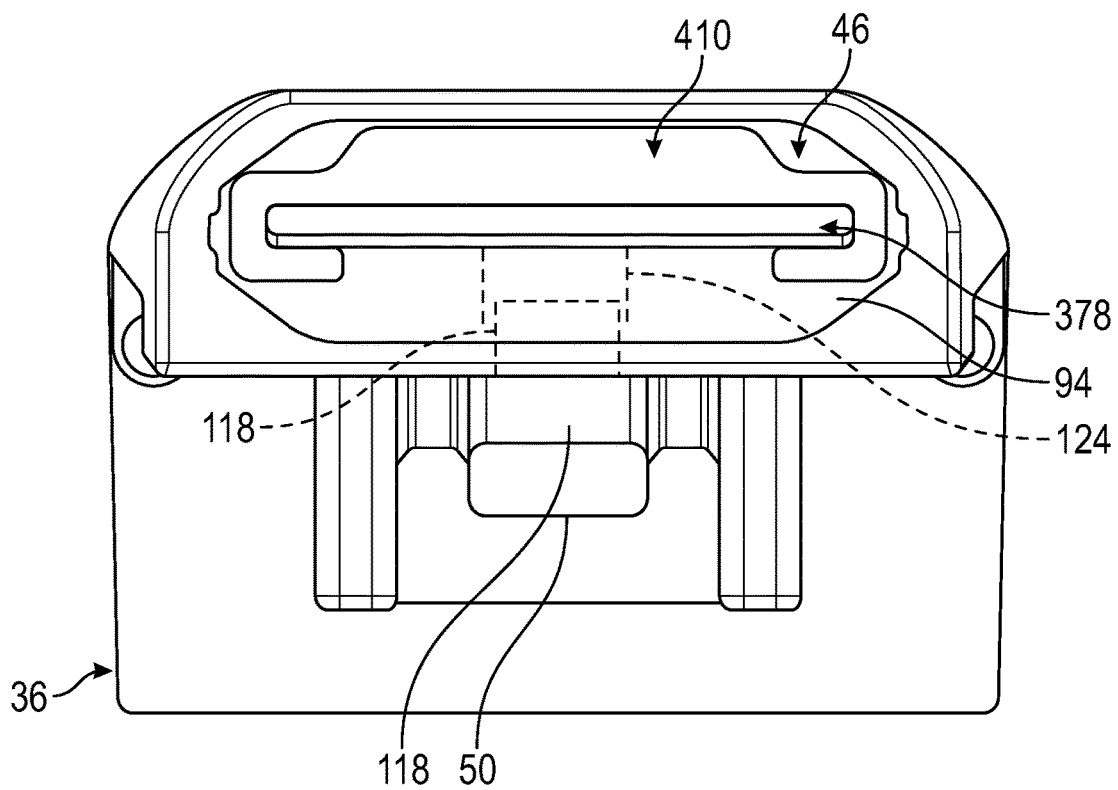
FIG. 50 illustrates a cross-sectional end view of the head of FIG. 14 assembled with the beam arm assembly of FIG. 37 according to one embodiment of the present invention.

The coupler 356 is illustrated in FIGS. 44 and 45. The assembly of the coupler 356 with the adapter 28 is shown in FIGS. 46-49. The coupler 356 has a generally C-shaped portion 436 configured to matingly engage with and support a wiper blade 26. Two legs 438 extend away from the C-shaped portion 436 with each leg 438 having a trunnion 366 projecting outward as illustrated in the embodiment of FIG. 44. Each trunnion 366 has a tapered edge 440 for ease of assembly with the adapter 28. The coupler 356 is made of a material such as plastic. The coupler 356 is integral, unitary, and one-piece. As illustrated in FIG. 47, when the coupler 356 is inserted between legs 336 on the adapter 28 (shown by Arrow A), the trunnion 366 slides up the taper 360 leading to the adapter holes 340. When the trunnion 366 aligns with the adapter hole 340, the trunnion latches into the hole 340 (shown by Arrow B in FIG. 48) to positively lock the coupler 356 with the adapter 28. As illustrated in FIG.

49, the trunnion 366 may extend through the hole 340 in the adapter 28 or may partially extend through the hole 340 in the adapter 28. The adapter 28 freely rotates around the trunnions 366 of the coupler 356 when assembled.

Figure 51:
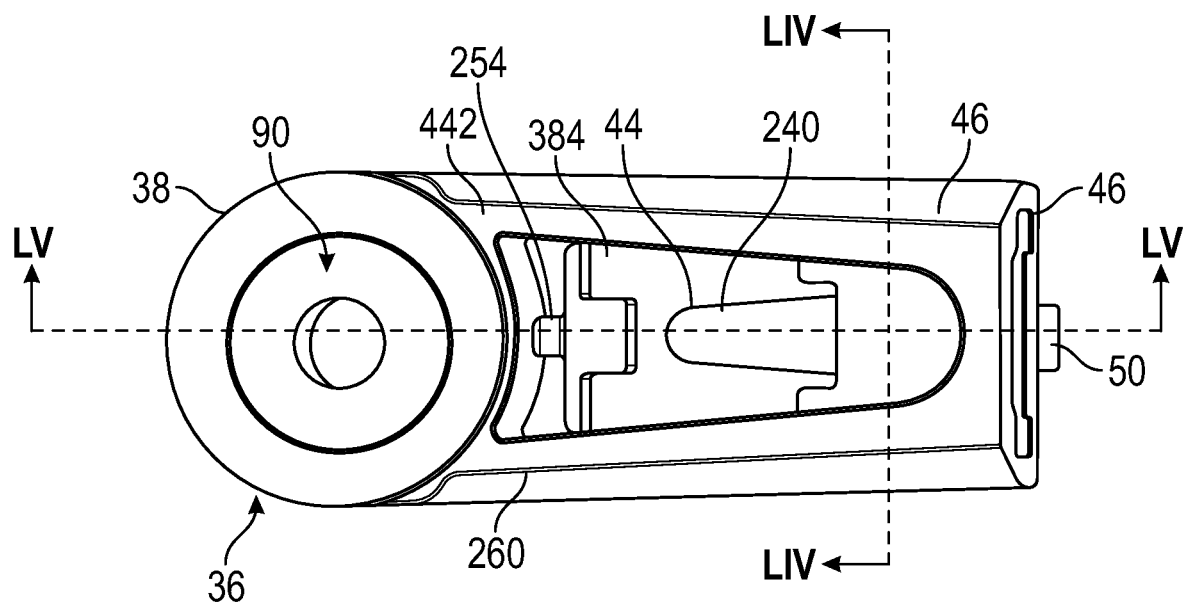
FIG. 51 illustrates a top view of the head assembly of FIG. 50 according to one embodiment of the present invention.
Figure 52:
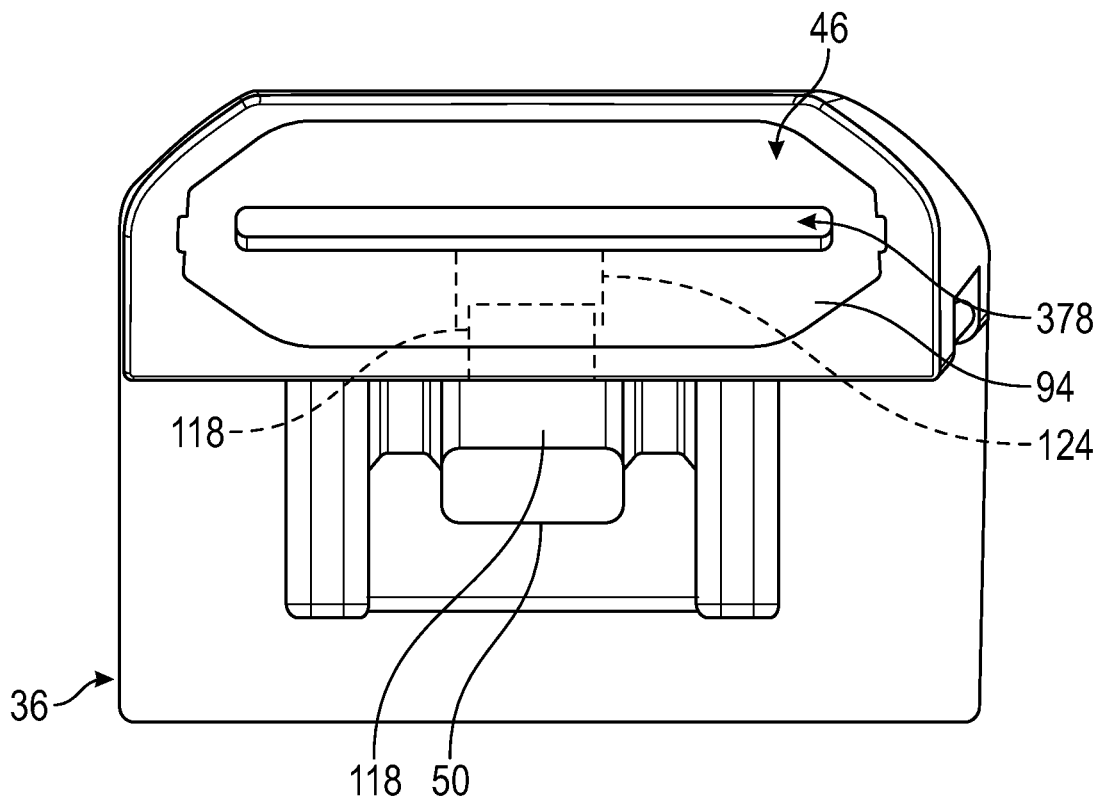
FIG. 52 illustrates a cross-sectional end view of the head assembly of FIG. 50 with the airfoil omitted according to one embodiment of the present invention.
Figure 53:
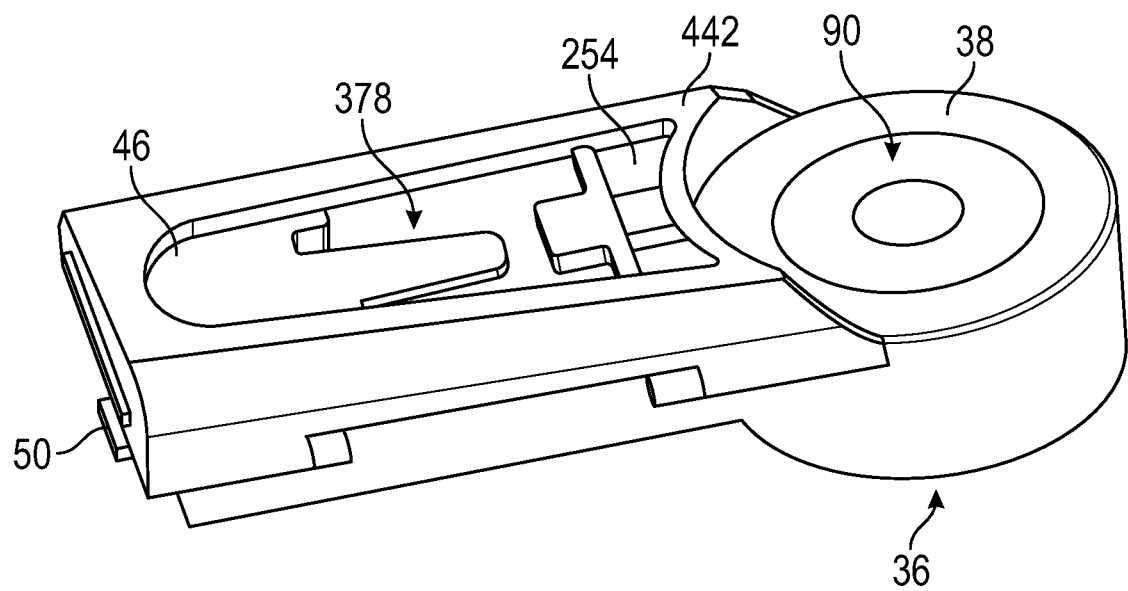
FIG. 53 illustrates a perspective view of the head assembly of FIG. 50 according to one embodiment of the present invention.
Figure 54:
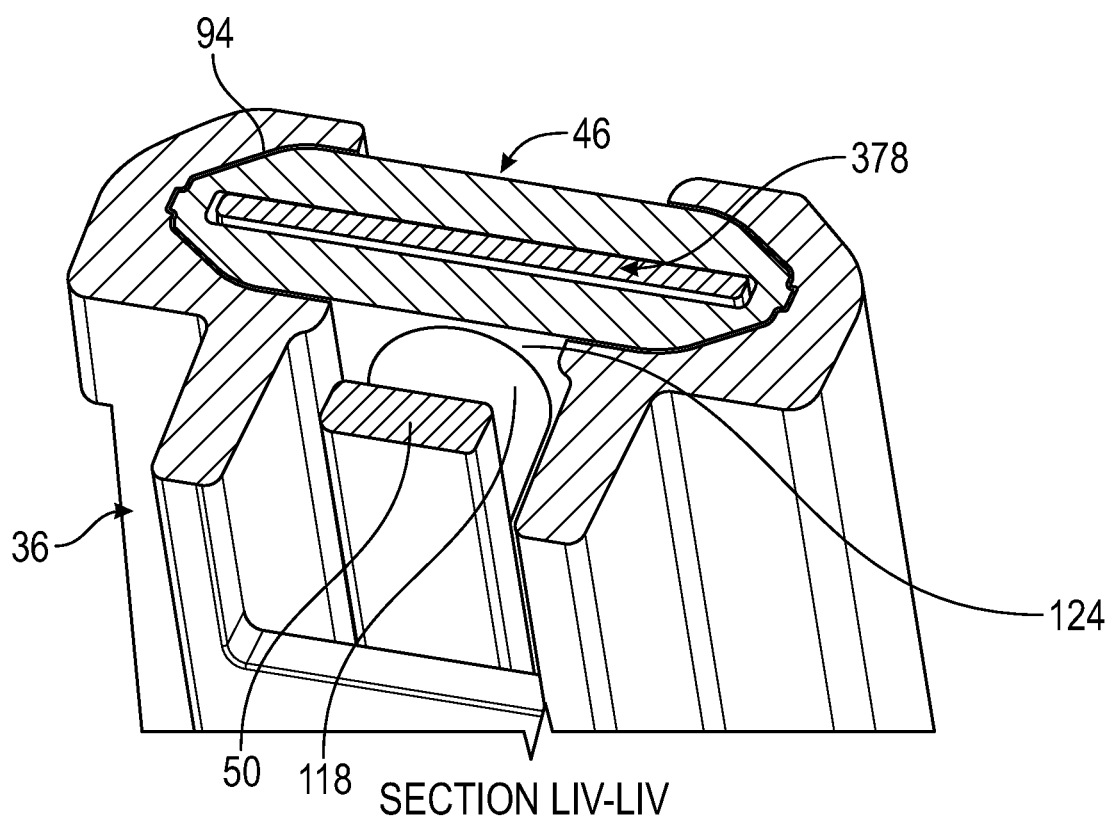
FIG. 54 illustrates a cross-sectional view LIV-LIV of the head assembly of FIG. 51 according to one embodiment of the present invention.

The beam arm 32 is shown with the retention clip 46 inserted into the slot 94 in the head 36 in FIGS. 50-55. Shown in the cross-sectional view of FIGS. 50, 52, and 54, when the retention clip 46 is inserted into the slot 94 in the head 36, the embossment 118 slides into the retention clip hole 124 to lock the retention clip 46 in the head 36. The retention clip 46 is inserted into the slot 94 until the positive stop 254 on the retention clip 46 contacts a head stop surface 442 as shown in FIGS. 51 and 53. In the cross-sectional view of FIG. 55, the head 36, retention clip 46, and beam arm insert 378 are shown in a locked position. The retention embossment 118 is inserted into the retention clip hole 124. The retention embossment has a tapered lead-in surface 444. The positive stop 254 of the retention clip 46 is positioned in contact with the head stop surface 442. Actuating the release mechanism 50 by moving the release mechanism 50 away from the head 36 as shown by Arrow C in FIG. 55 pulls the retention embossment 118 out of the retention clip hole 124 which allows for the removal of the beam arm 32 from the head 36 for servicing the wiper blade 26.

Figure 56:
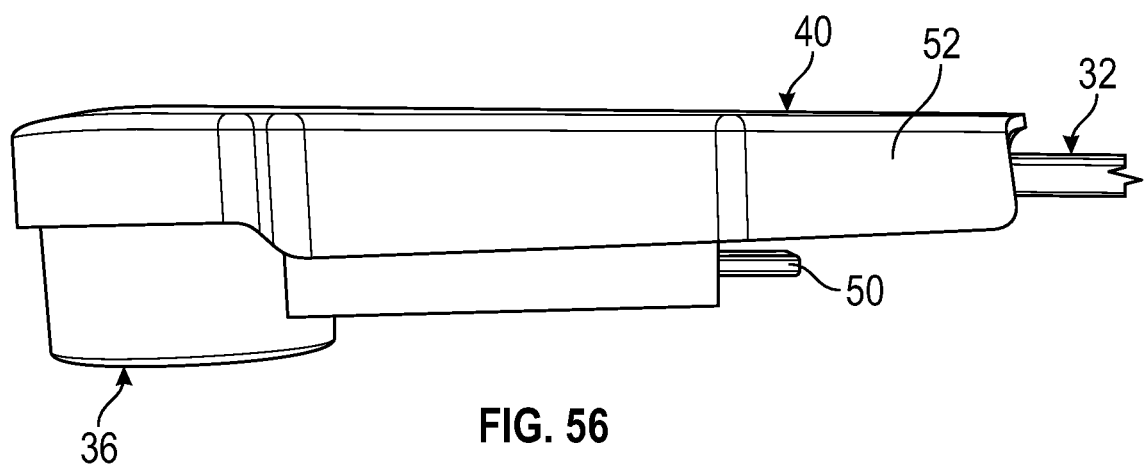
FIG. 56 illustrates a side view of the head assembly of FIG. 7 according to one embodiment of the present invention.
Figure 57:
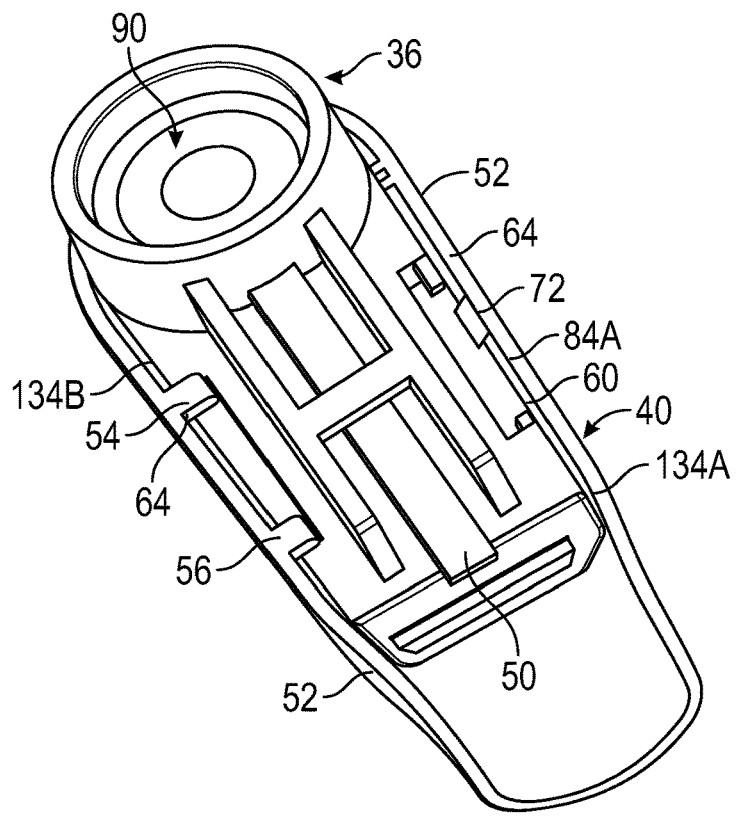
FIG. 57 illustrates a perspective view of a head and cover assembly according to one embodiment of the present invention.
Figure 58:
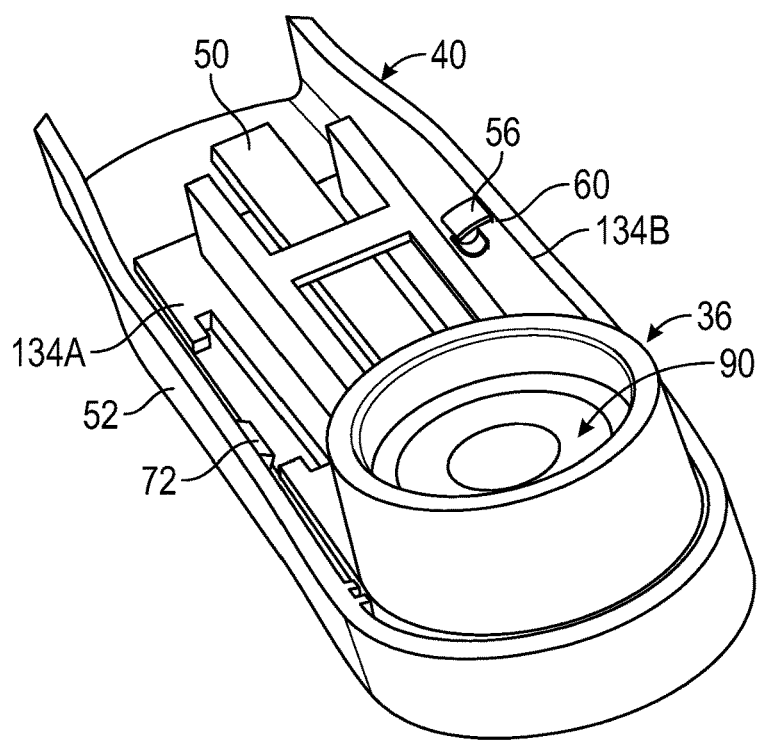
FIG. 58 illustrates a perspective view of the head and cover assembly of FIG. 57 according to one embodiment of the present invention.
Figure 59:
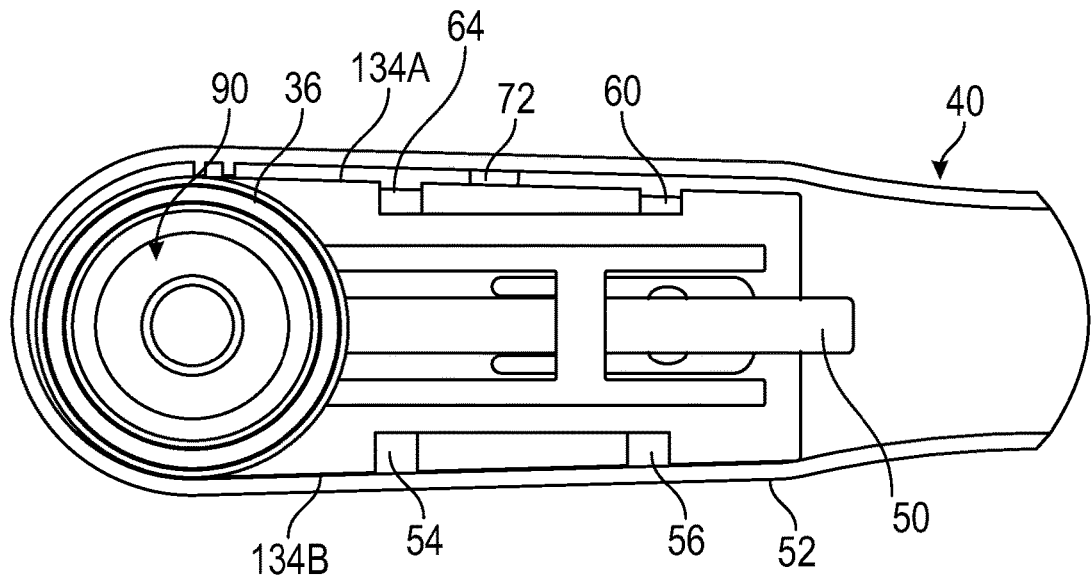
FIG. 59 illustrates a bottom view of the head and cover assembly of FIG. 57 according to one embodiment of the present invention.
Figure 60:
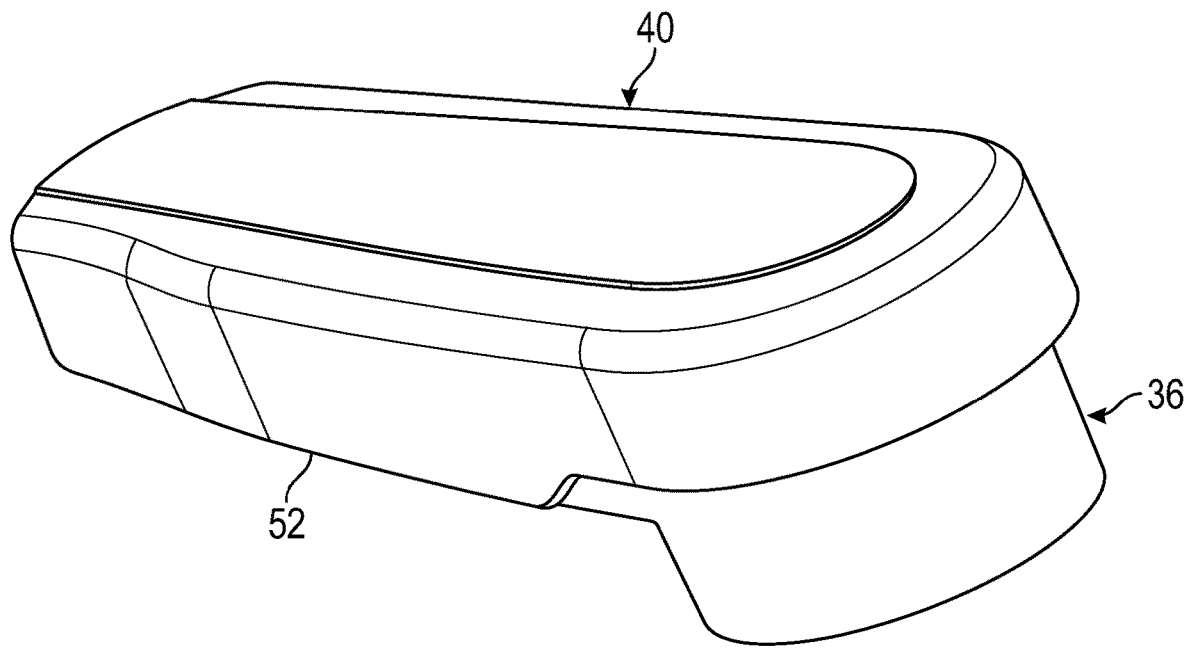
FIG. 60 illustrates a perspective view of the head and cover assembly of FIG. 57 according to one embodiment of the present invention.

The assembly of the cover 40 with the head 36 is illustrated in FIGS. 56-63. FIG. 56 shows a side view of the head 36 and beam arm 32 assembled with the cover 40. The head 36 and the cover 40 are shown in FIGS. 57-59 illustrating the loop 54 and the claw 56 rotatably coupled with pin hinges 60, 64 on one side 134B of the head 36 and the retention bump feature 72 engaged with an upper surface 84A of the hinge pin slot 84 on the opposing side 134A of the head 36. In another embodiment (not shown) of the cover 40, the loop 54 and the claw 56 may connect to the pin hinges 60, 64 on side 134A of the head 36 and the retention bump feature 72 may engage with the upper surface 84A of the hinge pin slot 84 on side 134B of the head 36. The slot 84 and hinge pins 60, 64 is on both sides 134A, 134B of the head 36 allow for a passenger side park head cover (not shown) and driver side park head cover 40 to be attached. This is beneficial for different vehicles that have a park position on either the passenger side or the driver side of a vehicle. The slot 84 with the pin hinges 60, 64 acts, also, as the retention ledge 84A for the both the passenger side and driver side head cover's 40 retention feature 72 to lock onto.

Figure 61:
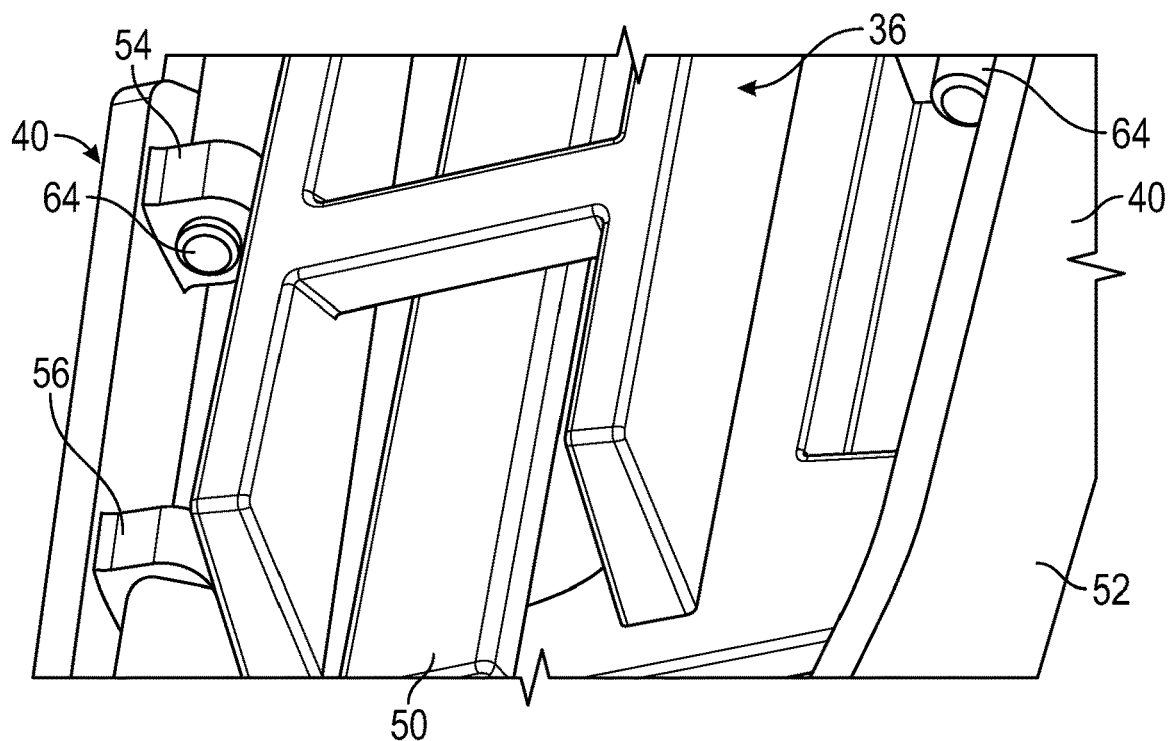
FIG. 61 illustrates a partial perspective view of the head and cover assembly of FIG. 57 according to one embodiment of the present invention.
Figure 62:
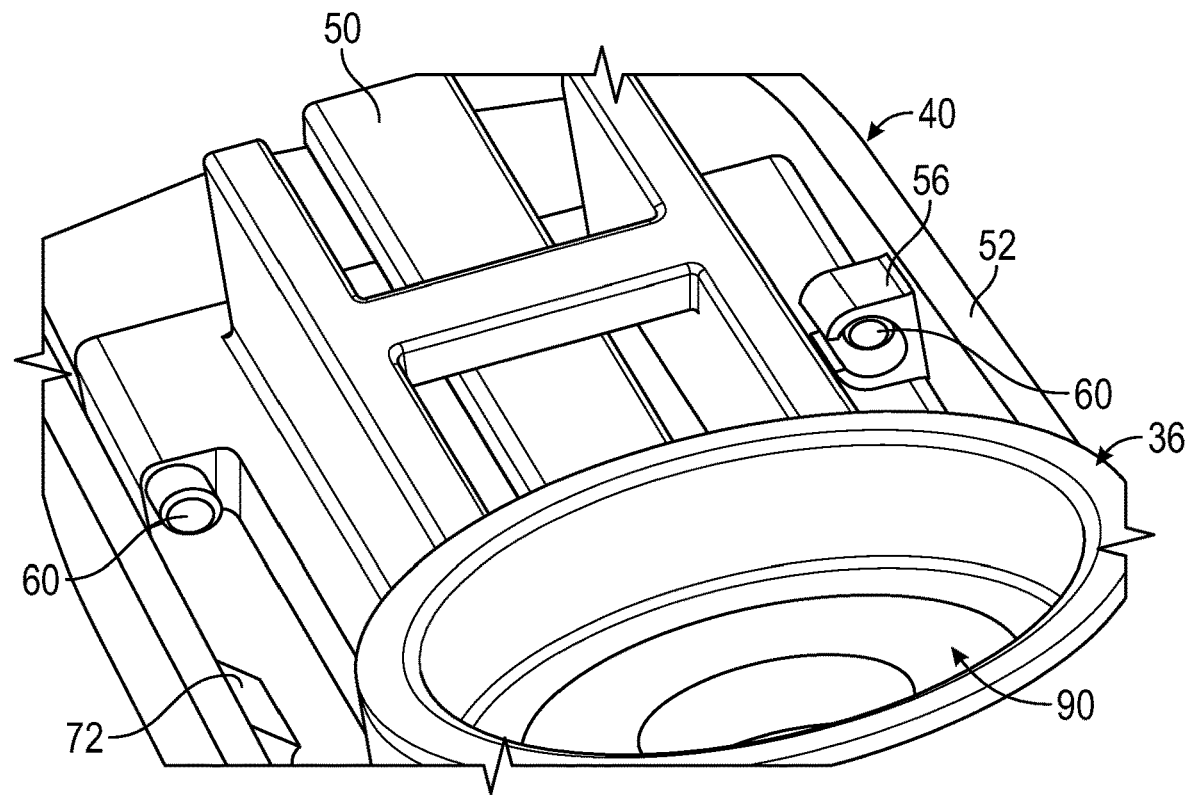
FIG. 62 illustrates a partial perspective view of the head and cover assembly of FIG. 57 according to one embodiment of the present invention.
Figure 63:
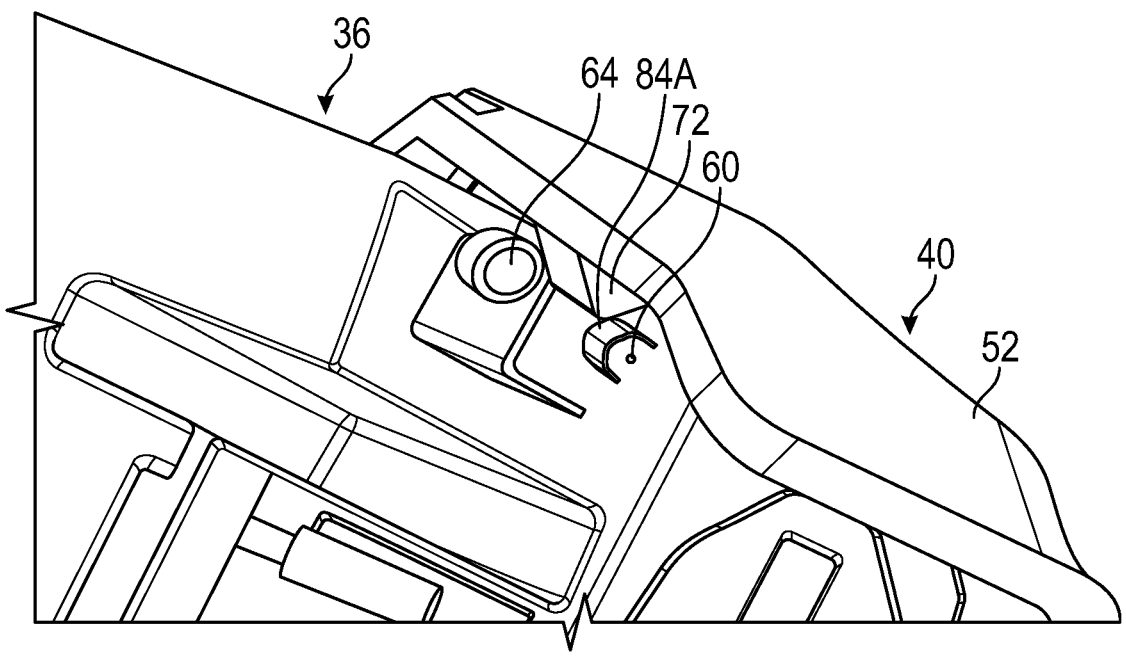
FIG. 63 illustrates a partial perspective view of the head and cover assembly of FIG. 57 according to one embodiment of the present invention.

The hinge pin 64 is longer than the width of the loop 54 as shown in FIG. 61. The second hinge pin 60 is shorter than the width of the claw 56 as shown in FIG. 62. This allows for the loop 54 to be placed on hinge pin 64 and the claw to be snapped around hinge pin 60 for ease of assembly. When the cover 40 is rotated into the closed position as shown in FIG. 63, the retention bump feature 72 engages with and is retained by the ledge surface 84A of the hinge pin slot 84.

Figure 64:
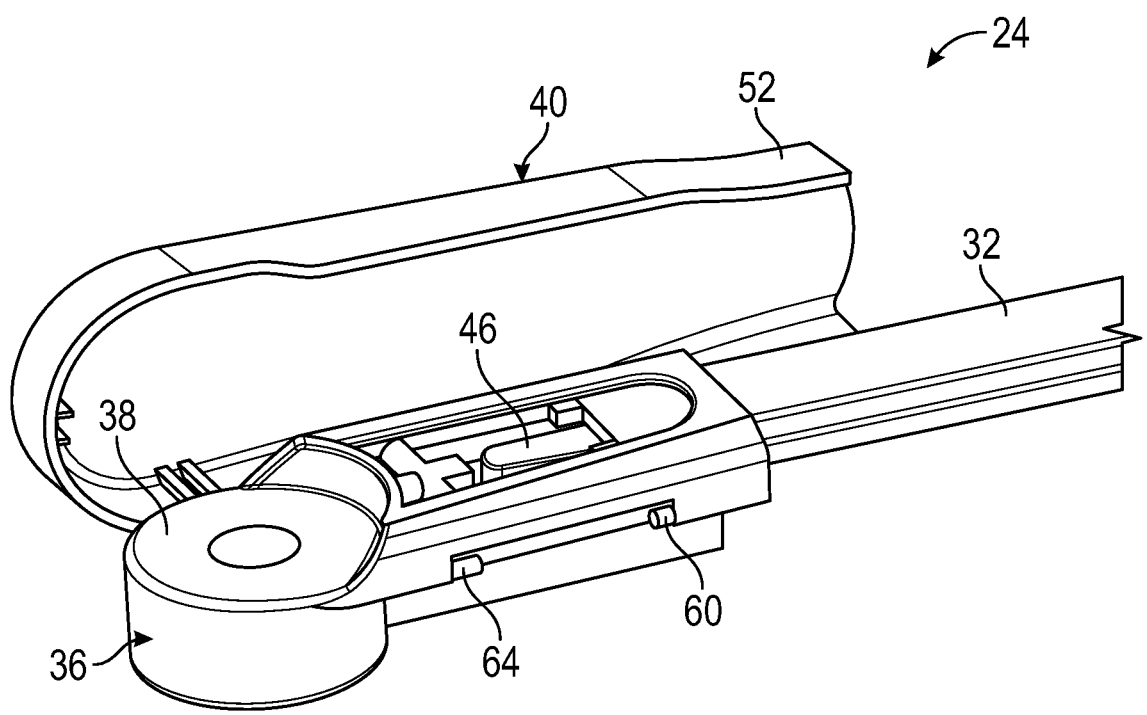
FIG. 64 illustrates a perspective view of the head and cover assembly of FIG. 57 with the cover rotated away from the head according to one embodiment of the present invention.
Figure 65:
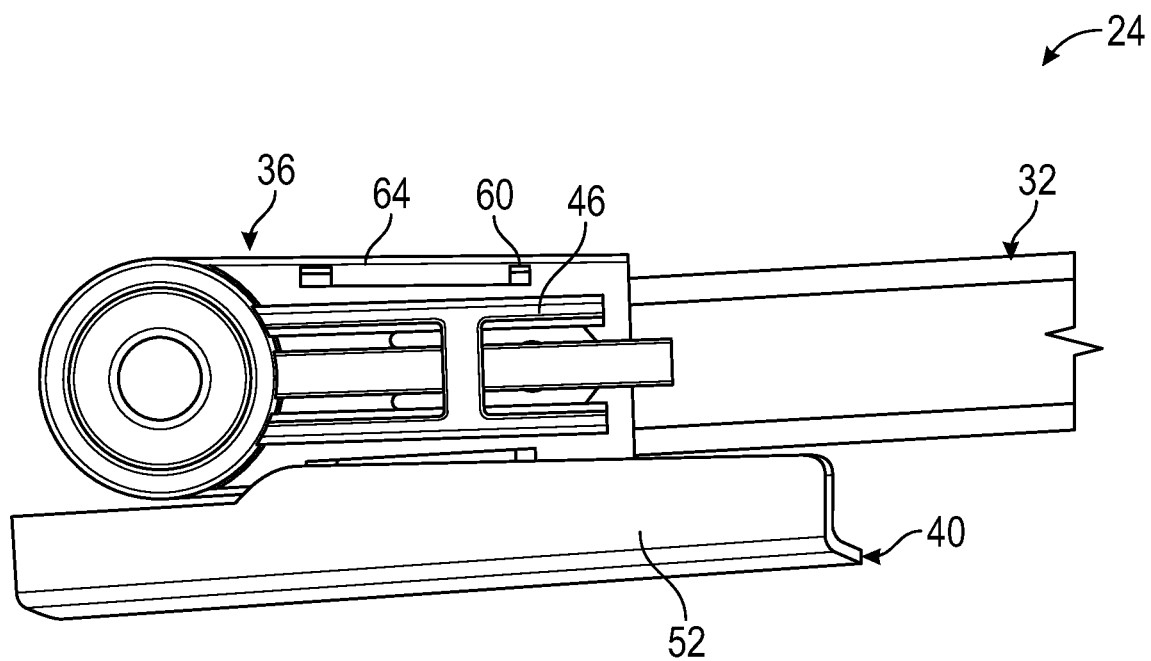
FIG. 65 illustrates a bottom view of the head and cover assembly of FIG. 64 according to one embodiment of the present invention.
Figure 66:
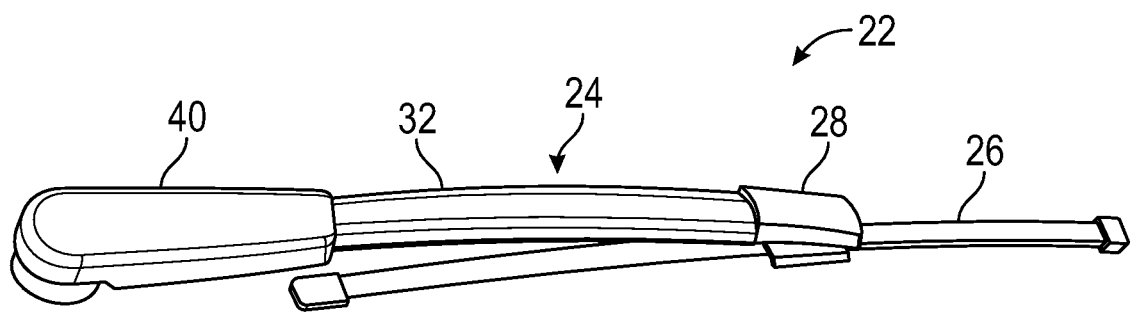
FIG. 66 illustrates a top view of a wiper assembly according to one embodiment of the present invention.
Figure 67:
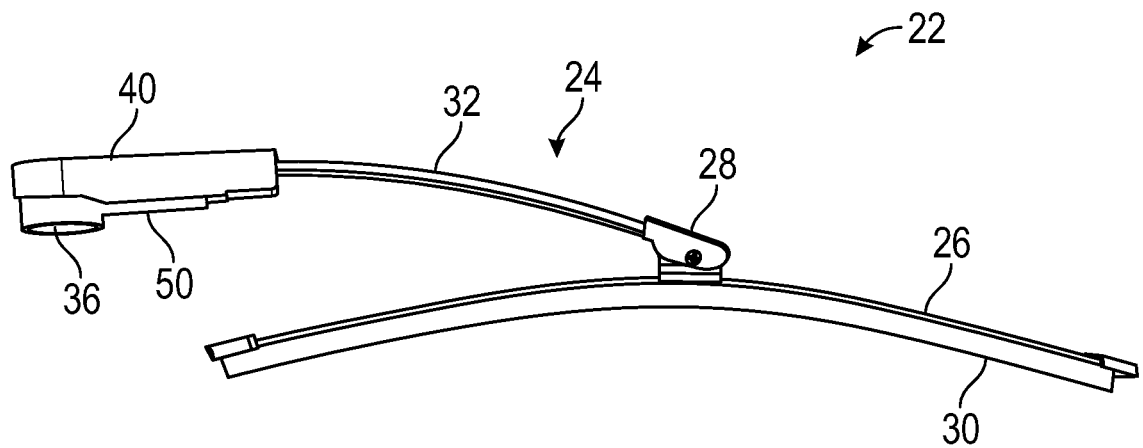
FIG. 67 illustrates a side view of the wiper assembly of FIG. 66 according to one embodiment of the present invention.
Figure 68:
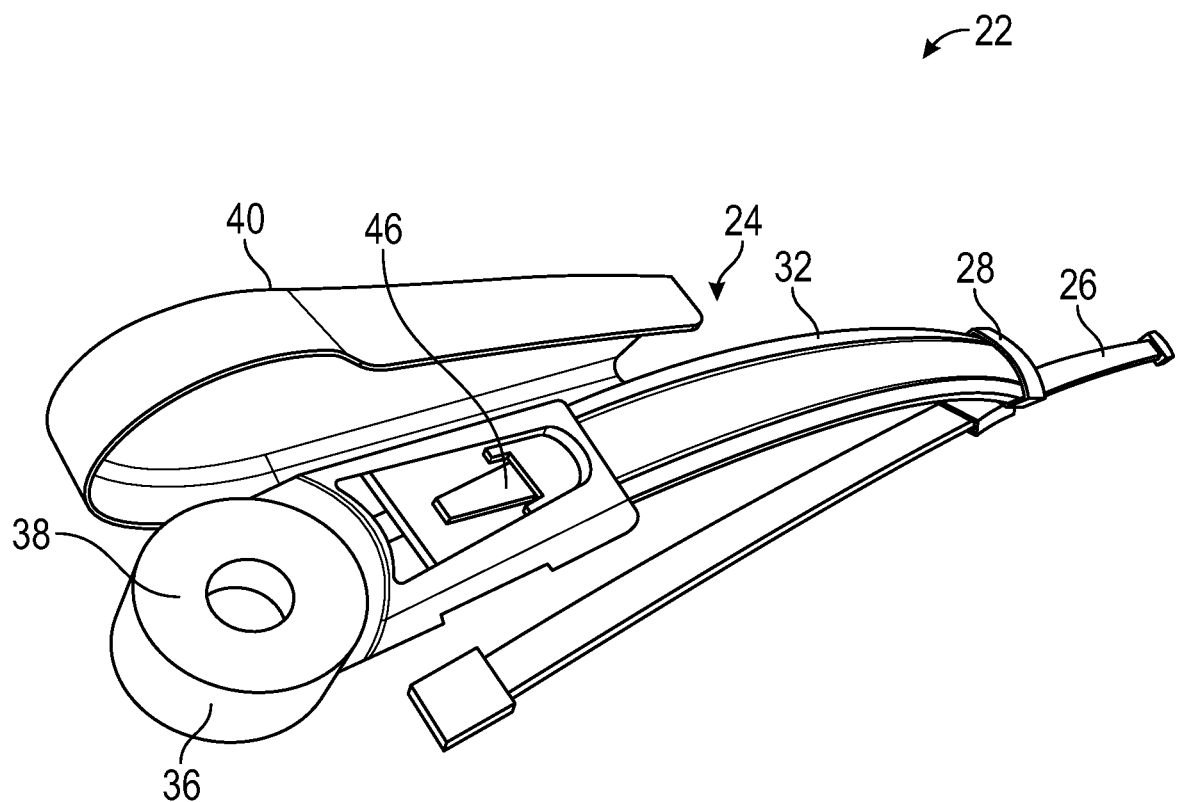
FIG. 68 illustrates a perspective view of the wiper assembly of FIG. 67 with the cover rotated away from the head according to one embodiment of the present invention.

The head cover 40 is attached to the head 36 in the open position as shown in FIGS. 64 and 65. The cover 40 is rotatable from the closed position (FIG. 60) to the open position for accessing the pivot shaft to remove the wiper arm 24 from the vehicle. After servicing, the cover 40 is rotated back to the closed position. The combination of the loop 54, claw 56, pin hinges 60, 64, and the retention bump feature 72 allow for servicing the wiper blade 26 without removing the cover 40 from the head 36. The complete wiper assembly 22 is shown in FIGS. 66-68. The head cover 40 is in the closed position in FIGS. 66 and 67. The head cover is rotated on the pin hinges 60, 64 to provide access to the pivot shaft as illustrated in FIG. 68.

Figure 55:
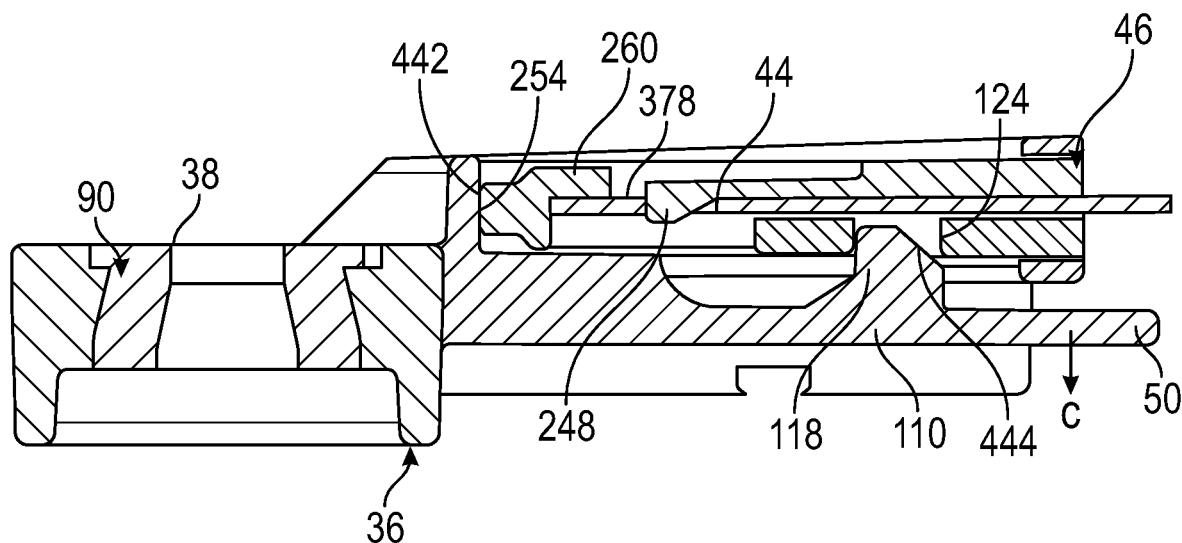
FIG. 55 illustrates a cross-sectional view LV-LV of the head assembly of FIG. 51 according to one embodiment of the present invention.
Figure 69:
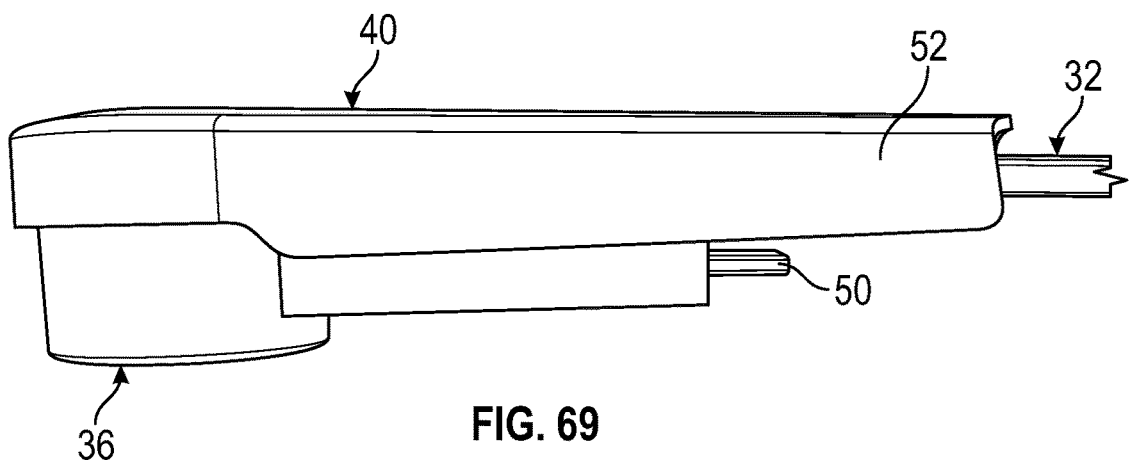
FIG. 69 illustrates a side view of the head, cover, and beam arm assembly of FIG. 56 according to one embodiment of the present invention.
Figure 70:
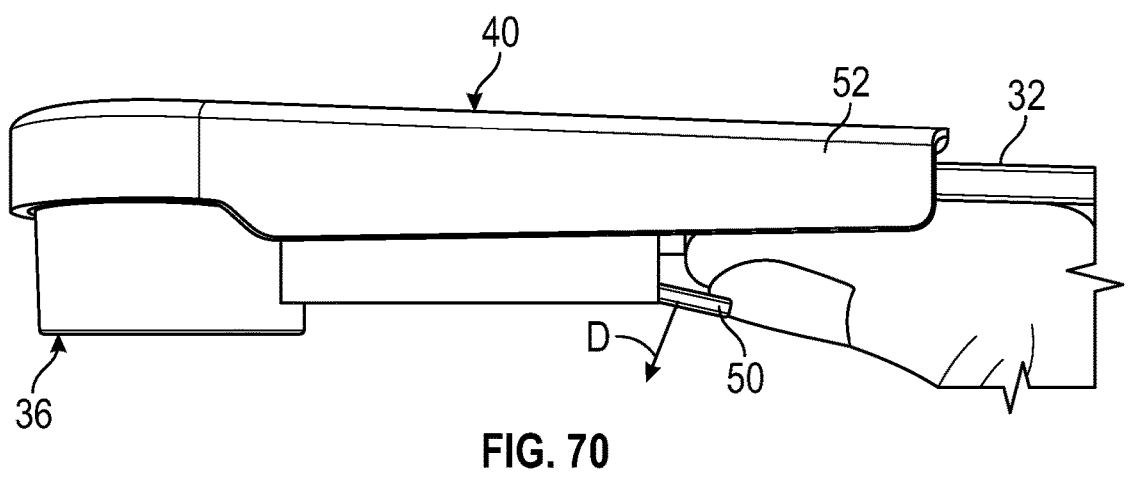
FIG. 70 illustrates a side view of the head, cover, and beam arm assembly of FIG. 69 with the release mechanism moved to a disengaged position according to one embodiment of the present invention.
Figure 71:
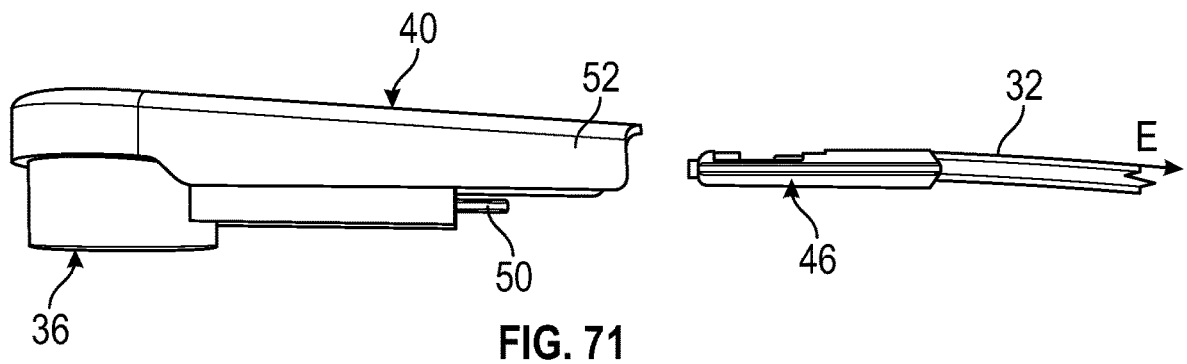
FIG. 71 illustrates a side view of the head, cover, and beam arm assembly of FIG. 70 with the beam arm disconnected from the head and cover assembly according to one embodiment of the present invention.

A second method of servicing the wiper blade 26 by disconnecting the beam arm 32 from the head 36 is shown in FIGS. 69-71. FIG. 69 shows the beam arm 32 coupled with the head 36 with the release mechanism 50 in an engaged position and the retention embossment 118 engaged with the retention clip hole 124. The release mechanism 50 is an end portion of the diving board 110 as shown in FIG. 55. Pushing downward on the release mechanism 50 (shown by Arrow D in FIG. 70) pulls the retention embossment 118 out of the retention clip hole 124. When the release mechanism 50 is in the disengaged position, the beam arm 32 can be removed from the head 36 as shown in FIG. 71 and illustrated by Arrow E. The living hinge on the diving board 110 automatically moves the release mechanism 50 back to an engaged position when tension on the release mechanism 50 is removed. After servicing the wiper blade 26 the beam arm 32 is reattached with the head 35 by inserting the retention clip 46 into the slot 94 in the head until the positive stop 254 on the retention clip 46 contacts the head stop surface 442 and the retention embossment 118 engages with the retention clip hole 124 which couples and locks the beam arm 32 with the head 36.

The wiper assembly 22 (adapter 28, beam arm 32, airfoil 410, retention clip 46, head 36, head cover 40) is designed to sit lower on the windshield for a lower profile look. The head-retention clip-beam arm interface 36, 46, 32 is designed with a service feature that allows pulling out the beam arm 32 and putting a replacement beam arm 32 back in the head 36 without removing the head 36 and the head cover 40 from the vehicle without using a tool other than the human body. The retention clip-head interface 46, 36 allows for a plastic to plastic interface as opposed to metal to plastic interface, reducing wear on the head 36 attached to the vehicle. The cover 40 is designed to ship with the head 36 and can stay connected to the hinge pins 60, 64 and rotate off the head 36 to allow enough room to attach the head 36 onto a vehicle and then can rotate to a closed position and be retained on the head 36. The stepped design on the head cover 40, airfoil 410, and the adapter 28 provides an appealing appearance.

Figure 72:
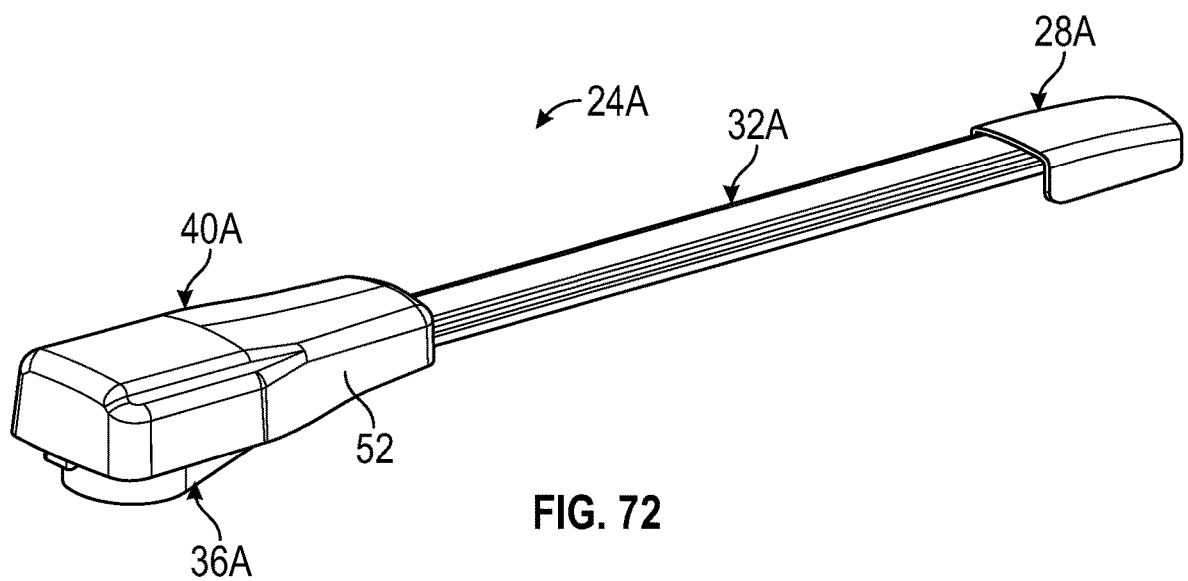
FIG. 72 illustrates a perspective view of a beam arm assembly according to another embodiment of the present invention.
Figure 73:
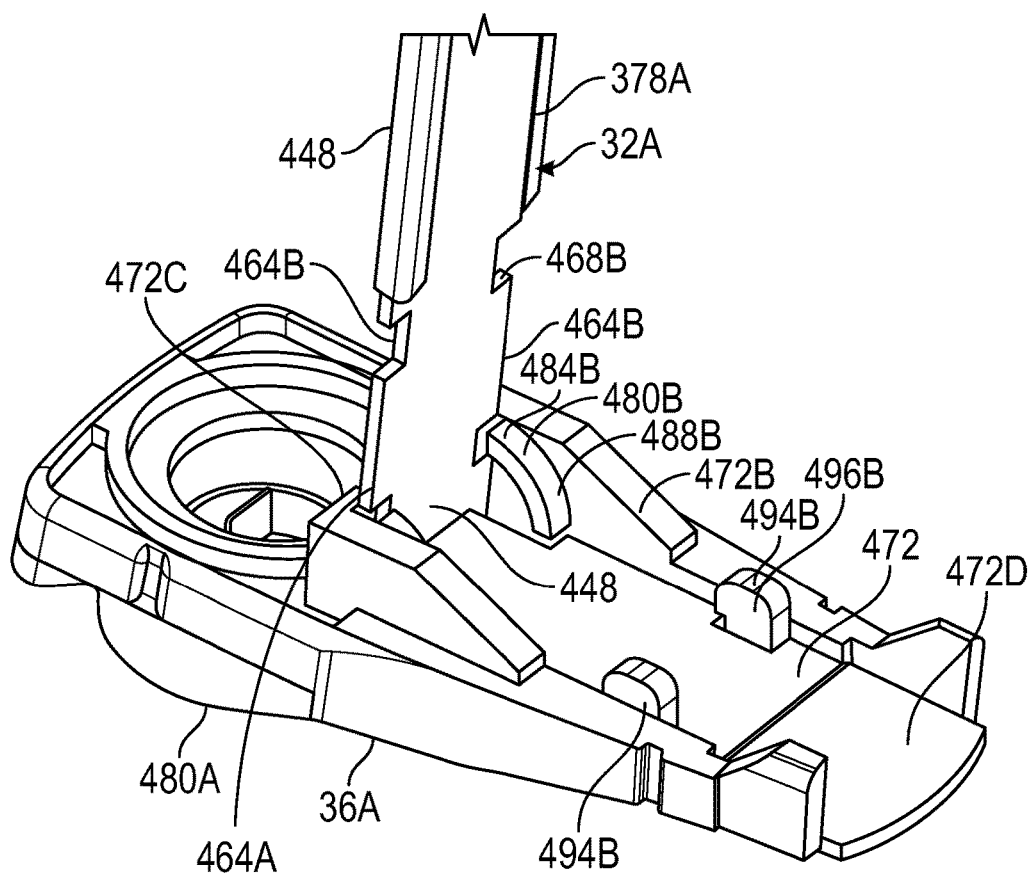
FIG. 73 illustrates a partial perspective view of a beam arm inserted into a head according to another embodiment of the present invention.
Figure 74:
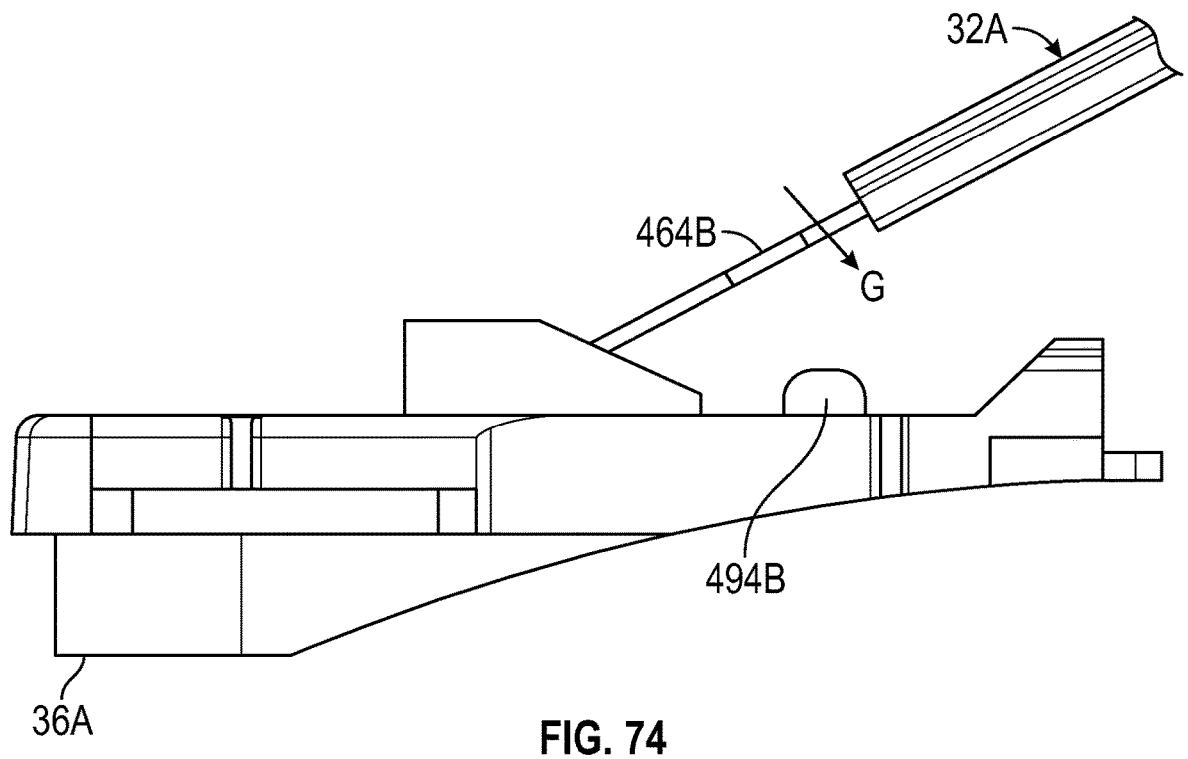
FIG. 74 illustrates a partial side view of the beam arm inserted into the head of FIG. 73 according to another embodiment of the present invention.

A second embodiment of a wiper arm 24A having a detachable beam arm 32A and a removable head cover 40A is shown in FIGS. 72-83. As shown in FIG. 72, the second embodiment of the wiper arm 24A comprises the beam arm 32A assembled with an adapter 28A. The beam arm 32A is coupled with the head 36A. The cover 40A is attached to the head 36A. However, a retention clip 46 is omitted from the head end of the beam and 32A. As shown in FIG. 73, the beam arm 32A comprises an airfoil 410A assembled with a beam arm insert 378A. One end 448 of the beam arm 32A is configured to matingly engage with the head 36A. A first pair of notches 464A, 464B in the sides of the airfoil 410A is spaced apart from the end 448. A second pair of notches 468A, 468B is spaced apart from the first pair of notches 464A, 464B in the sides of the airfoil 410A and further away from the 448.

The head 36A has a generally rectangular shape in the embodiment shown in FIG. 73 having a generally U-shape channel 472 having opposing side surfaces 472A, 472B, an end wall 472C extending between the side surfaces 472A, 472B, a bottom surface 472D, and running longitudinally through a portion of the head 36A. An arcuate-shaped boss 480A, 480B projects from each side wall 472A, 472B. Each arcuate-shaped boss 480A, 480B has a first end 484A, 484B spaced apart from the end wall 472C and a second end 488A, 488B spaced apart from the bottom surface 472D.

Figure 75:
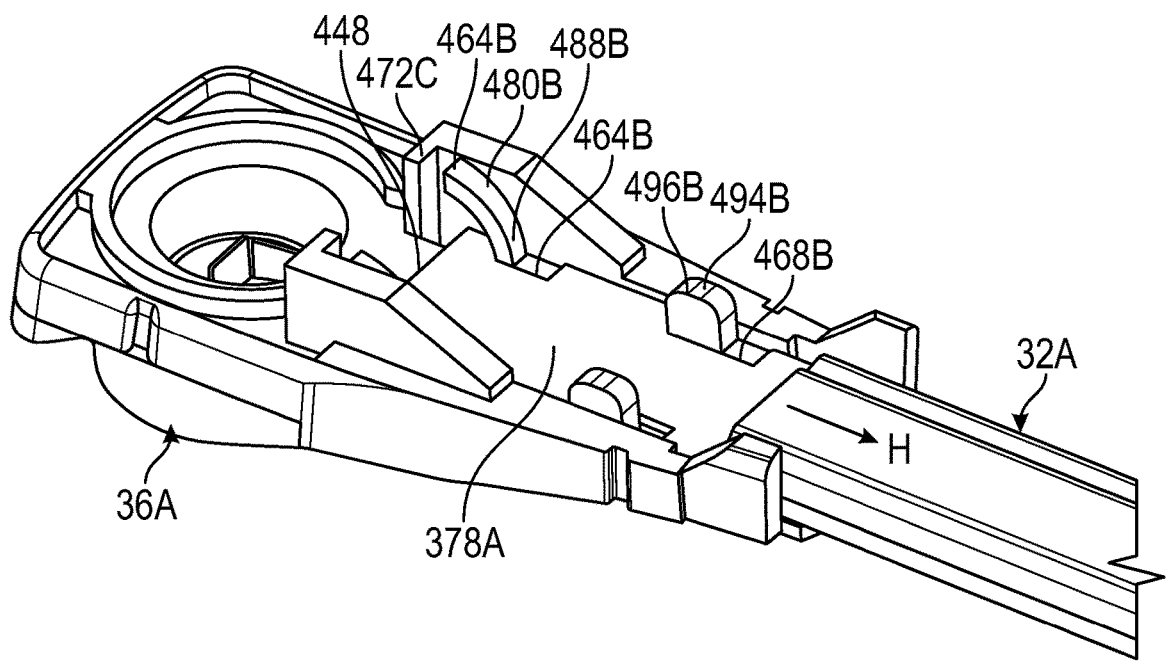
FIG. 75 illustrates a partial perspective view of the head and beam arm assembly of FIG. 74 according to another embodiment of the present invention.

As illustrated by Arrow F shown in FIG. 73, the end 448 of the beam arm 32A can be slid between the end wall 482C and the first ends 484A, 484B of the arcuate-shaped bosses 480A, 480B. When the beam arm 32A is inserted such that the end 448 of the beam arm 32A abuts the bottom surface 472D of the channel 472, the first pair of notches 464A, 464B will align with the first ends 484A, 484B of the arcuate-shaped bosses 480A, 480B. A pair of stops 494A, 492B project from the bottom surface 472D and are positioned adjacent the respective channel side wall 472A, 472B. The stops 494A, 494B are spaced apart from the arcuate-shaped bosses 480A, 480B and further have a locking notch 496A, 496B in each stop 494A, 494B. When the beam arm 32A is rotated towards the channel bottom 472D as illustrated by Arrow G in FIG. 74, the first pair of notches 464A, 464B follows the respective arcuate-shaped boss 480A, 480B which acts as a rotational guide, and the second pair of notches 468A, 468B pass over the respective stop 494A, 494B. Once the beam arm 32A is rotated such that the beam arm insert 378A rests against the bottom 472D of the channel 472, then the beam arm 32A is pulled away from the end wall 472C as illustrated by Arrow H shown in FIG. 75 until the second pair of notches 468A, 468B in the beam arm 32 engage with the respective locking notch 496A, 496B in the stops 494A, 494B. When the beam arm 32 is in an engaged position as shown in FIG. 75, the lower ends 488A, 488B of the arcuate-shaped bosses 480A, 480B and the sides of the locking notches 496A, 496B retain the beam arm 32 within the channel 472. However, if the beam arm 32 is slid towards the end wall 472C towards a disengaged position until the second pair of notches 468A, 468B disengages from the respective locking notch 496A, 496B, then the first pair of notches 464A, 464B will align with the lower ends 488A, 488B of the arcuate-shaped bosses 480A, 480B. When the beam arm 32 is in the disengaged position, then the beam arm 32 can be pivoted upward by sliding the first pair of notches 464A, 464B along a respective arcuate-shaped boss 480A, 480B until the beam arm 32 is orientated generally parallel with the end wall 472C. In this position, orientated generally parallel with the end wall 472C, the beam arm 32 can be lifted longitudinally away from the head 36A to remove the beam arm 32 from the head 36A.

Figure 76:
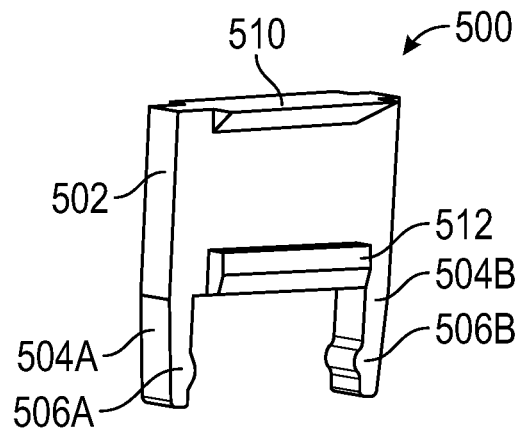
FIG. 76 illustrates a perspective view of a locking clip according to another of the present invention.

A locking clip 500 can be inserted into the head 36A to retain the beam arm 32 in the engaged position within the head 36A. An embodiment of a suitable locking clip 500 is shown in FIG. 76. The locking clip 500 is configured to matingly engage with a channel between the rear wall 472C and the upper end 484A, 484B of the arcuate-shaped bosses 480A, 480B. The locking clip 500 has a generally rectangular main body 502 with a pair of legs 504A, 504B extending away from the main body 502 and aligned with the main body 502. Each leg 504A, 504B further has a retention bump 506A, 506B extending towards the opposing leg 504B, 504A. Projecting outward from both sides of a top edge of the main body 502 is an angled finger grip 510 to aid in removing the locking clip 500 from the head 36A. A tapered wedge 512 projects outward along a lower edge of the main body 502 and between the legs 504A, 504B to engage with the end 448 of the beam arm 32A when the locking clip 500 is inserted into the head 36A. The locking clip 500 is made of a material such as plastic. The locking clip 500 is integral, unitary, and one-piece.

Figure 77:
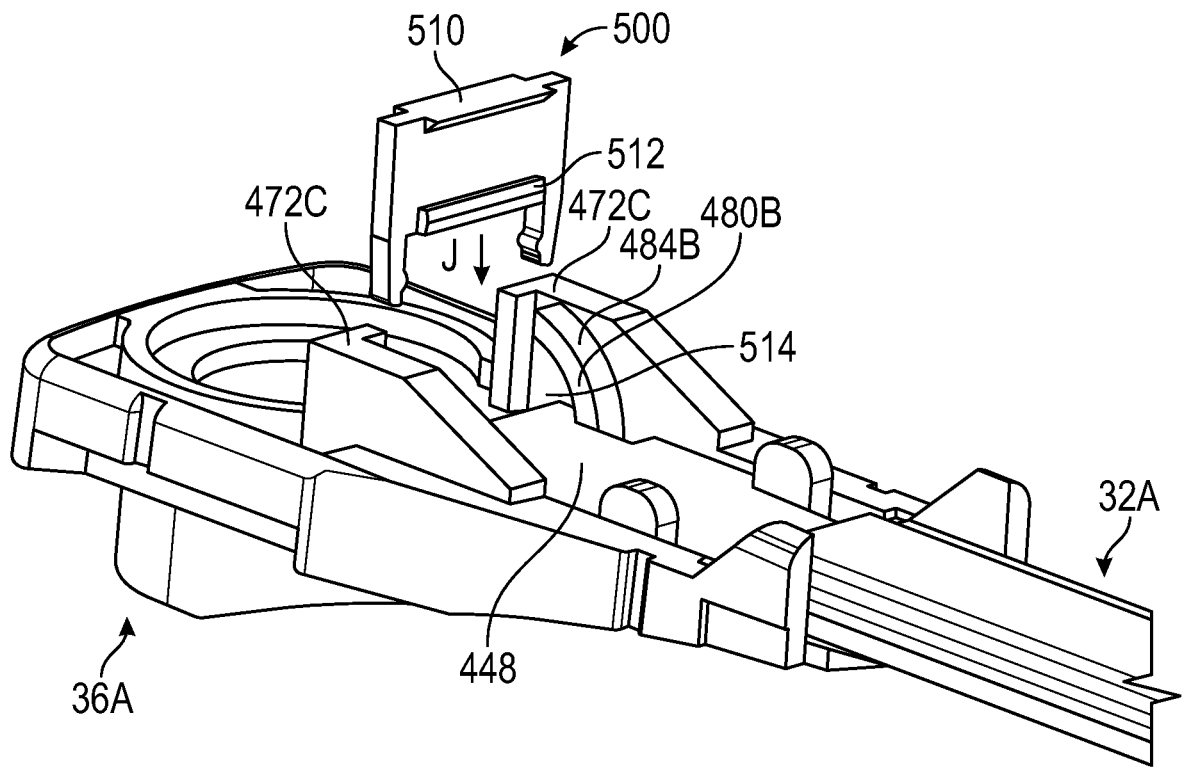
FIG. 77 illustrates a partial perspective view of the locking clip of FIG. 76 being assembled with the head assembly of FIG. 75 according to another embodiment of the present invention.
Figure 78:
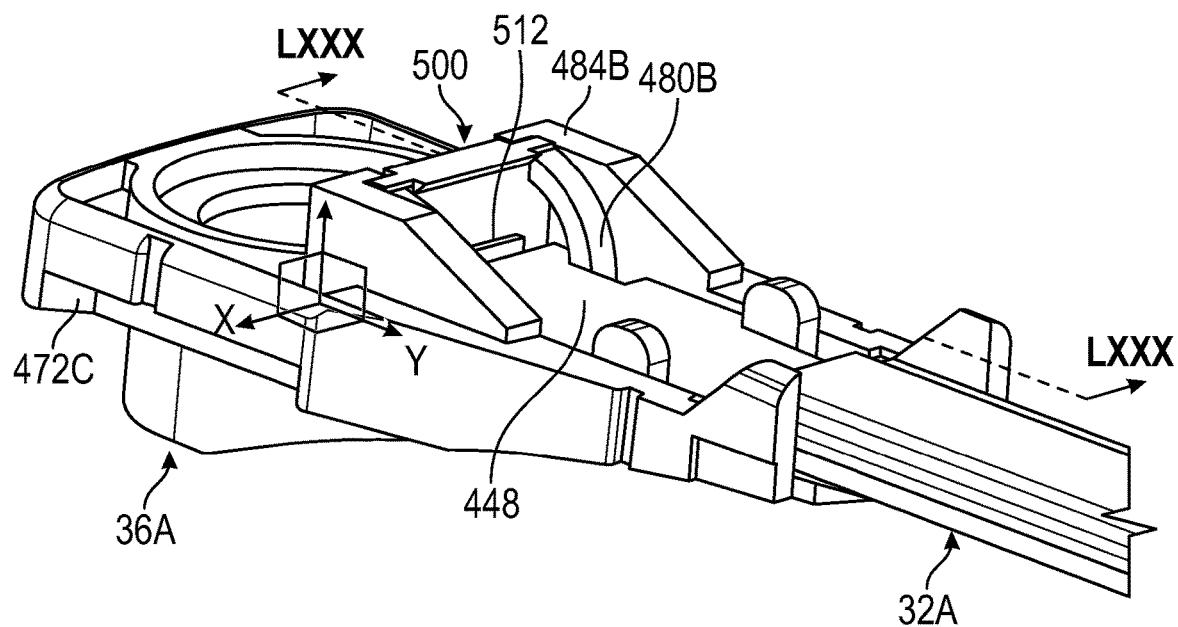
FIG. 78 illustrates a perspective view of the head, beam arm, and locking clip assembly of FIG. 77 according to another embodiment of the present invention.
Figure 79:
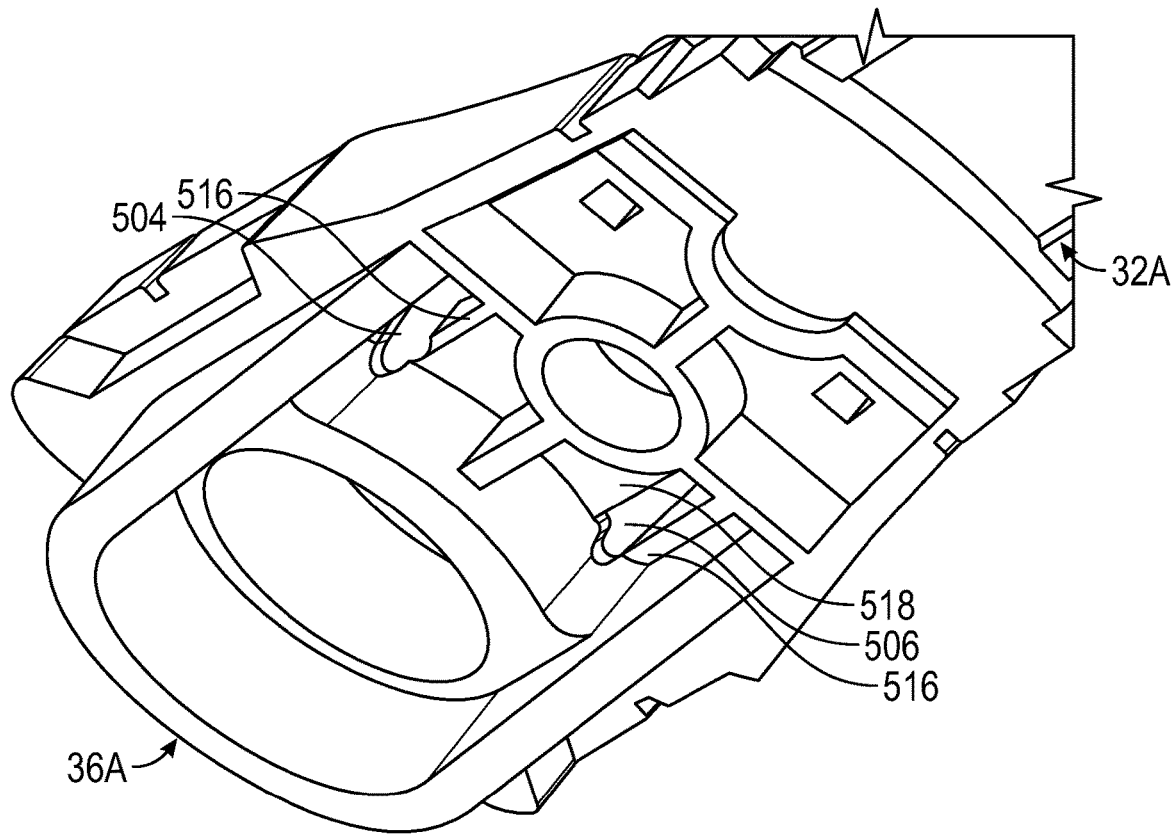
FIG. 79 illustrates a partial perspective view of the head assembly of FIG. 78 according to another embodiment of the present invention.

FIG. 77 illustrates inserting the locking clip 500 into the head 36A by sliding the locking clip along the back wall 472C in the space between the back wall 472C and the end of the beam arm 32A (see Arrow J). Also shown in FIG. 77 is a gap 514 in the back wall 472C which provides space for the angled finger grip 510 and allows for easy removal of the locking clip 500 from the head 36A. The locking clip 500 is fully inserted into the head 36A with the beam arm 32A in the engaged position as shown in FIG. 78. The tapered wedge 512 shims the beam arm 32A into the engaged position. A view of the underside of the head 36A is shown in FIG. 79. The head 36A has a pair of slots 516 extending between the bottom 472D of the channel 472 and the underside of the head 36A and configured to matingly engage with the legs 504A, 504B. The edge 518 of each slot 516 frictionally engages a respective retention tab 506 on the legs 504.

Figure 80:
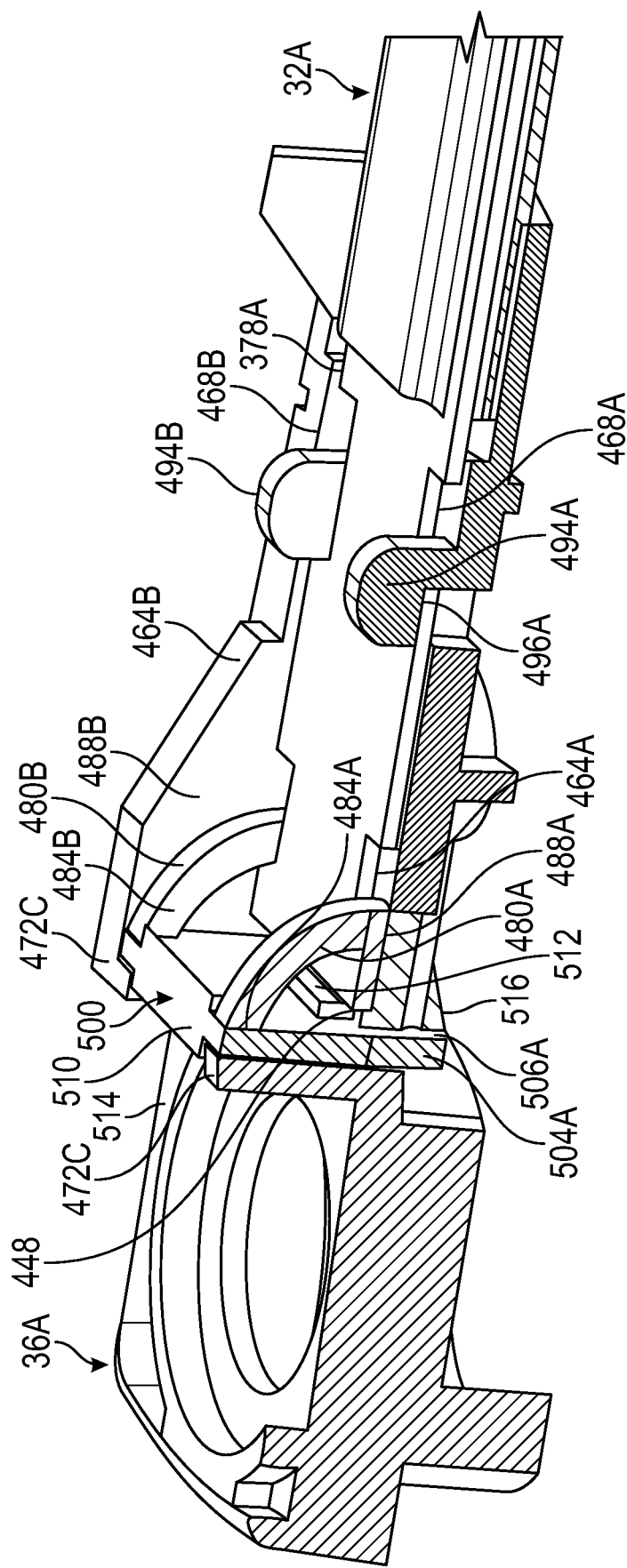
FIG. 80 illustrates a cross-sectional view LXXX-LXXX of the head assembly of FIG. 78 according to another embodiment of the present invention.

A cross-sectional view of the head 36A assembled with the beam arm 32A and the locking clip 500 is shown in FIG. 80. The beam arm 32A is in an engaged position with the second notches 468A, 468B matingly engaged with the respective locking notch 496A, 496B. The first pair of notches 464A, 464B is slid past the end 488A, 488B of the arcuate-shaped bosses 480A, 480B such that the first notches 464A, 464B are not in alignment with the end 488A, 488B of the arcuate-shaped bosses 480A, 480B. The locking clip 500 is inserted into the space between the upper end 484A, 484B of the arcuate-shaped bosses 480A, 480B and the end wall 472C with the finger grip 510 in the passageway 514 in the end wall 472C. The legs 504A, 504B of the locking clip 500 pass through the slot 516 in the bottom wall 472D such that the retention tabs 506A, 506B frictionally engage with the edge of the channel 516. The tapered wedge 512 of the locking clip 500 shims the beam arm 32A into the engaged position retaining the engagement between the beam arm 32A and the locking notches 496A, 496B. The beam arm 32A can be separated from the head 36A by removing the locking clip 500, sliding the beam arm 32A towards the end wall 472C, and rotating the beam arm 32A along the arcuate-shaped bosses 480A, 480B to a vertical orientation, and then pulling the beam arm 32A away from the head 36A.

Figure 81:
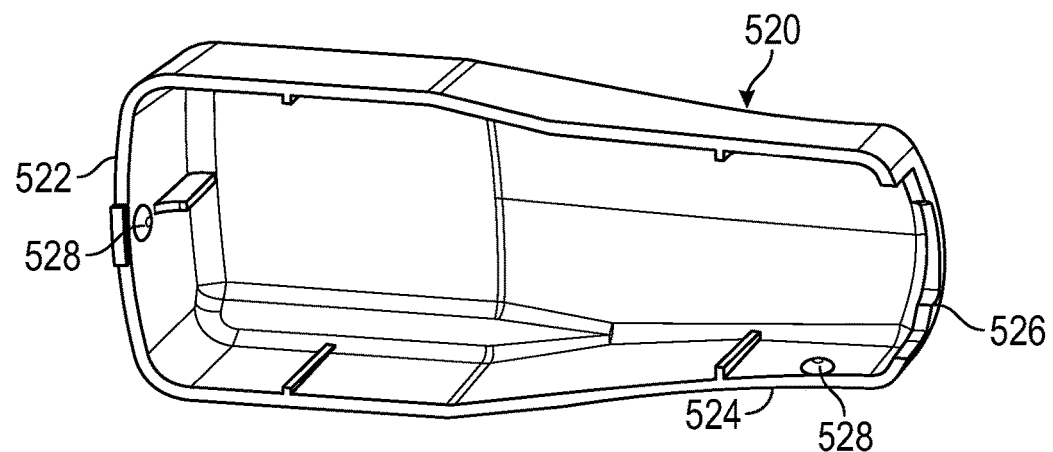
FIG. 81 illustrates a perspective view of a head cover according to another embodiment of the present invention.
Figure 82:
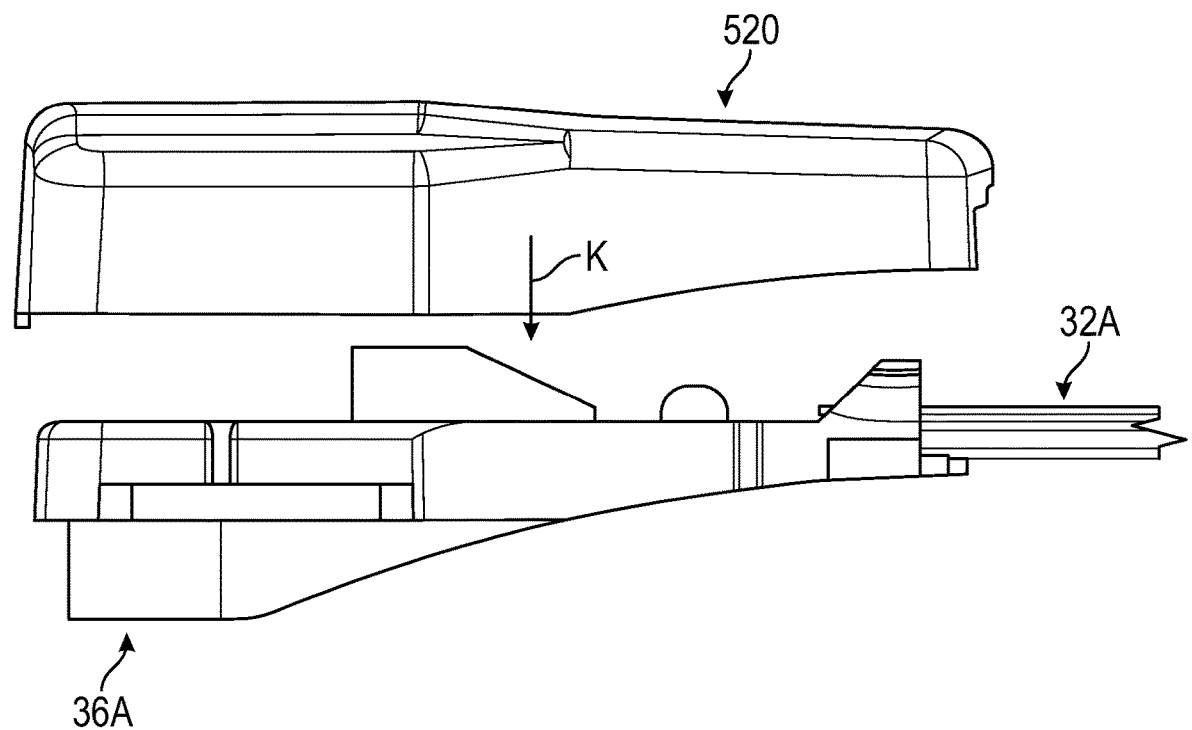
FIG. 82 illustrates a side view of the head cover of FIG. 81 being assembled with the head assembly of FIG. 78 according to another embodiment of the present invention.
Figure 83:
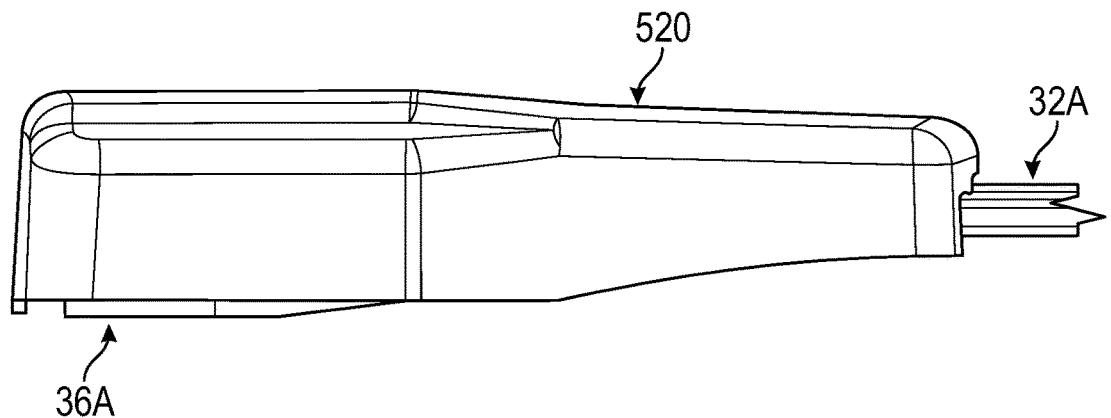
FIG. 83 illustrates a side view of the head assembly with the head cover of FIG. 81 according to another embodiment of the present invention.

After assembling the beam arm 32A with the head 36A, a beauty cover 520 is attached to the head 36A. An embodiment of the beauty cover 520 is shown in FIG. 81. The beauty cover 520 has a generally elongated U-shape with a closed end 522 and side walls 524 generally matching the outer profile of the head 36A, and an open end 526 configured to generally matingly engage with the outer profile of the beam arm 32A. One or more retention bumps 528 project from an interior surface of the beauty cover 520 and are configured to frictionally engage with the head 36A when the beauty cover 520 is assembled with the head 36A. The beauty cover 520 is assembled with the head 36A by pressing the beauty cover 520 down on the head 36A as illustrated by Arrow K shown in FIG. 82. The beauty cover 520 can be removed from the head 36A for accessing the nut retaining the beam arm 32A on the pivot shaft by lifting up on one end of the beauty cover 520 as illustrated by Arrow M shown in FIG. 84.

One benefit of the wiper assembly with a detachable beam arm is providing a service method to easily replace a wiper blade without removing the head from the vehicle. A second benefit is a service method that does not require removing the head cover to replace a wiper blade. An additional benefit is a wiper arm having a low profile since a hinged connection to the blade arm is not required for servicing the wiper blade. Also, an additional benefit is having an attached cover for packaging purposes and where accessing the mounting nut is possible without completely removing the cover from the mounting head. Finally, another benefit is a service feature where the wiper blade (and/or the wiping element) can be easily replaced without the use of a separate tool.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A beam blade wiper assembly comprising:
   a wiping element adapted to contact a surface to be wiped;
   an elongated beam arm having a first end, a second end, and opposing sides, said first end acting to support said wiping element, said second end configured with a first pair of opposing notches on said sides of said beam arm and spaced apart from said second end, said beam arm having a second pair of opposing notches on said sides of said beam arm spaced apart from said first pair of opposing notches; and
   a mounting head having a through hole configured for engaging a drive shaft, said mounting head having a first pair of locking features configured to matingly engage and retain a respective one of said first pair of opposing notches when said beam arm is in a first position and assembled with said mounting head, said mounting head comprising a channel passing through a portion of said mounting head and configured to matingly engage with said second end of said beam arm, said channel comprising opposing side walls, an end wall, and a channel bottom wall;
   a locking clip configured to frictionally engage with said mounting head when said beam arm is in said first position assembled with said mounting head with said first pair of locking features matingly engaged with said respective one of said first pair of opposing notches;
   wherein said beam arm is detachable from said mounting head when said locking clip is removed from said mounting head; and
   wherein said beam arm is fixedly coupled with said mounting head when said locking clip is frictionally engaged with said mounting head.

2. The beam blade wiper assembly as set forth in claim 1, said channel comprising a pair of arcuate-shaped bosses, each of said pair of arcuate-shaped bosses projecting inward from a respective side wall, each of said pair of arcuate-shaped bosses having an upper end and a lower end, and each of said pair of arcuate-shaped bosses spaced apart from said end wall;
   wherein when said beam arm is placed in a second position with said second end of said beam arm placed against said channel bottom and a portion of said beam arm positioned in a gap between said upper end of said pair of arcuate-shaped bosses and said end wall, each of said second pair of opposing notches is configured to generally align with said upper end of said respective arcuate-shaped boss.

3. The beam blade wiper assembly as set forth in claim 2, wherein when said beam arm is placed in said second position, said beam arm is rotatable from said second position to a third position wherein a portion of said beam arm is positioned adjacent to said channel bottom wall with said each of said second pair of opposing notches generally aligned with a respective one of said lower end of said pair of arcuate-shaped bosses.

4. The beam blade wiper assembly as set forth in claim 3, wherein said beam arm is repositionable between said third position and said first position by sliding said beam arm along a portion of said channel and towards said first pair of locking features.

5. The beam blade wiper assembly as set forth in claim 4, said locking clip comprising at least one leg; and
   said channel bottom having at least one aperture configured to frictionally engage with said at least one leg;
   wherein said locking clip frictionally engages with said mounting head when said at least one leg frictionally engages with said at least one aperture through said channel bottom.

6. The beam blade wiper assembly as set forth in claim 5, a head cover configured to releasably couple with said mounting head; and
   wherein said head cover blocks removal of said locking clip from said mounting head when said head cover is releasably engaged with said mounting head; and
   wherein said locking clip is removable from said mounting head when said head cover is removed from said mounting head.

7. A method of servicing a beam blade wiper assembly, said method comprising:
   providing a beam blade wiper assembly comprising an elongated beam arm, a mounting head, and a head cover, said beam arm having a first end and a second end, said first end acting to support a wiping element and said second end configured with a retention feature, the retention feature including a first pair of opposing notches on sides of said beam arm and spaced apart from said second end, and a second pair of opposing notches on said sides of said beam arm spaced apart from said first pair of opposing notches;
   said mounting head having a through hole configured for engaging a drive shaft, said mounting head having a locking feature configured to matingly engage and retain said retention feature when said retention feature is assembled with said mounting head, the locking feature including a first pair of locking features configured to matingly engage and retain a respective one of said first pair of opposing notches when said beam arm is in a first position and assembled with said mounting head, said mounting head comprising a channel passing through a portion of said mounting head and configured to matingly engage with said second end of said beam arm, said channel comprising opposing side walls, an end wall, and a channel bottom wall;
   said head cover configured to releasably couple with said mounting head, said head cover blocking access to an upper portion of said through hole when said head cover is releasably coupled with said mounting head;
   repositioning said locking feature into an unlocked condition; and
   disconnecting said second end of said beam arm from said mounting head.

8. The method as set forth in claim 7, said method comprising:
   servicing said wiping element;
   matingly engaging said retention feature with said locking feature; and
   automatically repositioning said locking feature into a locked condition which releasably couples said beam arm with said mounting head.

9. The method as set forth in claim 8, said method comprising:

providing a rotational coupling between said head cover and said mounting head, wherein said head cover is rotatable about said rotational coupling between a latched condition and an unlatched condition with said mounting head; and rotating said head cover between said latched condition and said unlatched condition by rotating said head cover about said rotational coupling.

10. The method as set forth in claim 9, said method comprising:

providing a frictional engagement between said head cover and said mounting head when said head cover is releasably coupled with said mounting head;

rotating said head cover between said unlatched condition and said latched condition; and frictionally engaging said head cover with said mounting head.

\* \* \* \* \*